(12) United States Patent
Holmes

(10) Patent No.: US 10,127,755 B2
(45) Date of Patent: Nov. 13, 2018

(54) MOIRE MAGNIFICATION DEVICE

(75) Inventor: Brian William Holmes, Fleet (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 245 days.

(21) Appl. No.: 13/580,784

(22) PCT Filed: Mar. 1, 2011

(86) PCT No.: PCT/GB2011/050399
§ 371 (c)(1),
(2), (4) Date: Oct. 19, 2012

(87) PCT Pub. No.: WO2011/107783
PCT Pub. Date: Sep. 9, 2011

(65) Prior Publication Data
US 2013/0056971 A1    Mar. 7, 2013

(30) Foreign Application Priority Data
Mar. 1, 2010    (GB) .................................. 1003397.5

(51) Int. Cl.
*B42D 15/00* (2006.01)
*B42D 15/10* (2006.01)
(Continued)

(52) U.S. Cl.
CPC ......... *G07D 7/0006* (2013.01); *B42D 25/324* (2014.10); *B42D 25/342* (2014.10);
(Continued)

(58) Field of Classification Search
CPC ...... B42D 15/00; B42D 15/10; B42D 25/351; B42D 25/324; B42D 25/342;
(Continued)

(56) References Cited

U.S. PATENT DOCUMENTS

| 4,652,015 A | 3/1987 | Crane |
| 5,694,229 A | 12/1997 | Drinkwater et al. |

(Continued)

FOREIGN PATENT DOCUMENTS

| AU | 734 937 B2 | 6/2001 |
| AU | 2006215783 B2 | 12/2010 |

(Continued)

OTHER PUBLICATIONS

Hutley et al., "The Moiré Magnifier", Pure Appl. Opt. 3 (1994) pp. 133-142 published by IOP Publishing Limited.
(Continued)

*Primary Examiner* — Justin V Lewis
(74) *Attorney, Agent, or Firm* — Oliff PLC

(57) ABSTRACT

A moiré magnification device including a transparent substrate carrying: an array of micro-focusing elements, the focusing elements defining a focal plane; a first array of microimage elements in a first colour and a second array of microimage elements in a second colour, the first and second arrays of microimage elements are located in a plane substantially coincident with the focal plane of the focusing elements, the second array of microimage elements being laterally offset from the first. The pitches of the micro-focusing elements, first and second arrays of microimage elements and their relative locations are such that the array of micro-focusing elements cooperates with each of the first and second arrays of microimage elements to generate respective magnified versions of the microimage elements due to the moiré effect. An interruption zone is perceived between the magnified versions of the first and second microimage arrays, respectively, and exhibits no magnified versions.

25 Claims, 33 Drawing Sheets

(51) Int. Cl.
*G09C 3/00* (2006.01)
*G07D 7/00* (2016.01)
*B42D 25/342* (2014.01)
*B42D 25/324* (2014.01)
*B42D 25/351* (2014.01)
*G07D 7/207* (2016.01)
*G02B 3/00* (2006.01)

(52) U.S. Cl.
CPC ........... *B42D 25/351* (2014.10); *G07D 7/003* (2017.05); *G07D 7/207* (2017.05); *B42D 2035/20* (2013.01); *B42D 2035/44* (2013.01); *G02B 3/0056* (2013.01)

(58) Field of Classification Search
CPC .. B42D 2035/44; B42D 2035/20; G09C 3/00; G07D 7/0006; G07D 7/2066; G02B 3/0056
USPC .............. 283/72, 74, 75, 81, 91, 94, 98, 901
See application file for complete search history.

(56) References Cited

U.S. PATENT DOCUMENTS

| | | | |
|---|---|---|---|
| 5,712,731 A * | 1/1998 | Drinkwater | G02B 5/1885 359/619 |
| 6,450,540 B1 | 9/2002 | Kim | |
| 6,508,489 B2 | 1/2003 | Herrmann et al. | |
| 2004/0084893 A1 | 5/2004 | Fan et al. | |
| 2007/0075150 A1 | 4/2007 | Luthi et al. | |
| 2008/0036196 A1* | 2/2008 | Steenblik et al. | 283/109 |
| 2008/0067801 A1 | 3/2008 | Schilling et al. | |
| 2008/0160226 A1 | 7/2008 | Kaule et al. | |
| 2008/0182084 A1 | 7/2008 | Tompkin et al. | |
| 2008/0191463 A1* | 8/2008 | Vermeulen et al. | 283/110 |
| 2008/0284157 A1* | 11/2008 | Muke et al. | 283/86 |
| 2009/0034082 A1* | 2/2009 | Commander | B41M 3/148 359/619 |
| 2009/0102605 A1 | 4/2009 | Kaule | |
| 2009/0297805 A1 | 12/2009 | Dichtl | |
| 2009/0322071 A1 | 12/2009 | Dichtl | |
| 2010/0177094 A1 | 7/2010 | Kaule et al. | |
| 2010/0182221 A1* | 7/2010 | Kaule | G02B 27/60 283/72 |
| 2011/0109078 A1* | 5/2011 | Hoffmuller et al. | 283/72 |
| 2012/0193905 A1 | 8/2012 | Schilling et al. | |
| 2012/0243744 A1 | 9/2012 | Camus et al. | |
| 2012/0274998 A1 | 11/2012 | Holmes et al. | |

FOREIGN PATENT DOCUMENTS

| | | |
|---|---|---|
| AU | 2010294467 A1 | 3/2012 |
| DE | 10 2004 056 553 A1 | 5/2006 |
| DE | 10 2007 029 204 A1 | 1/2009 |
| DE | 10 2008 029 638 A1 | 12/2009 |
| EP | 0 059 056 A1 | 9/1982 |
| EP | 0 279 526 A2 | 8/1988 |
| EP | 0 723 501 B1 | 7/1996 |
| EP | 0 724 519 | 8/1996 |
| EP | 0 860 298 A2 | 8/1998 |
| EP | 1 398 174 A1 | 3/2004 |
| EP | 1 897 700 A2 | 3/2008 |
| EP | 1953002 A2 | 8/2008 |
| GB | 1 407 065 | 9/1975 |
| JP | H1035083 A | 2/1998 |
| JP | A-2001-26175 | 1/2001 |
| JP | 2003-039583 A | 2/2003 |
| JP | A-2004-317636 | 11/2004 |
| JP | 2005-007593 A | 1/2005 |
| JP | 2 581 142 A1 | 3/2006 |
| JP | 2008-012870 A | 1/2008 |
| JP | A-2008-513816 | 5/2008 |
| JP | 2008-529851 A | 8/2008 |
| JP | A-2009-086210 | 4/2009 |
| JP | A-2009-536885 | 10/2009 |
| JP | 2009-262375 A | 11/2009 |
| JP | A-2009-541873 | 11/2009 |
| JP | A-2009-543138 | 12/2009 |
| JP | 2013-504451 A | 2/2013 |
| WO | WO 83/00659 A1 | 3/1983 |
| WO | WO 94/27254 A1 | 11/1994 |
| WO | WO 00/39391 A1 | 7/2000 |
| WO | WO 01/23943 A1 | 4/2001 |
| WO | WO 03/054297 A2 | 7/2003 |
| WO | WO 03/091952 A2 | 11/2003 |
| WO | WO 03/091953 A2 | 11/2003 |
| WO | WO 03/095188 A2 | 11/2003 |
| WO | WO 2005/052650 A2 | 6/2005 |
| WO | WO 2005/106601 A2 | 11/2005 |
| WO | 2006/087138 A1 | 8/2006 |
| WO | WO 2006/125224 A2 | 11/2006 |
| WO | WO 2007/133613 A2 | 11/2007 |
| WO | 2008/000351 A2 | 1/2008 |
| WO | WO 2008/000351 A2 | 1/2008 |
| WO | WO 2008/008635 A2 | 1/2008 |
| WO | WO-2009000528 A1 * | 12/2008 ............. G02B 27/60 |
| WO | WO 2009/121578 A2 | 10/2009 |
| WO | WO 2009/139396 A1 | 11/2009 |
| WO | WO 2009156079 A1 * | 12/2009 |
| WO | 2010/015382 A2 | 2/2010 |
| WO | 2010/057832 A1 | 5/2010 |
| WO | 2011/029602 A2 | 3/2011 |
| WO | 2011/051904 A1 | 5/2011 |

OTHER PUBLICATIONS

Jun. 27, 2011 International Search Report issued in International Application No. PCT/GB2011/050407.
Jun. 7, 2011 International Search Report issued in International Application No. PCT/GB2011/050399.
Jun. 10, 2011 International Search Report issued in International Application No. PCT/GB2011/050398.
Jun. 30, 2011 International Search Report issued in International Application No. PCT/GB2011/050404.
U.S. Appl. No. 13/580,730 filed in the name of Holmes, Oct. 24, 2012.
U.S. Appl. No. 13/580,837 filed in the name of Holmes, Oct. 24, 2012.
U.S. Appl. No. 13/580,797 filed in the name of Holmes, Oct. 24, 2012.
Oct. 29, 2013 Office Action issued in Japanese Patent Application No. 2012-555490 (with translation).
Oct. 29, 2013 Office Action issued in Japanese Patent Application No. 2012-555491 (with translation).
Jun. 10, 2014 Office Action issued in U.S. Appl. No. 13/580,837.
Mar. 11, 2015 Office Action issued in U.S. Appl. No. 13/580,730.
Nov. 5, 2014 Office Action issued in U.S. Appl. No. 13/580,797.
Nov. 6, 2014 Office Action issued in U.S. Appl. No. 13/580,730.
Jan. 6, 2015 Office Action issued in Japanese Patent Application No. 2012-555489.
Jan. 6, 2015 Office Action issued in Japanese Patent Application No. 2012-555488.
H. Kamal et al., "Properties of moire magnifiers," Optical Engineering 37 (ii), pp. 3007-3014, Nov. 1998.
R. Steenblik et al., "Unison™ Micro-optic Security Film," Proceedings of SPIE-IS & T Electronic Imaging, SPIE vol. 5310, pp. 321-327, Jan. 2004.

* cited by examiner

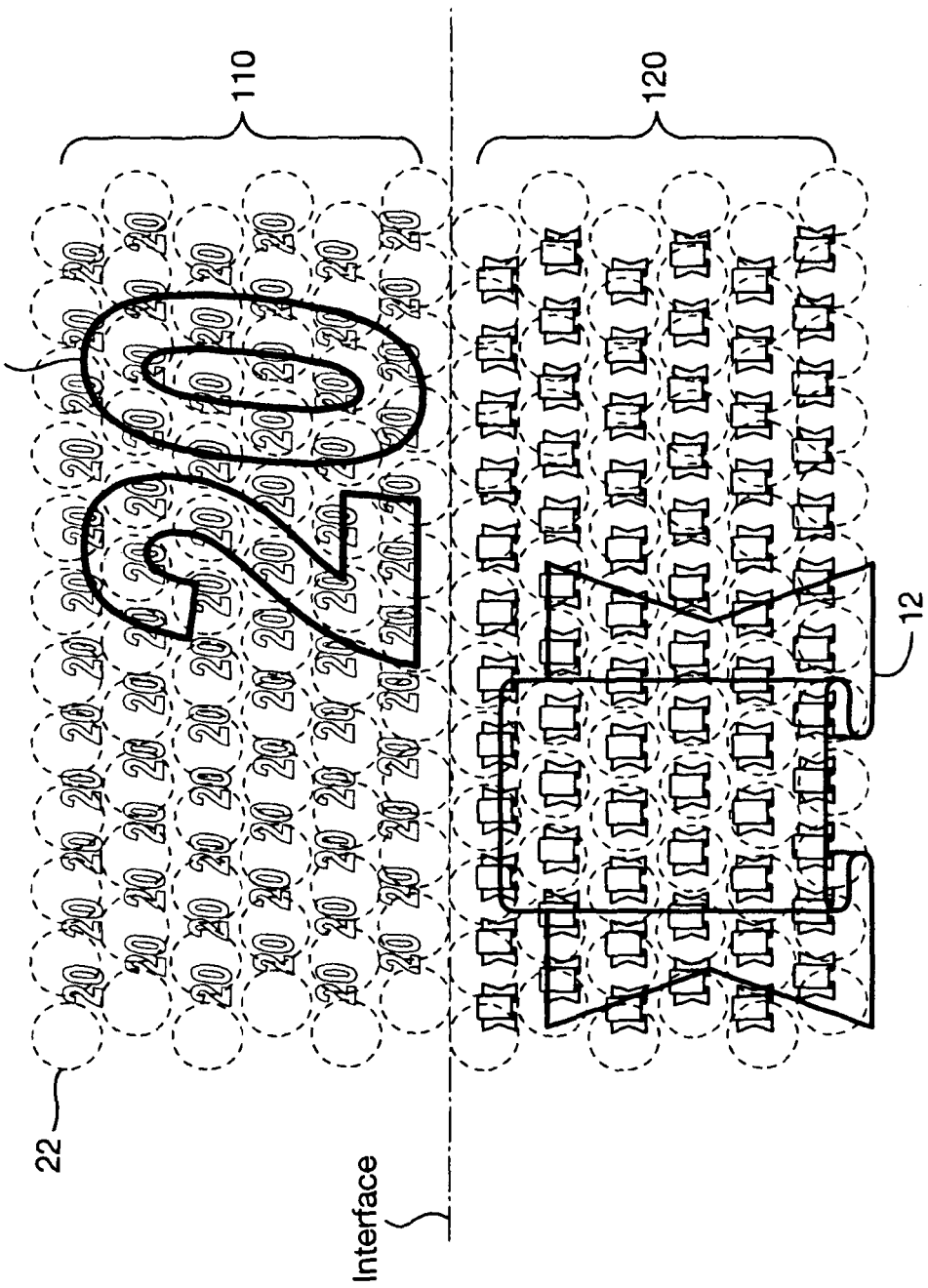

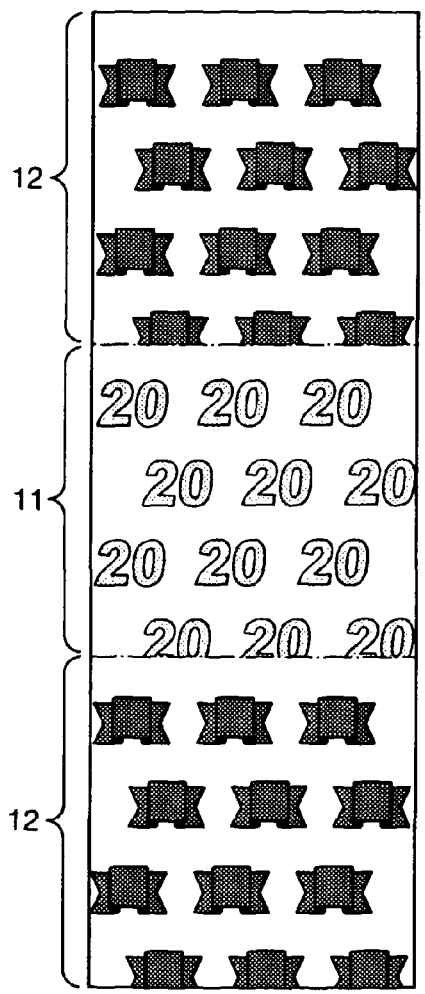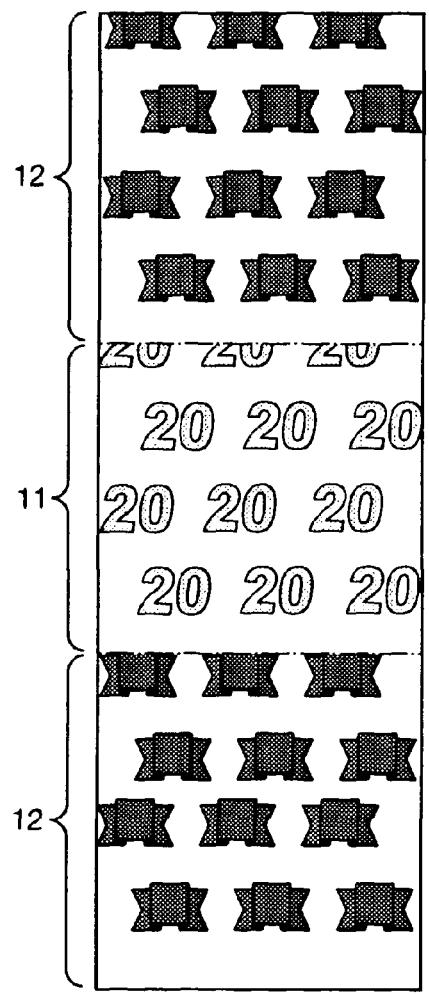

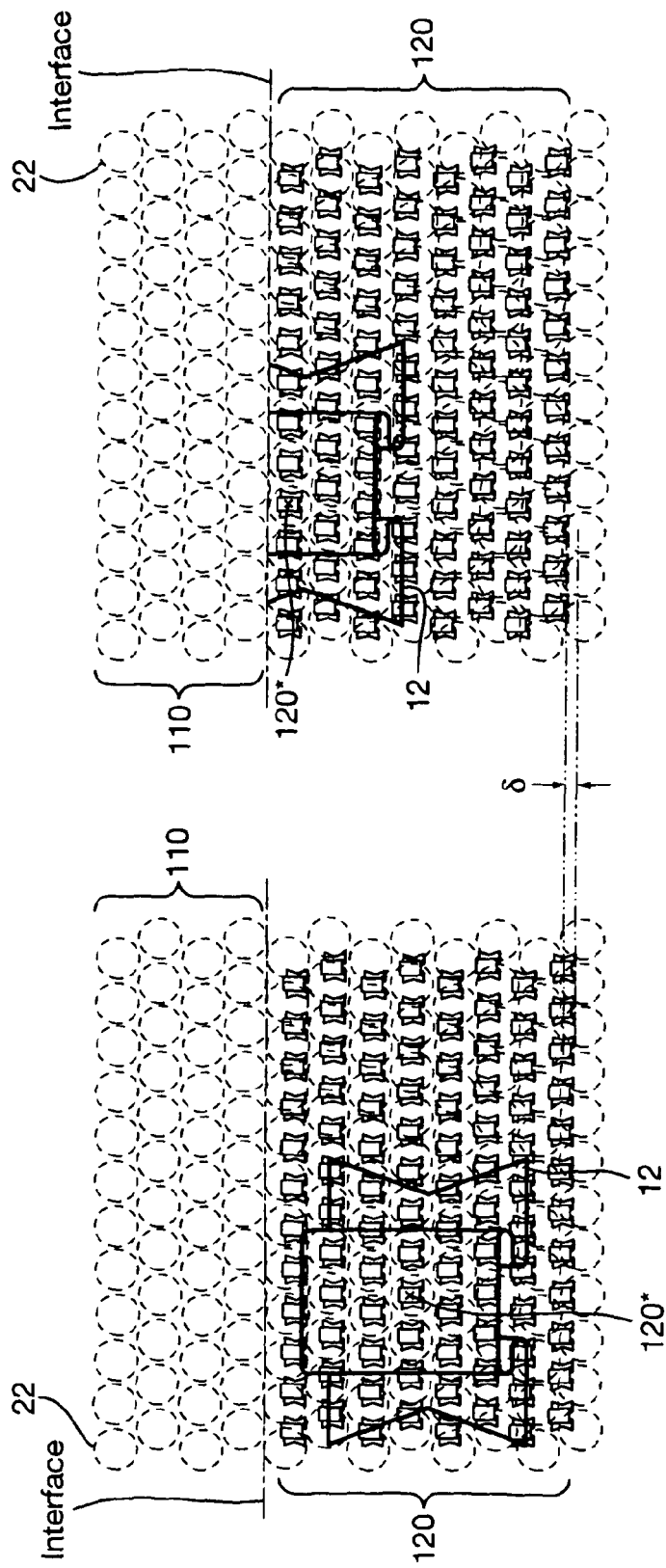

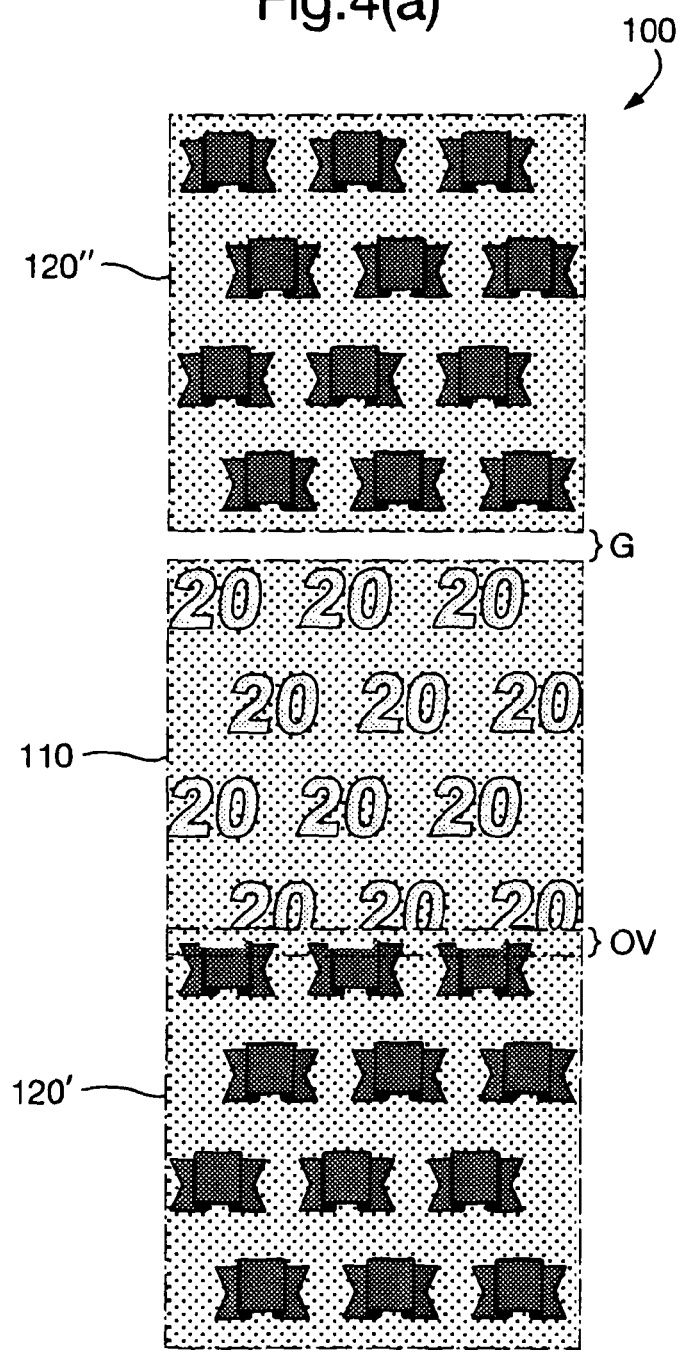

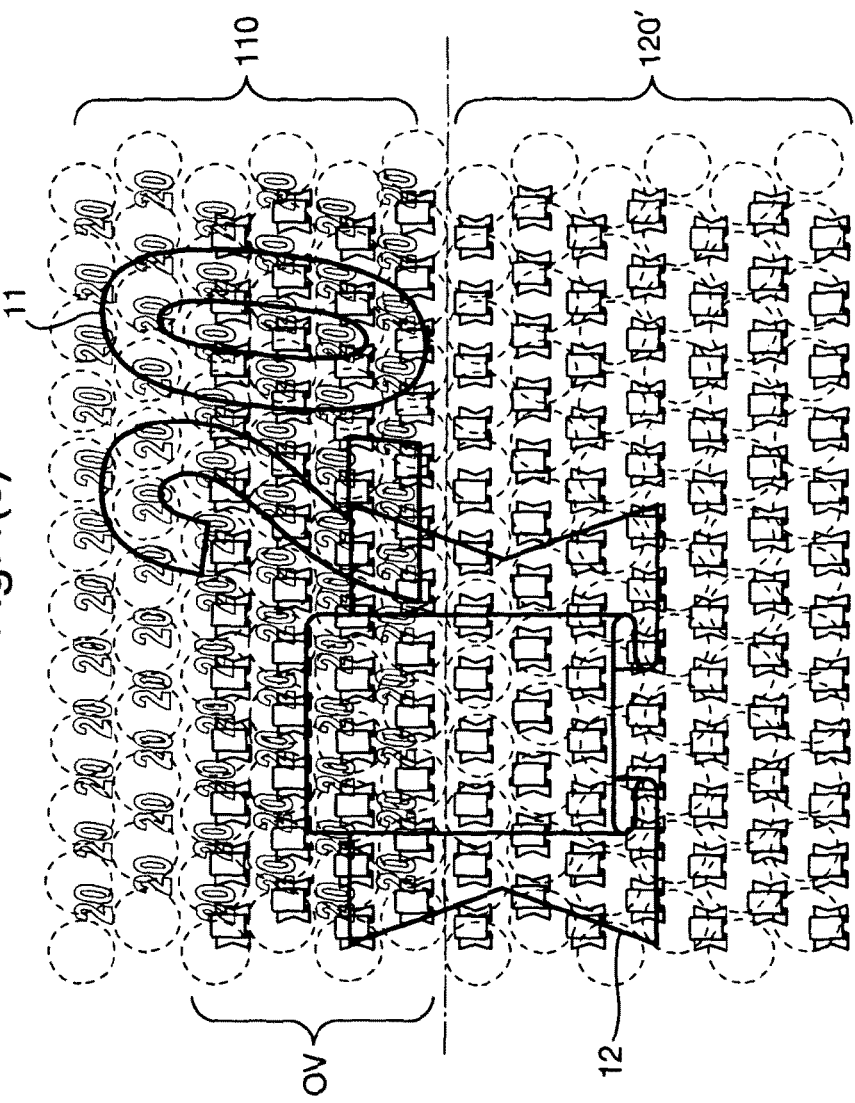

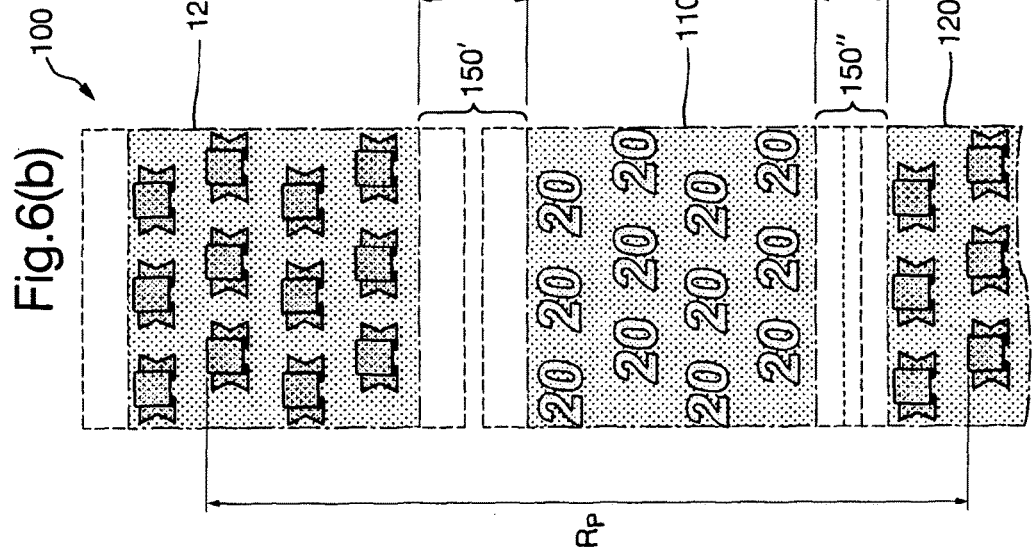
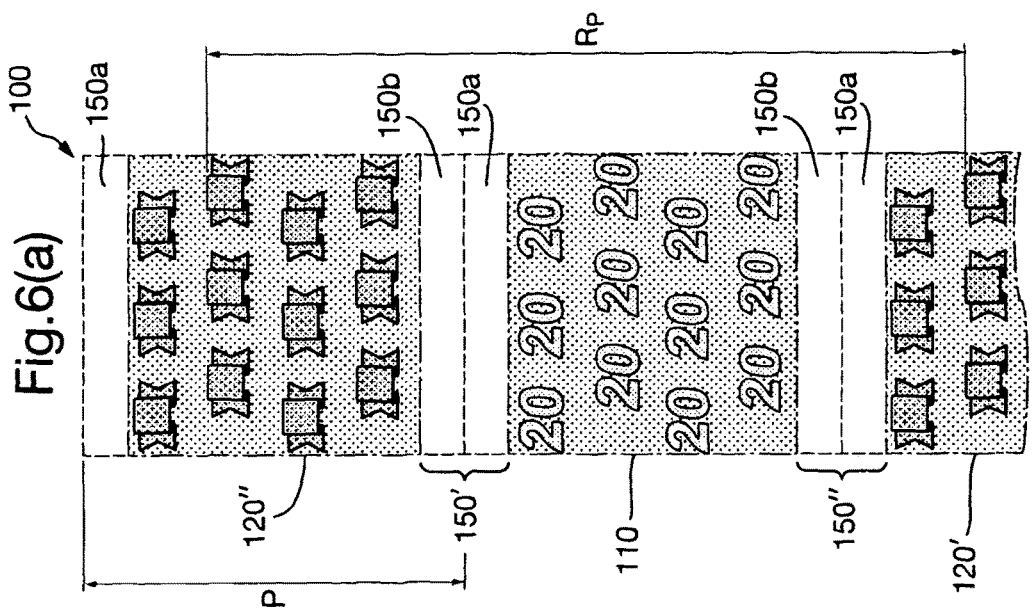

Example: ξ = 0    Example: ξ = 0    Example: ξ = 0

Σ = 0    Σ = 2Δ↓    Σ = 2Δ↓

Example: $\xi = 0.6$ $\Sigma = 0$

Example: $\xi = 0.6$ $\Sigma = 0.5\Delta\!\uparrow$

Example: $\xi = 0.6$ $\Sigma = 0.5\Delta\!\uparrow$

| Fig.9(a) | Fig.9(b) | Fig.9(c) |
|---|---|---|
| Example: ξ = 0.82 | Example: ξ = 0.82 | Example: ξ = 0.82 |
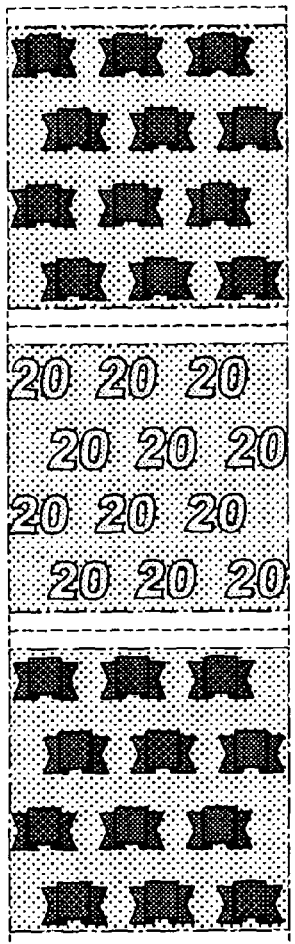 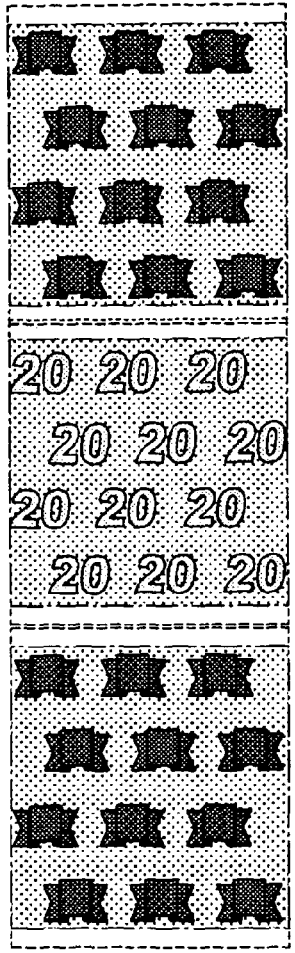 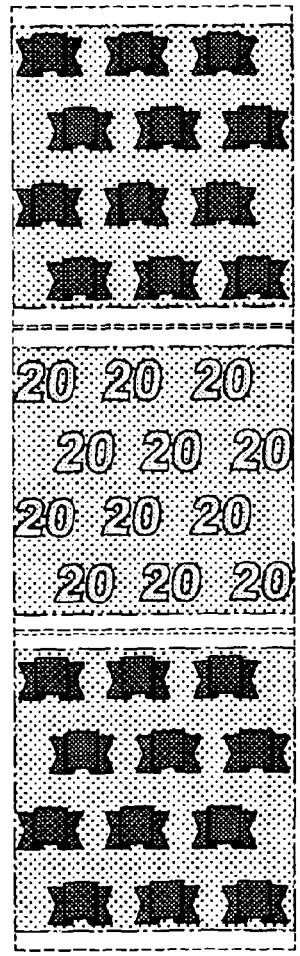
| Σ = 0 | Σ = 0.2Δ ↓ | Σ = 0.2Δ ↑ |
|---|---|---|

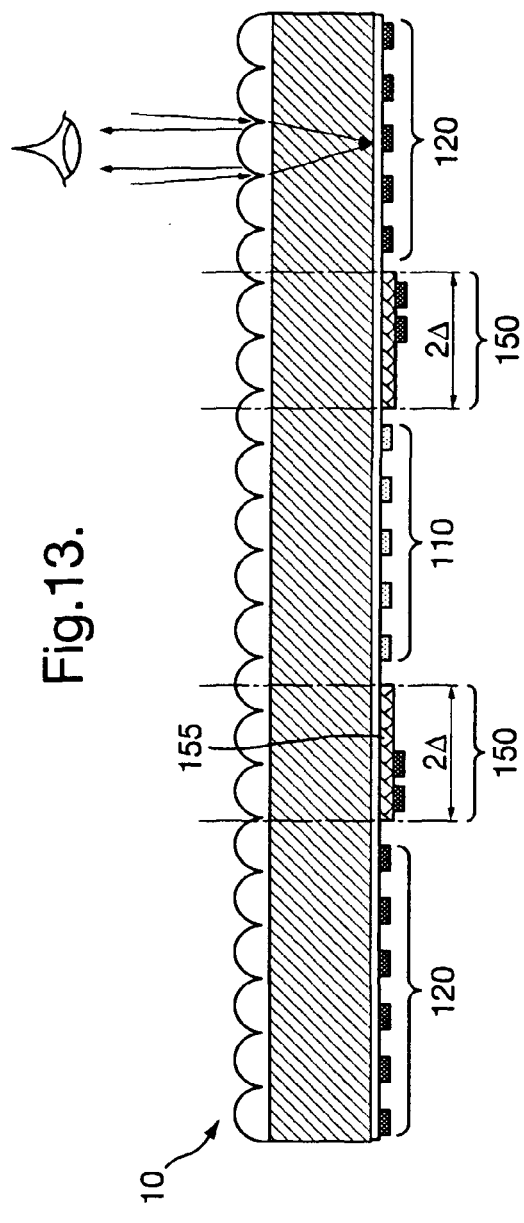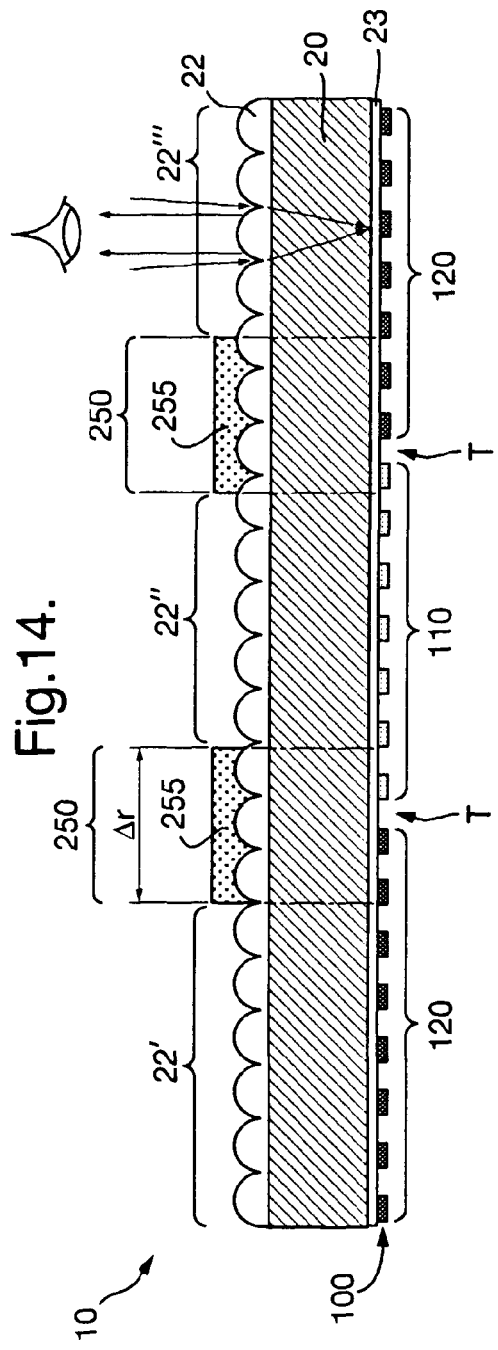

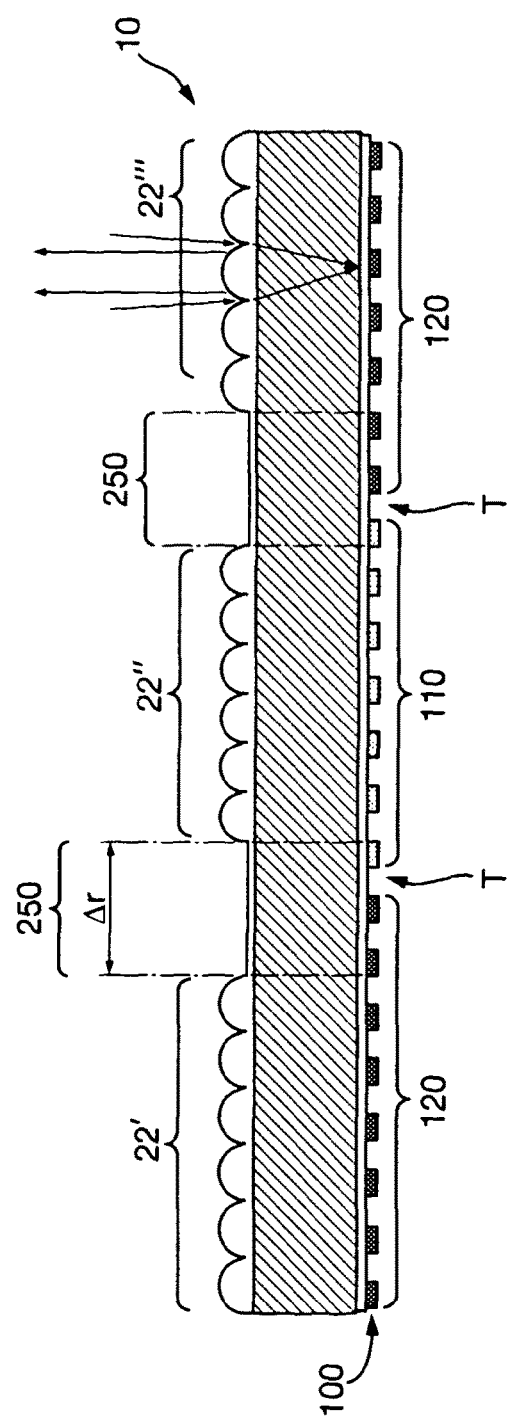

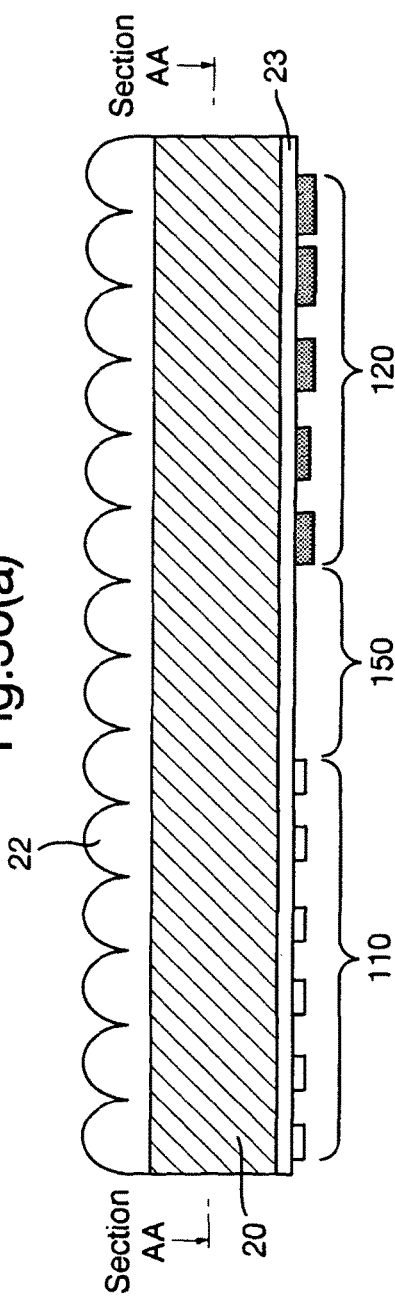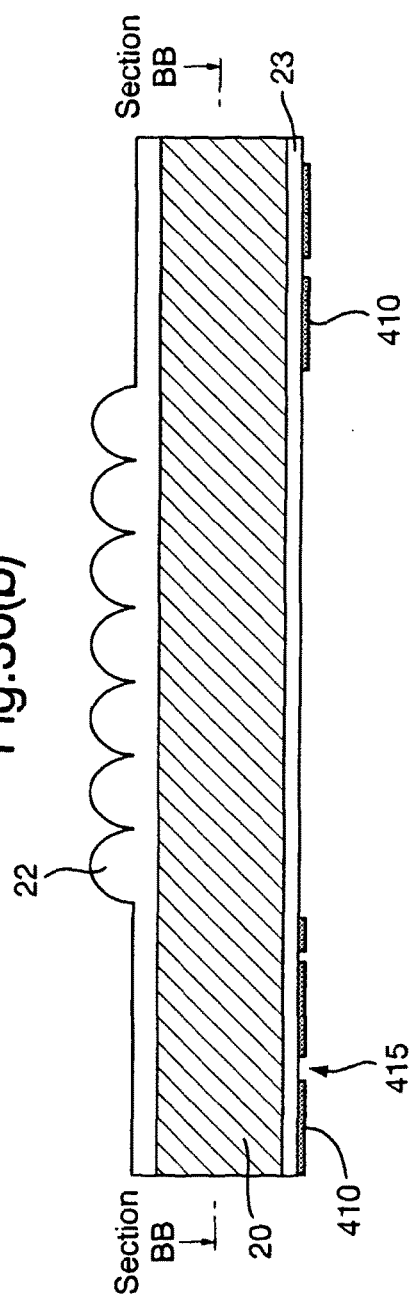

MOIRE MAGNIFICATION DEVICE

The invention relates to a moiré magnification device such as a security device, for example for use on security documents and other articles of value such as banknotes, cheques, passports, identity cards, certificates of authenticity, fiscal stamps and other documents for securing value or personal identity. It also relates to optical devices for use on packaging or the like.

Moiré magnification has been used as the basis of security devices for a number of years. A number of examples are described in WO-A-94/27254 and EP-A-1695121. In such a device, a regular array of micro-focusing elements defining a focal plane is provided over a corresponding array of image elements located in a plane substantially aligned with the focal plane of the focusing elements. The pitch or periodicity of the array of image elements is chosen to differ by a small factor from the pitch or periodicity of the focusing elements and this mismatch means that magnified versions of the image elements are generated.

The magnification factor depends upon the difference between the periodicities or pitches. A pitch mismatch between a microlens array and a microimage array can also conveniently be generated by rotating the microimage array relative to the microlens array or vice-versa, such that the microlens array and microimage array have a rotational misalignment. The rotational misalignment or the small pitch mismatch results in the eye observing a different part of the image in each neighbouring lens resulting in a magnified image. If the eye is then moved relative to the lens/image array a different part of the image is observed giving the impression that the image is in a different position. If the eye is moved in a smooth manner a series of images are observed giving rise to the impression that the image is moving relative to the surface. In the case where the pitch mismatch is generated by rotational misalignment the array of magnified images is rotated relative to the microimage array and consequently the parallax affect that results in the apparent movement of the magnified image is also rotated and this is known as skew parallax. The effect of pitch mismatch and rotational misalignment on the magnification and rotation of the magnified image observed in a moiré magnifier is described in "The Moiré Magnifier", M. Hutley, R Hunt, R F Stevens and P Savander, Pure Appl. Opt. 3 (1994) 133-142 published by IOP Publishing Limited.

The nature of the movement and orientation changes can be explained from the theory of moiré; this is discussed in detail in "The theory of the Moiré phenomenon" by I. Amidror published by Kluiver Academic Publishers in 2000, ISBN 0-7923-5949-6. The moiré effect of two periodic structures can be explained/predicted by considering the frequency vectors of the two structures. The orientation of the frequency vector represents the direction of the periodicity and the length represents the frequency (i.e. 1/Period). The vector is expressed by its Cartesian coordinates (u,v) where u and v are the horizontal and vertical components of the frequency.

The principles involved are discussed in more detail in WO-A-2005/106601.

Typically, the focusing elements comprise microlenses or micromirrors and the image elements are defined by simple icons or the like.

It is also known to provide multiple images in a moiré magnifying device. For example, WO-A-94/27254 illustrates an image switch effect on tilting a device. WO-A-2005/106601 describes how two magnified image sets can be caused to move at different rates as the device is tilted. Another example is described in WO-A-2009/139396.

One problem with the known devices, however, is that it is very difficult to achieve multicolour effects in which two or more images are obtained in different colours. This is primarily because the difficulty of printing two microimage arrays in mutual register with one another but in different colours since this would conventionally require separate print runs.

In accordance with a first aspect of the present invention, a moiré magnification device comprises a transparent substrate carrying:

i) a regular array of micro-focusing elements on a first surface, the focusing elements defining a focal plane;

ii) a corresponding first array of microimage elements in a first colour and located in a plane substantially coincident with the focal plane of the focusing elements; and, iii) a corresponding second array of microimage elements, in a second colour different from the first colour, and located in a plane substantially coincident with the focal plane of the focusing elements, the second array of microimage elements being laterally offset from the first, wherein the pitches of the micro-focusing elements and first and second arrays of microimage elements and their relative locations are such that the array of micro-focusing elements cooperates with each of the first and second arrays of microimage elements to generate respective magnified versions of the microimage elements of each array due to the moiré effect and such that an interruption zone of non-zero width is perceived between the between the magnified version of the first microimage array and the magnified version of the second microimage array, the interruption zone exhibiting no magnified version of either microimage array.

By arranging the different coloured microimage elements in two different, laterally offsetarrays, and arranging for an interruption zone to be perceived between the two magnified versions of the arrays, the optically distracting effects arising from lateral mis-register +/−Σ between the two colours can be controlled and reduced to an acceptable level or eliminated entirely. As such, the device provides a multi-coloured appearance which gives a strong, instantly recognisable visual effect. The device is therefore particularly well suited for use as a security device (e.g. for attesting to the authenticity of an article), since the visual effect is strongly apparent, easily described and can readily be distinguished from forgery attempts. The device also provides an enhanced decorative quality.

The interruption zone can be generated in a number of ways. It should be noted that, depending on how the interruption zone is generated, the laterally offset microelement arrays themselves may or may not partially overlap one another. However, in a preferred first implementation, the first array of microimage elements is laterally spaced from the second array of microimage elements by a boundary region of non-zero width which is free of microimage elements, thereby giving rise to an intentional zone perceived by the viewer.

Advantageously, the width of the microimage element-free boundary region is greater than the largest repeat distance of either microimage element array in the direction transverse to the boundary region. In particularly preferred cases, where registration errors Σ of a scale readily visible to the naked eye (e.g. greater than about 75 to 100 microns) are to be addressed, the width of the microimage element-free boundary region is greater than a registration error Σ of the first microimage element array relative to the second microimage element array. Advantageously, the boundary region width is several factors greater than the registration error. Most preferably, the width of the microimage element-free boundary region is designed to have a width 2Δ (a "design width") substantially satisfying the expression:

$$\frac{(2\Delta - \sum)}{(2\Delta + \sum)} = \xi \geq 0.8$$

In examples where the device includes two such boundary regions either side of a microimage element array, this criterion ensures that the boundary regions appear substantially symmetric or at least similar to one another, to the observer.

Where the registration error is smaller than the human eye can readily resolve (e.g. Σ≤~50 to 100 microns), the design width 2Δ of the microimage element-free boundary region is preferably greater than or equal to about 0.5Σ. For example, it may be more visually advantageous to ensure that the width of the boundary zone approximates to the value of the registration error, e.g. 2Δ≈Σ.

The registration error Σ is associated with the manufacturing process through which the microimage elements are to be formed, e.g. printing. Typically Σ is a measure of the process's average maximum registration error (which may be determined empirically or may be known).

In preferred examples, the width of the microimage element-free boundary region is between 25 and 3000 microns, the lower limit of that range preferably being 50 microns, more preferably 100 microns, the upper limit of that range preferably being 1500 microns, more preferably 1000 microns, still preferably 300 microns, most preferably 150 microns.

The microimage element-free boundary region could be clear but in preferred examples carries an interruption layer, the interruption layer preferably taking the form of a uniform or patterned printing or coating. It is particularly advantageous if the interruption layer is disposed between the substrate and at least one of the first and second arrays of microimage elements. The interruption layer can be provided with a covert security feature if desired, preferably a graphic for viewing under low power magnification.

In another preferred implementation, the interruption zone can be generated instead through modification of the micro-focussing element array. In this case there is no restriction on how the microimage arrays are arranged and they could partially overlap one another. Preferably, the regular array of micro-focusing elements comprises first and second regular arrays of micro-focusing elements laterally spaced from one another by a boundary region of non-zero width which is free of functioning micro-focusing elements, the boundary region being aligned with the transition between the first array of microimage elements and the second, thereby giving rise to the interruption zone perceived by the viewer. This may be used as an alternative to providing a boundary zone between the microimage element arrays, or in addition.

Preferably, the width of the micro-focusing element-free boundary region is greater than the largest dimension of the individual micro-focusing elements. Alternatively or in addition, the width of the micro-focusing element-free boundary region is greater than the maximum pitch of either of the micro-focusing element arrays. In a particular preferred example, the width Δr of the micro-focusing element-free boundary region is greater than a registration error Σ of the first microimage element array relative to the second microimage element array. Advantageously, the width Δr of the micro-focusing element-free boundary region is calculated according to the expression:

$$\Delta r \geq 2(\Sigma + \delta)$$

where δ is the registration error of the micro-focusing element arrays relative to the first and second microimage arrays.

In particularly preferred examples, the width of the micro-focusing element-free boundary region is between 25 and 3000 microns, the lower limit of that range preferably being 50 microns, more preferably 100 microns, the upper limit of that range preferably being 1500 microns, more preferably 1000 microns, still preferably 300 microns, most preferably 150 microns.

The boundary region in the micro-focussing element array can be formed in a number of ways. In one preferred implementation, the micro-focusing element-free boundary region comprises a layer of material formed on micro-focusing elements in that region, the material being of substantially the same refractive index as that of the micro-focusing elements, such that the micro-focusing elements in the boundary region are non-functional. Alternatively, the micro-focusing element-free boundary region may comprise a region devoid of micro-focusing elements.

The interruption zone (and hence the boundary region in the microimage and/or or micro focussing element arrays) may be straight (e.g. rectangular) but this is not essential. Preferably, the interruption zone is rectilinear, curvilinear, sinusoidal, square-wave or stepped. "Interlocking" zone configurations in which the two arrays remain in contact along one axis (but not the other) are possible since generally register can be accurately maintained in the direction perpendicular to the direction of travel through the manufacturing process. What is important is that a boundary region exists between the adjacent arrays at least along one axis, which will usually be that axis parallel to the direction in which the substrate travels through the manufacturing process.

The magnified images of the first and second microimage arrays may be configured to lie in the same image plane (i.e. at the same "depth" behind or in front of the device's surface). However, in preferred examples, the pitch mismatch between the arrays is chosen such that the magnified version of the first microimage array appears above or below that of the second.

The visual effect of the device can be further increased by the provision of "background" or "foreground" images aligned with either or both of the existing arrays. Thus in a preferred example, the device further comprises a third array of microimage elements, located in a plane substantially coincident with the focal plane of the focusing elements, the third array of microimage elements at least partially overlapping the first and/or second arrays of microimage elements, wherein the pitches of the micro-focusing elements and third array of microimage elements and their relative locations are such that the array of micro-focusing elements cooperates with the third array of microimage elements to generate respective magnified versions of the microimage elements of the third array due to the moiré effect, and wherein the pitch mismatch between that of the third array and that of the micro-focusing element array is different from the pitch mismatch between that of the first array and that of the micro-focusing element array and/or from the pitch mismatch between that of the second array and that of the micro-focusing element array, such that the magnified versions of the microimage elements of the third array are perceived to lie on an image plane above or below those resulting from the first and/or second arrays.

The third array may be in a different colour from the first and/or second arrays, and may be formed in a separate working since there is no requirement to register the third array with the array(s) it overlaps.

The device could comprise solely the two laterally offset arrays (plus any overlapping arrays) described above. However, in preferred examples, the device extends beyond the two described arrays with one or further arrays on one or both sides of the two already described. Thus, preferably the device further comprises a further array of microimage elements, located in a plane substantially coincident with the focal plane of the focusing elements, the further array of microimage elements being laterally offset from the first and second arrays, wherein the pitches of the micro-focusing elements and further array of microimage elements and their relative locations are such that the array of micro-focusing elements cooperates with the further array of microimage elements to generate respective magnified versions of the microimage elements of the array due to the moiré effect and such that a further interruption zone of non-zero width is perceived between the between the magnified version of the first or second microimage array and the magnified version of the further microimage array, the interruption zone exhibiting no magnified version of any of the microimage arrays.

In particularly preferred examples, the arrays may alternate along the device—that is, the "further" array is identical to either the first or the second array (at least in colour). For example, in a particularly preferred embodiment, the device comprises a repeating/alternating pattern of the first array (termed "R") and the second coloured array (termed "B") with an optional common background colour (termed "G"), formed by a "third" microimage array overlapping both R and G. In the manufacturing process, the first two colour arrays/panels will alternately be printed on the web in one machine pass to give a lateral R,B,R,B,R,B alternation with the optional third background colour G being applied in a third machine pass. The R,B,R,B alternation will pass onto the security device itself—in one example the device might only present a R and B panel (typically if provided as a patch) or a R,B,R and perhaps part B colour pattern or vice versa (if provided in strip or thread format). In this example, the "further" array is identical to one of the first or second arrays, forming either one of the "R" repeats or one of the "B" repeats.

Nonetheless, it is also possible to add another ("further") laterally-spaced colour—for example, if the first and second are red and blue then the third might be yellow, thus in the manufacturing process (e.g. web printing) we may have three printing heads which in one machine pass print a lateral alternation of the R,B,Y,R,B,Y,R . . . micro image panels (any or all of which could also be provided with the aforementioned optional background, G). Thus, if the further array is of the same colour as the first or second array, it may be laid down in the same respective working. If the further array is of a different colour, it will be laid down in a separate working (but preferably still in the same machine pass).

Where the device includes an alternating series of arrays (as in the above two examples), each of the arrays (apart from those at the two ends of the series) are preferably separated by a boundary region from the arrays on both sides—i.e. each array is adjacent to two boundary regions.

The microimage elements of either array may typically comprise icons such as symbols, geometric figures, alphanumeric characters and the like and most preferably provide information. Alternatively, the microimage elements of one or more of the arrays could define a respective generic, typically substantially uniform background, preferably a line pattern, for example parallel (straight) lines, simple geometric figures, or complex line structures such as guilloche patterns.

In preferred examples, the microimage elements are printed on the substrate using any suitable printing process such as gravure, wet or dry lithographic printing, screen printing, intaglio printing and flexo printing. However, one or more of the arrays of microimage elements could also be formed as grating structures, recesses or other relief patterns on the substrate. Anti-reflection structures may also be used as described in WO-A-2005/106601.

Micro-focusing elements, such as microlenses or concave mirrors, are preferably formed by embossing into the substrate surface, cast-curing or the like. Preferably, the micro-focusing elements comprise microlenses such as spherical lenslets, cylindrical lenslets, plano-convex lenslets, double convex lenslets, fresnel lenslets and fresnel zone plates. Advantageously, each microlens has a diameter in the range 1 to 100 microns, preferably 1 to 50 microns and even more preferably 10 to 30 microns.

Moiré magnifiers generated by the current invention can be either 2-dimensional (2D) or 1-dimensional (1D) structures. 2D moiré magnification structures using spherical lenses are described in more detail in EP-A-1695121 and WO-A-94/27254. In a 2D moiré magnifier the microimages are magnified in all directions. In a 1D moiré magnification structure the spherical microlenses or micromirrors are replaced with a repeating arrangement of cylindrical microlenses or micromirrors. The result of this is that the microimage elements are subject to moiré magnification in one axis only which is the axis along which the mirrors exhibit their periodic variations in curvature or relief. Consequently the micro-images are strongly compressed or de-magnified along the magnification axis whilst the size or dimension of the micro image elements along the axis orthogonal to the magnification axis is substantially the same as they appear to the observer—i.e. no magnification or enlargement takes place.

The moiré magnifier generated by the current invention can form a security device by itself but could also be used in conjunction with other security features such as holograms, diffraction gratings and other optically variable effect generating structures.

The optical device of the current invention can be used to authenticate a variety of substrates—with the nature of the substrate, in particular its thickness and flexibility having an influence on the corresponding properties of the optical device.

The invention has particular value in protecting flexible substrates such as paper and in particular banknotes, where the device could define a patch, strip or thread. The thickness of the device will be influenced by how its employed within the banknote though to both avoid deformation of paper ream shape during the banknote printing process and further more the form and flexibility of the banknote itself, it is desirable that the thickness of the device does not exceed half of the thickness of the banknote itself (typically 85-120 um)—therefore it anticipated that in any embodiment the optical device will be less than 50 um including securing adhesives and preferably substantially so.

For example as a patch applied to a banknote the desired thickness will range from a few microns (excluding securing adhesive) to a maximum of 35-40 um (again excluding adhesive) for a label. Whilst for the case of a strip, the thickness will range again from a few micrometers for the case of a hot-stamped or transferred strip, up to 35-40 um for the case of a non transferred strip wherein the supporting carrier layer is retained (again excluding securing adhesives) as would be necessary should the strip be applied over a mechanical aperture in the banknote substrate.

In the case of a windowed thread preferred final thickness is in the range of 20-50 um.

Thicker versions of the security device (up to 300 μm) could be employed in applications which include passport paper pages, plastic passport covers, visas, identity cards, brand identification labels, anti-tamper labels—any visually authenticable items.

Furthermore, the device could be provided in a transparent window of a security document to enable it to be viewed in transmission.

In accordance with a second aspect of the invention, a method of manufacturing a moiré magnification device is provided. The method comprises, in any order:

a) forming a regular array of micro-focusing elements on a first surface of a transparent substrate, the focusing elements defining a focal plane;

b) forming on a second surface of the transparent substrate, in a first working, a corresponding first array of microimage elements in a first colour and located in a plane substantially coincident with the focal plane of the focusing elements; and, c) forming on the second surface of the transparent substrate, in a second working, a corresponding second array of microimage elements, in a second colour different from the first colour, and located in a plane substantially coincident with the focal plane of the focusing elements, the second array of microimage elements being laterally offset from the first, wherein the pitches of the micro-focusing elements and first and second arrays of microimage elements and their relative locations are such that the array of micro-focusing elements cooperates with each of the first and second arrays of microimage elements to generate respective magnified versions of the microimage elements of each array due to the moiré effect.

Thus the method results in a multi-coloured device with a correspondingly strong visual impact which, as discussed above, increases the security level of the device. The interfaces between the adjacent images resulting from the microimage arrays can be dealt with in a number of ways. It should be noted that, depending on the technique employed, the laterally offset microimage arrays may or may not partially overlap one another.

In a first example, the maximum error in register ($\Sigma$) between the first and second workings is no greater than 100 microns, preferably no greater than 75 microns, more preferably no greater than 50 microns, In this way, any interference of the magnified images arising from overlap of the first and second microimage element arrays will fall below the visualisation threshold and, from the perspective of the viewer, the arrays are to all intents registered. As such, under these conditions, an interruption zone between the image panels is not required. The inventors have devised apparatus by which this is achievable, as discussed further below. Alternatively or in addition, the pitches of the micro-focus-ing elements and first and second arrays of microimage elements and their relative locations may be such that the device displays an interruption zone of non-zero width between the between the magnified version of the first microimage array and the magnified version of the second microimage array, the interruption zone exhibiting no magnified version of either microimage array. This corresponds to the interruption zone discussed above with respect to the first aspect of the invention.

As noted above the interruption zone can be generated by incorporating a boundary region between the microimage arrays or by modification of the microfocussing element array (or both). Hence in one preferred method, the first and second arrays of microimage elements are formed on the substrate in accordance with a design template defining the desired locations of the microimage elements in each array, the design template including a boundary region of non-zero design width $2\Delta$ which is free of microimage elements between the first and second arrays of microimage elements, which once the arrays are formed on the substrate is manifested as a boundary region giving rise to the interruption zone perceived by the viewer, where the formed boundary region has a width ($2\Delta+/-\Sigma$), where $\Sigma$ is a registration error of the first microimage element array relative to the second microimage element array associated with forming the arrays in steps (b) and (c).

For example, in an embodiment in which the two arrays alternate along the device, each microimage array is contained within two respective boundary zones of design width $2\Delta$—however due to inter microimage element array register variation $\Sigma$, in practice one boundary region will increase to ($2\Delta+\Sigma$), whilst the other will decrease to ($2\Delta-\Sigma$), so as to preserve the micro image array repeat distance.

Preferably, the design width of the microimage element-free boundary region is greater than the largest dimension of the individual microimage elements and/or is greater than the maximum pitch of either of the microimage element arrays. Advantageously, the design width of the microimage element-free boundary region is greater than the registration error $\Sigma$. In particularly preferred examples, for values of $\Sigma \geq 100$ microns (or, more preferably in some cases $\Sigma \geq 150$ microns), the design width $2\Delta$ of the microimage element-free boundary region is calculated according to the expression:

$$\frac{(2\Delta - \sum)}{(2\Delta + \sum)} = \xi \geq 0.8$$

For values of $\Sigma \leq 100$ microns, the width $2\Delta$ of the microimage element-free boundary region is preferably greater than or equal to $0.5\Sigma$, more preferably at least $\Sigma$. This more relaxed criterion for registration error of 100 um or less is due to the fact that, at such small dimensions, the human eye will typically fail to notice the interruption. As such, if it struggles to notice interruption then we need to be less concerned about symmetry of void between panels. Another important factor is the visual contrast of the boundary region—in most moiré magnifiers, the magnified image elements are characteristically dark in colour against a light background to maximise image contrast. Since the background space between images (the image "canvas") is an image void, it therefore follows that a boundary region void of microimages will appear as a lower contrast feature when present against the background colour provided by adjacent image zones. As such, the boundary region will be unobtrusive and difficult to see. By contrast a region of overlap between the two arrays will be very dark in contrast (due to the increased microimage element coverage), which will stand out to the observer.

As already mentioned, at such low registration errors, the boundary region could alternatively be omitted entirely. For example, values of $\Sigma \leq 50$ um may be considered to be below the visualisation or perception threshold and thus the design width can be reduced to zero (i.e. the arrays are designed to abut one another) since any deleterious effects arising from the misregister and overlap of two arrays will create an overlap band too thin to resolve.

In preferred implementations, the design width of the microimage element-free boundary region is between 25 and 3000 microns, the lower limit of that range preferably being 50 microns, more preferably 100 microns, the upper limit of that range preferably being 1500 microns, more preferably 1000 microns, still preferably 300 microns, most preferably 150 microns.

As mentioned above, the boundary region can include an interruption layer. If so, it is preferable that the interruption layer is disposed on the substrate before at least one of the first and second arrays of microimage elements is formed. Advantageously, the interruption layer is formed in the same working as the formation of the first array of microimage elements, and before the formation of the second array.

If the interruption zone is to be generated through modification of the microfocussing element array, preferably step (a) of the method comprises forming first and second regular arrays of micro-focusing elements laterally spaced from one another by a boundary region of non-zero width $\Delta r$ which is free of functioning micro-focusing elements, the boundary region being aligned with the transition between the first array of microimage elements and the second, thereby giving rise to the interruption zone perceived by the viewer.

Preferably, the width of the micro-focusing element-free boundary region is greater than the largest dimension of the individual micro-focusing elements and/or greater than the maximum pitch of either of the micro-focusing element arrays. As before, the width $\Delta r$ of the micro-focusing element-free boundary region is preferably greater than the registration error $\Sigma$ of the first microimage element array relative to the second microimage element array. Advantageously, the width $\Delta r$ of the micro-focusing element-free boundary region is calculated according to the expression:

$$\Delta r \geq 2(\Sigma + \delta)$$

where $\delta$ is the registration error of the micro-focusing element arrays relative to the first and second microimage arrays.

The boundary layer in the micro-focussing element array can be formed using either of the techniques previously mentioned.

Again, the interruption zone need not be straight.

A third array of microimage elements may be provided overlapping one or other of the first and second arrays (or both), as previously described. Further laterally offset arrays may also be provided as mentioned above.

In particularly preferred implementations, in steps (b) and (c), the first and second microimage element arrays are formed sequentially using an apparatus comprising first and second online print stations, one downstream of the other, each of the print stations comprising a print roller having print elements arrayed on only a portion of its surface, preferably no more than half its surface.

Preferably the apparatus further comprises a path length adjustment unit adapted to adjust the path length between the first and second online print stations. Advantageously the path length adjustment unit comprises at least one tensioning roller for supporting the substrate web between the first and second print stations, the at least one tensioning roller being movable in a direction out of the plane of the web to thereby adjust the path length. In a particularly preferred implementation, the path length adjustment unit further comprises a detector, preferably a camera, downstream of the second print station, adapted to detect a distance between the first and second microimage element arrays, and a controller adapted to adjust the path length based on the detected distance. This achieves particularly accurate registration between the two arrays.

In accordance with a third aspect of the invention, a security document is provided which comprises a document substrate having at least two transparent or translucent windows spaced apart from one another, and a device comprising a transparent substrate carrying:

i) a regular array of micro-focusing elements on a first surface, the focusing elements defining a focal plane;

ii) a corresponding first array of microimage elements in a first colour and located in a plane substantially coincident with the focal plane of the focusing elements; and, iii) a corresponding second array of microimage elements, in a second colour different from the first colour, and located in a plane substantially coincident with the focal plane of the focusing elements, wherein at least a portion of the first array of microimage elements is not overlapped by the second, and at least a portion of the second array of microimage elements is not overlapped by the first;

and wherein the pitches of the micro-focusing elements and first and second arrays of microimage elements and their relative locations are such that the array of micro-focusing elements cooperates with each of the first and second arrays of microimage elements to generate respective magnified versions of the microimage elements of each array due to the moiré effect, the device being incorporated into or applied on to the document substrate in alignment with the at least two windows, the device being registered to the document substrate such that, the magnified version of the first microimage element array is visible through the first of the two windows and the magnified version of the second microimage element array is visible through the second of the two windows, the transition between the two microimage element arrays being concealed by the document substrate between the two windows.

This configuration provides the substantial benefit that the portion of the device where the magnified images of the two microimage element arrays approach one another (and possibly overlap, if there is no interruption zone and registration is poor) are not visible to the observer, being hidden by the document substrate. As such, it is no longer necessary to achieve accurate registration or to mitigate its effects through the use of an interruption zone. Therefore, the device incorporated into this aspect of the invention could, when viewed alone, display interference or other effects between the magnified versions of the two arrays (including overlap). Nonetheless, devices according to the first or second aspects of the invention could of course be used for this purpose.

Preferably, the device is in the form of a thread or insert embedded within the document substrate, the two windows being formed in the substrate on the same side of the thread or insert. The windows could be apertures or transparent portions of the substrate (e.g. polymer).

In another implementation, the device is in the form of a patch or stripe affixed to a surface of the document substrate, the two window s being formed through the full thickness of the substrate.

Preferably the device comprises at least first, second and third laterally spaced arrays of microimages and the document substrate having at least three corresponding windows, the microimages and as a result the visible magnified images alternating in terms of colour, symbol, pattern and/or orientation from one window to the next. In particularly preferred examples, the arrays alternate along the length of the device such that magnified panels of alternating colour are visible. The third array may be the same as the first array or could be different (e.g. different colour).

Some examples of security devices according to the invention will now be described with reference to the accompanying drawings, in which:—

FIGS. 3a and 3b illustrate the appearance of the device of FIG. 2a when tilted towards and away from the viewer respectively, FIG. 3c depicting a further portion of its microimage arrays with exemplary magnified images overlaid;

Figure 4B:
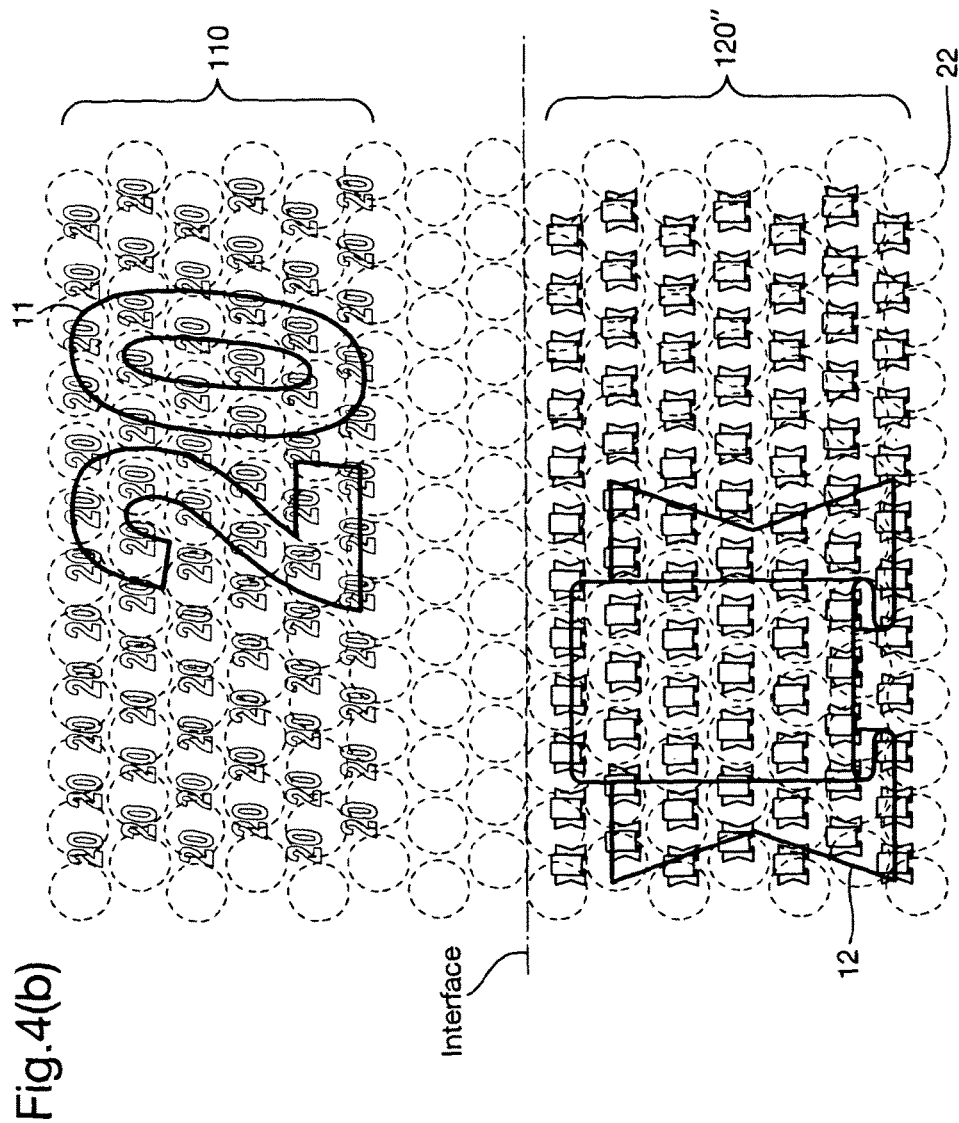
Figure 5B:
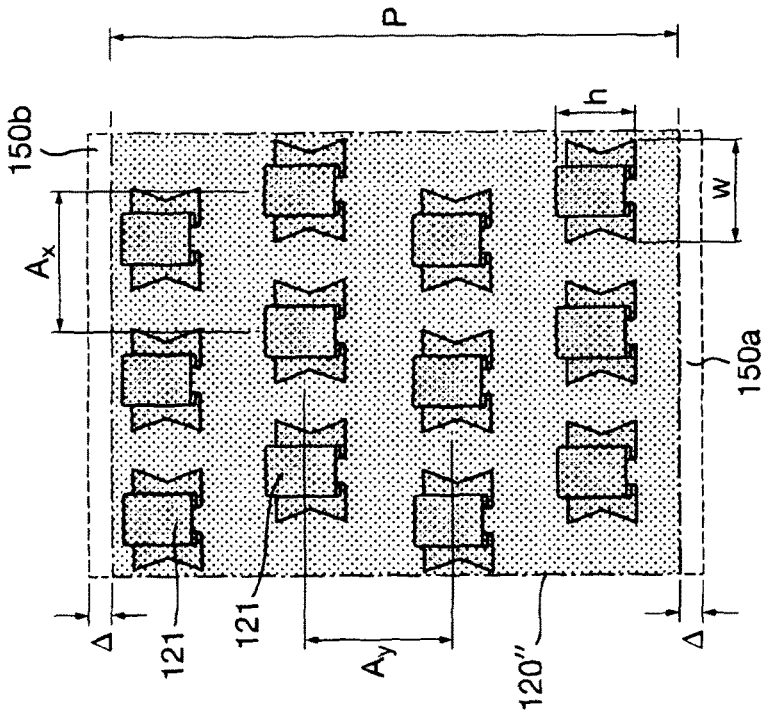
Figure 5A:
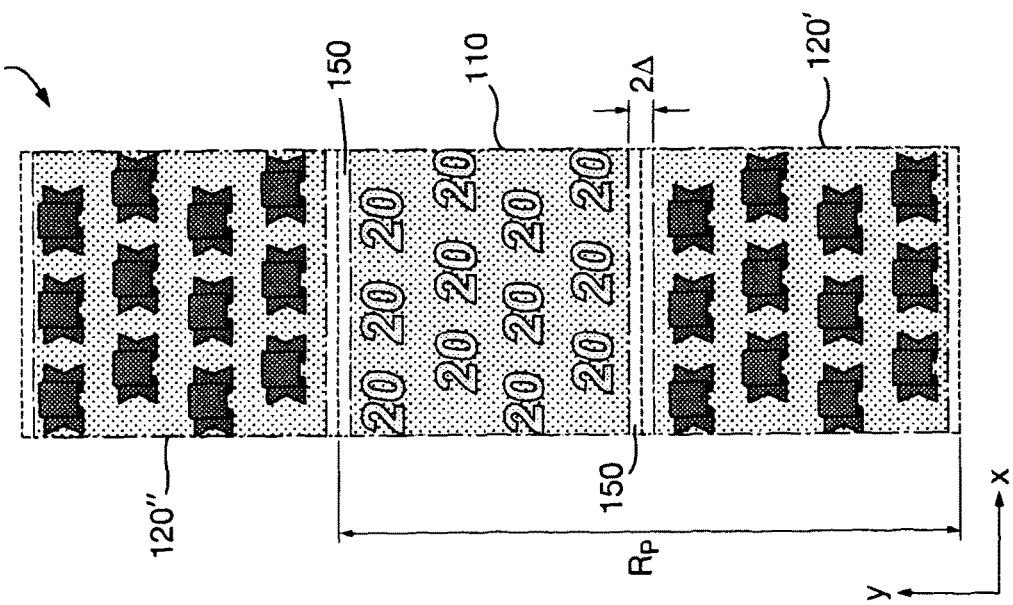
Figure 7A:
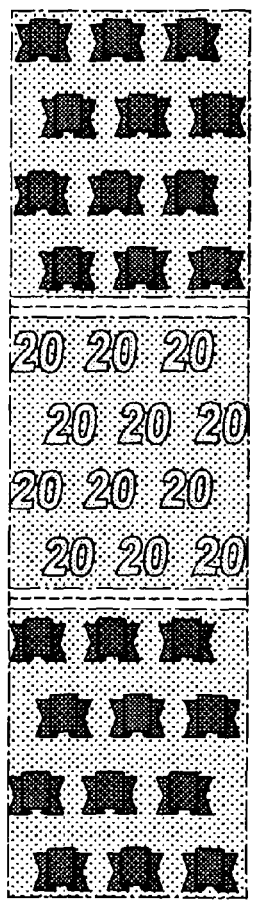
Figure 8A:
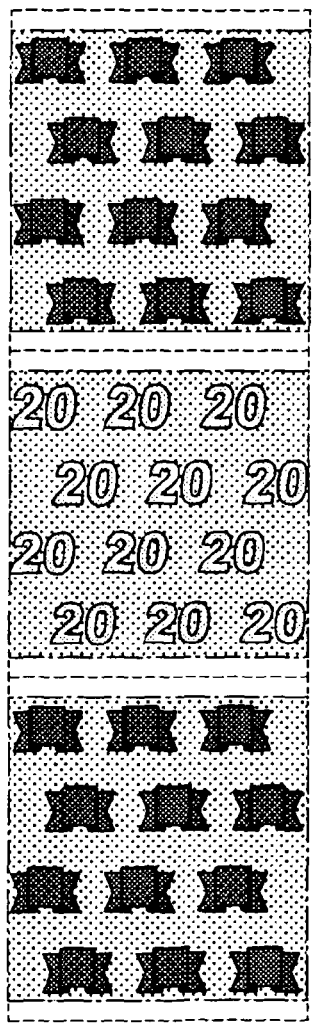
Figure 10:
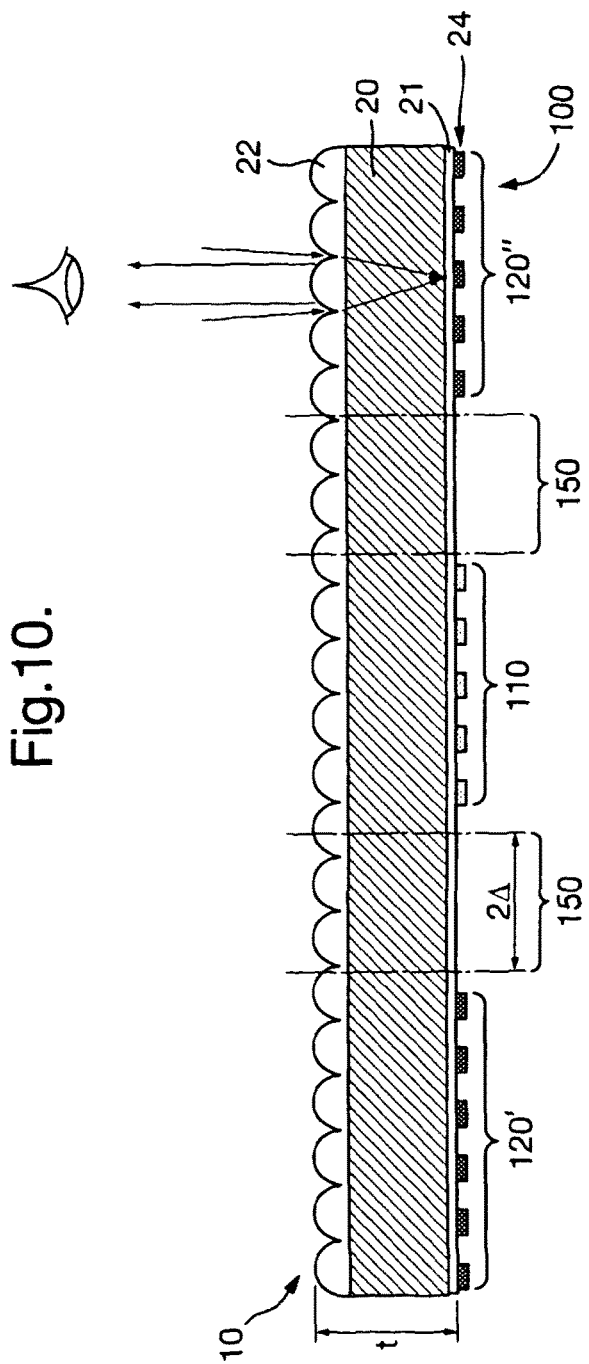
Figure 11:
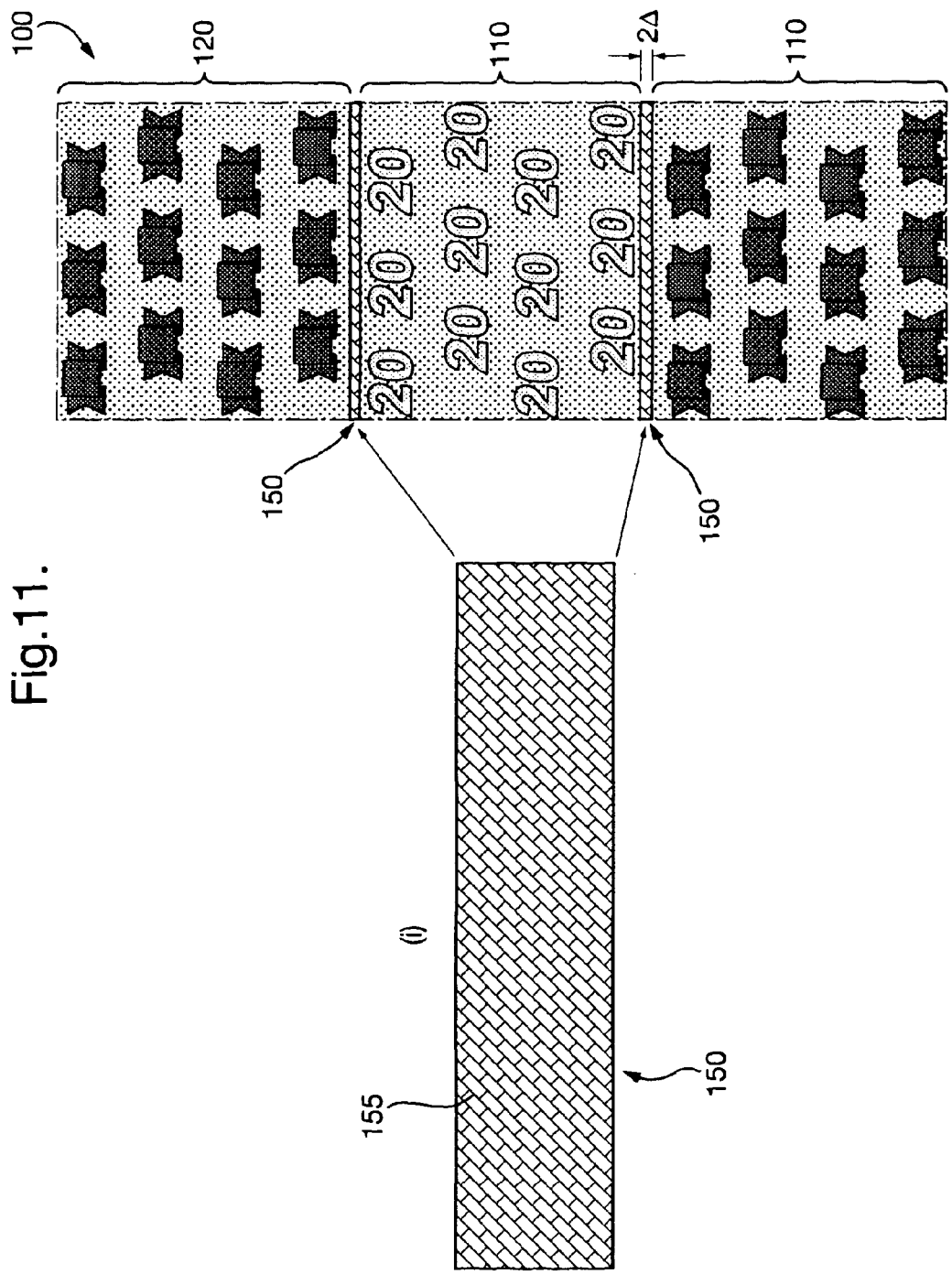
Figure 12:
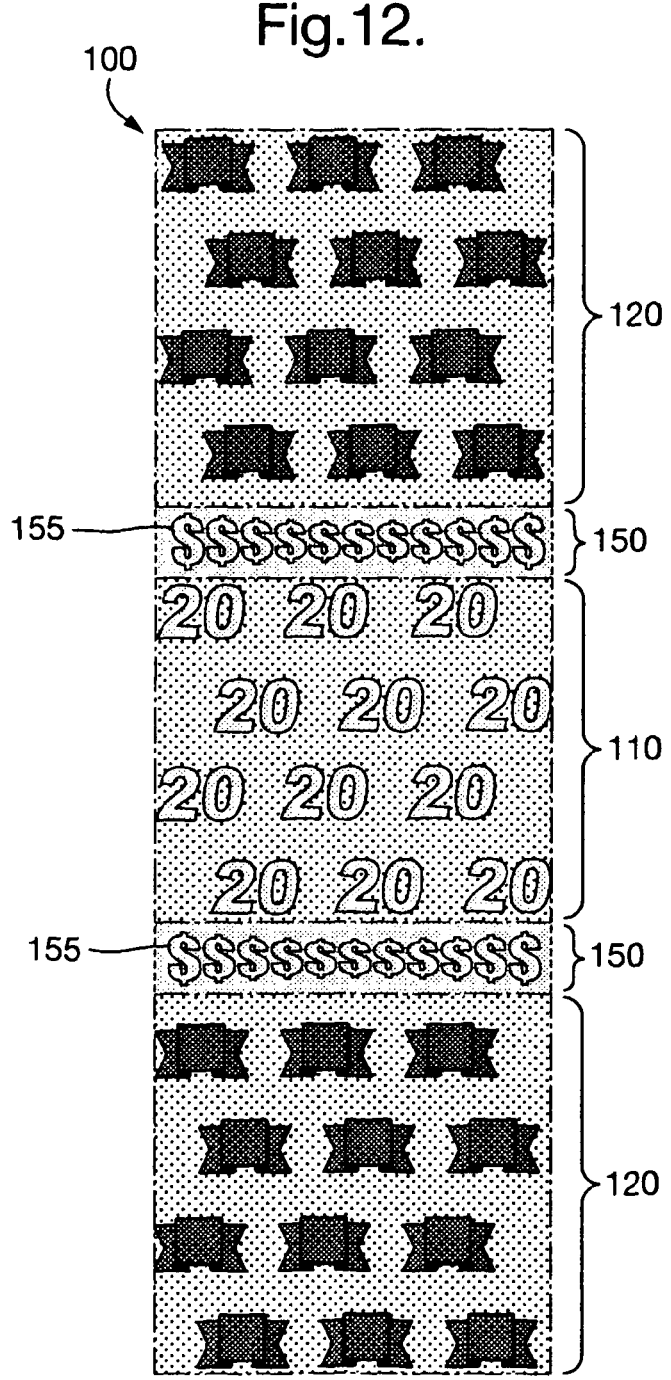
Figure 16:
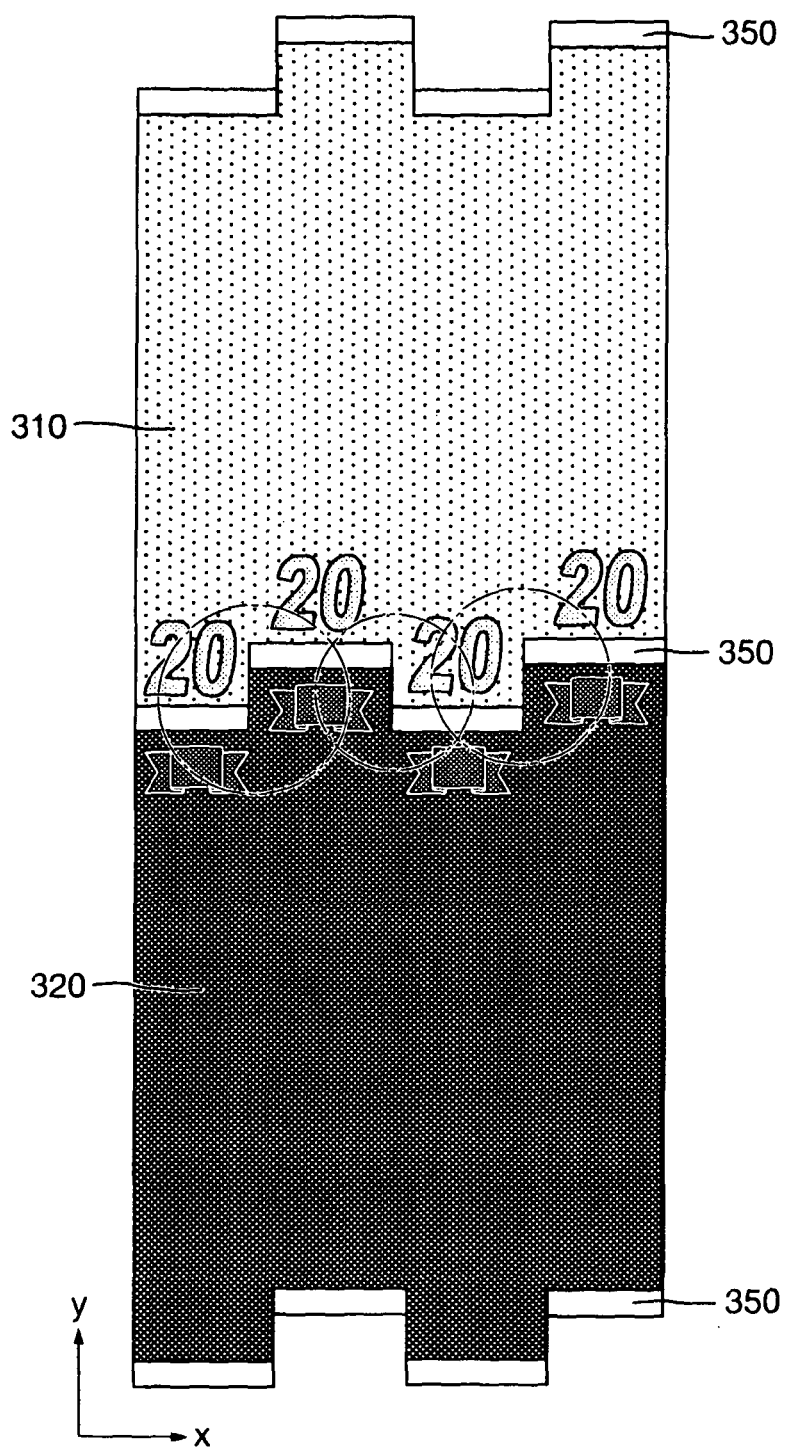
Figure 17:
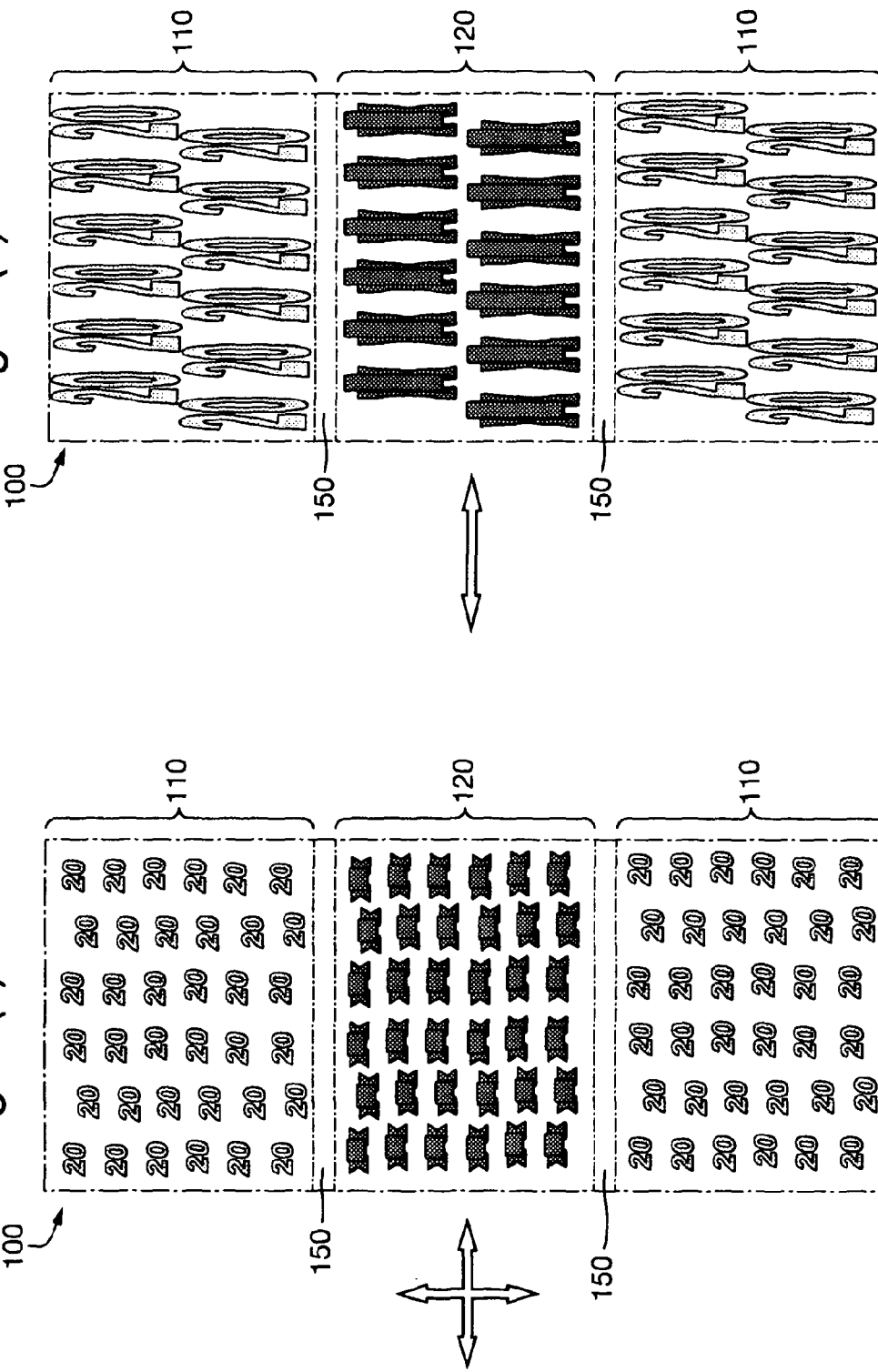
Figure 18:
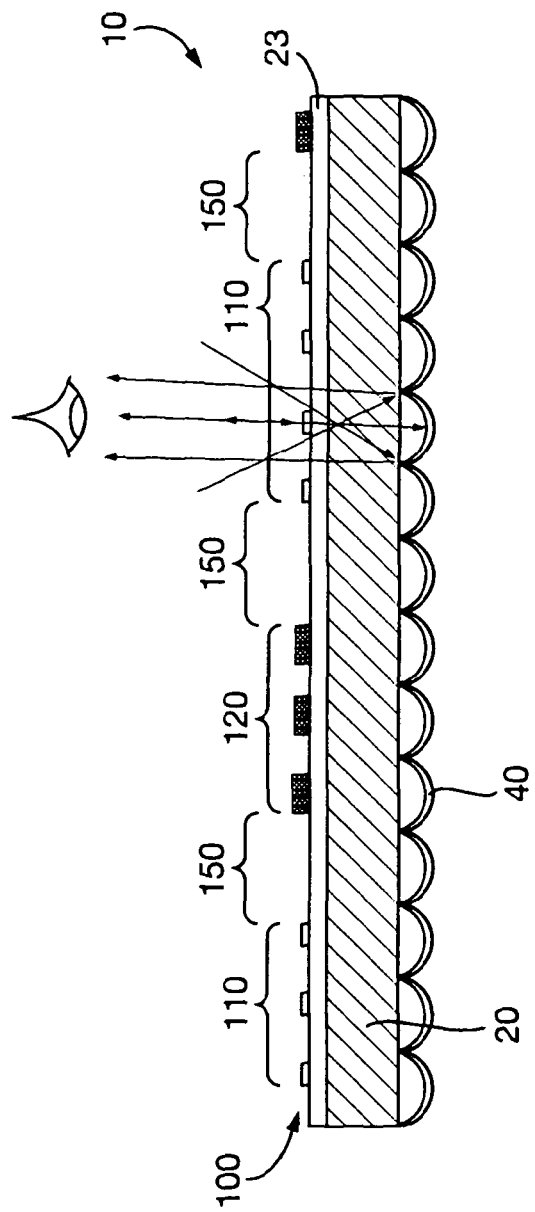
Figure 19:
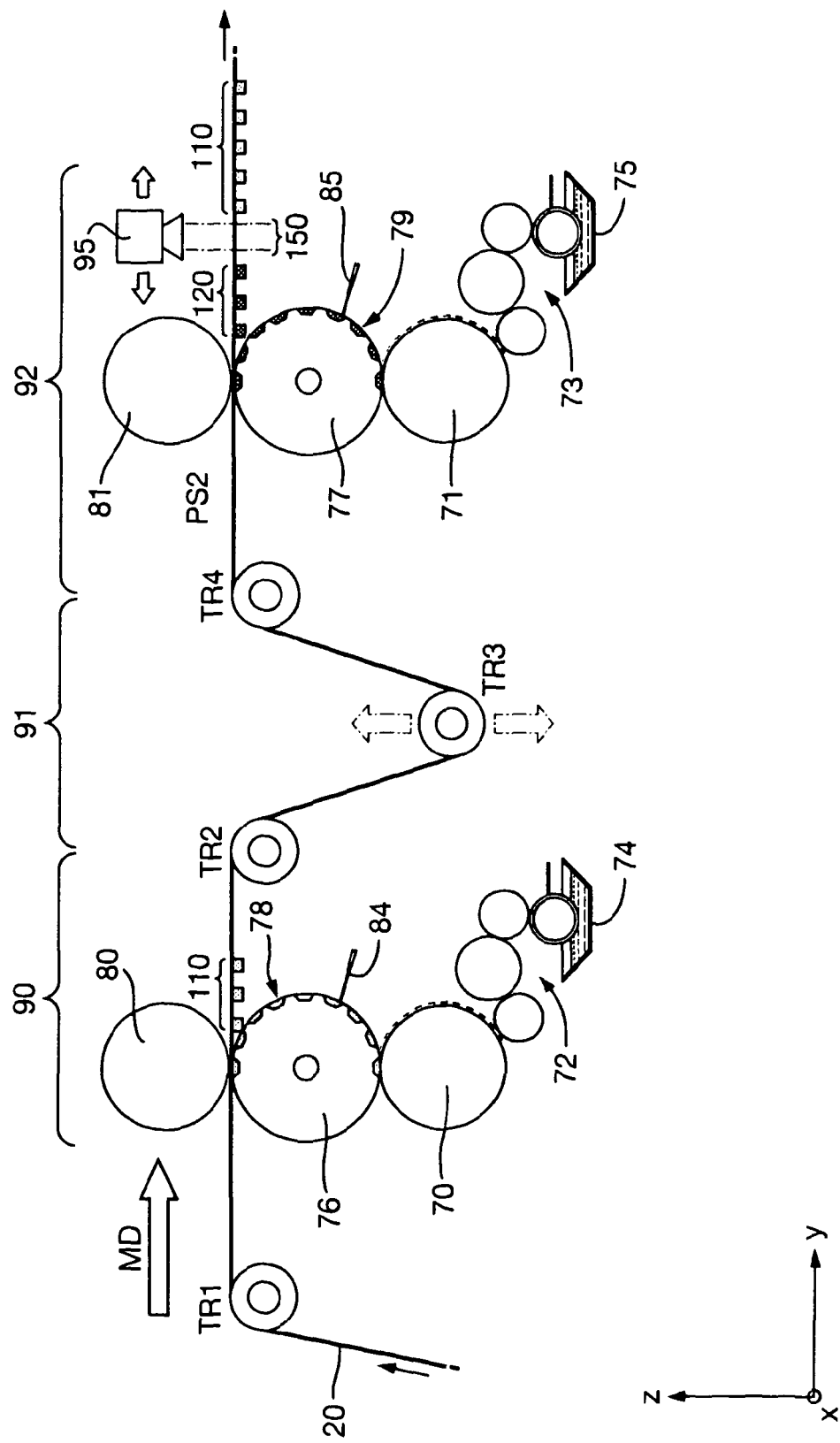
Figure 20:
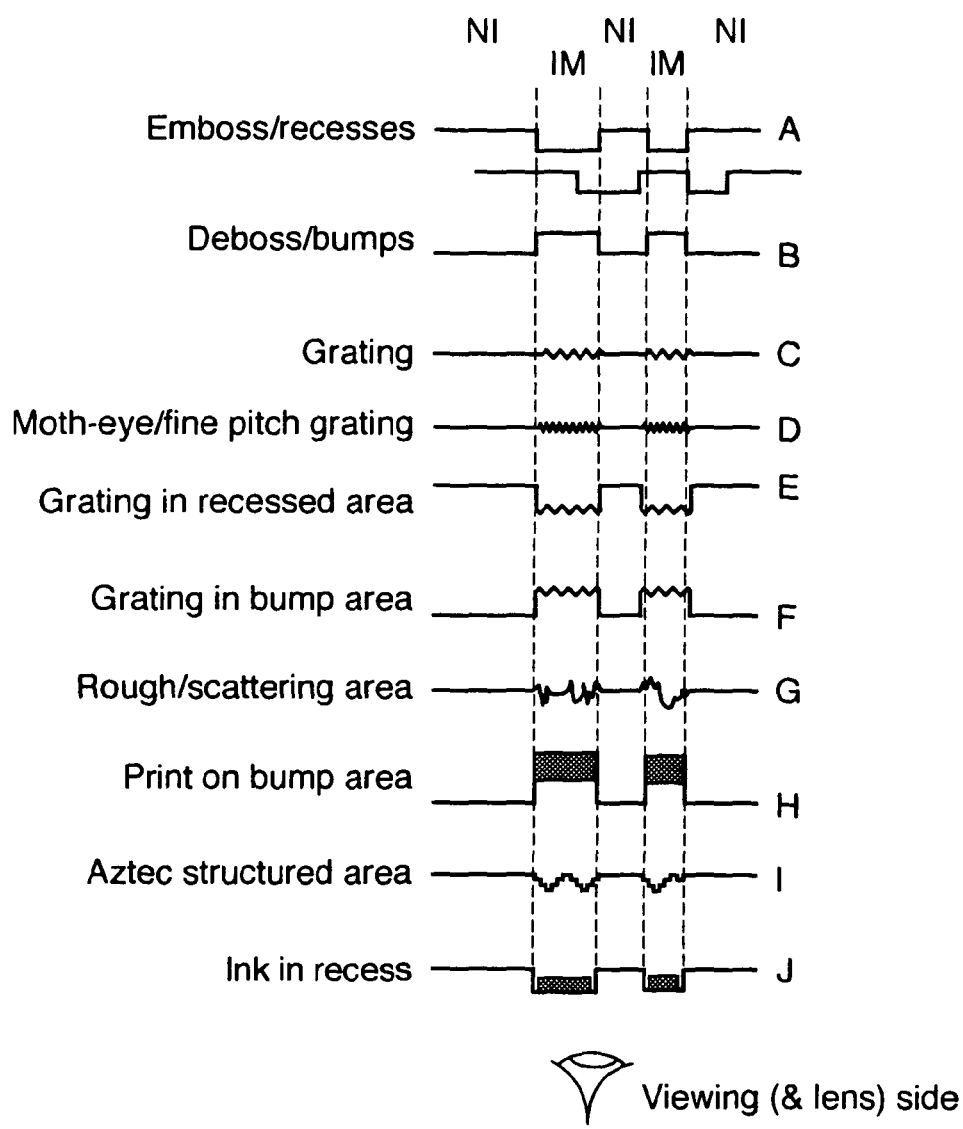
Figure 21:
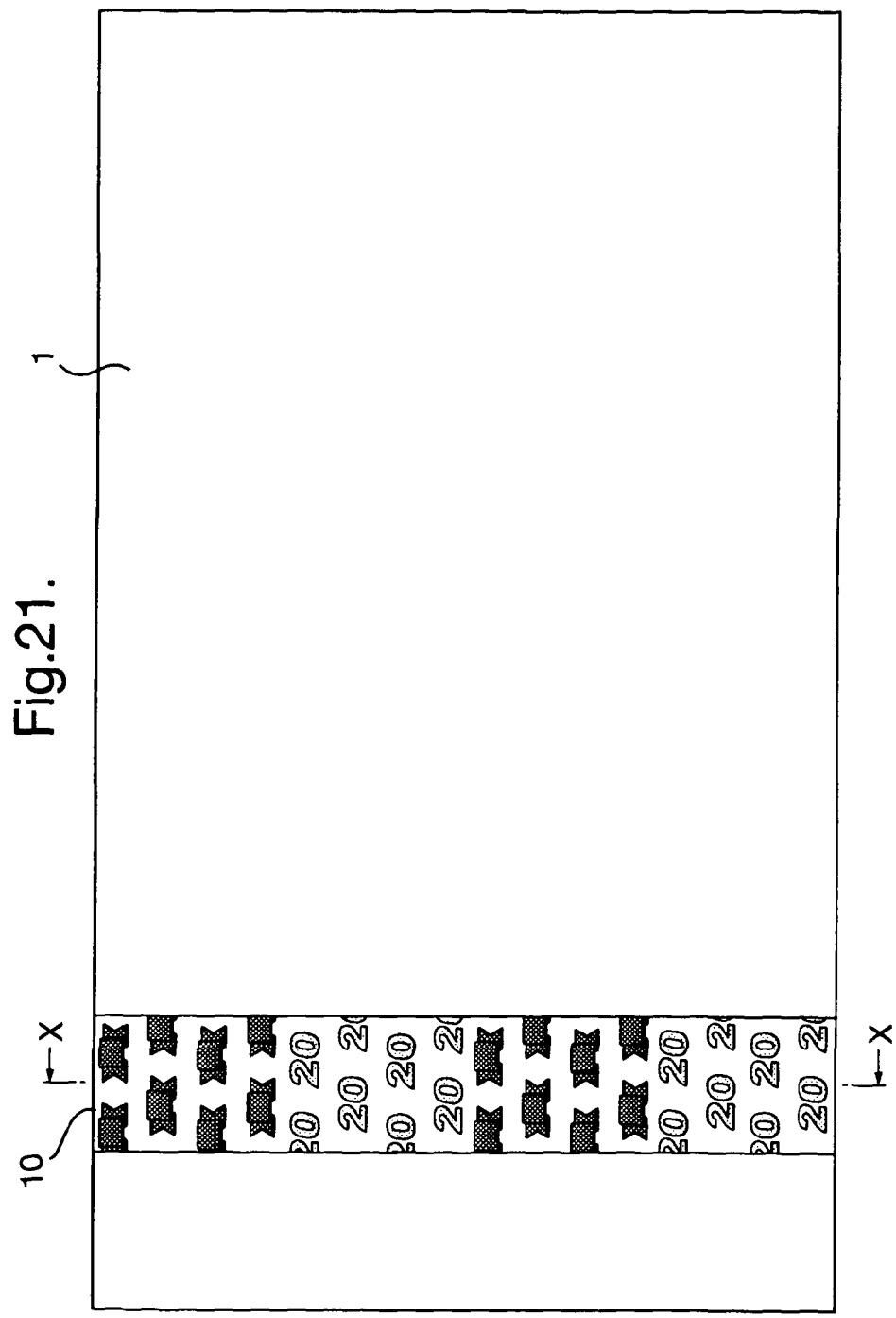
Figure 22:
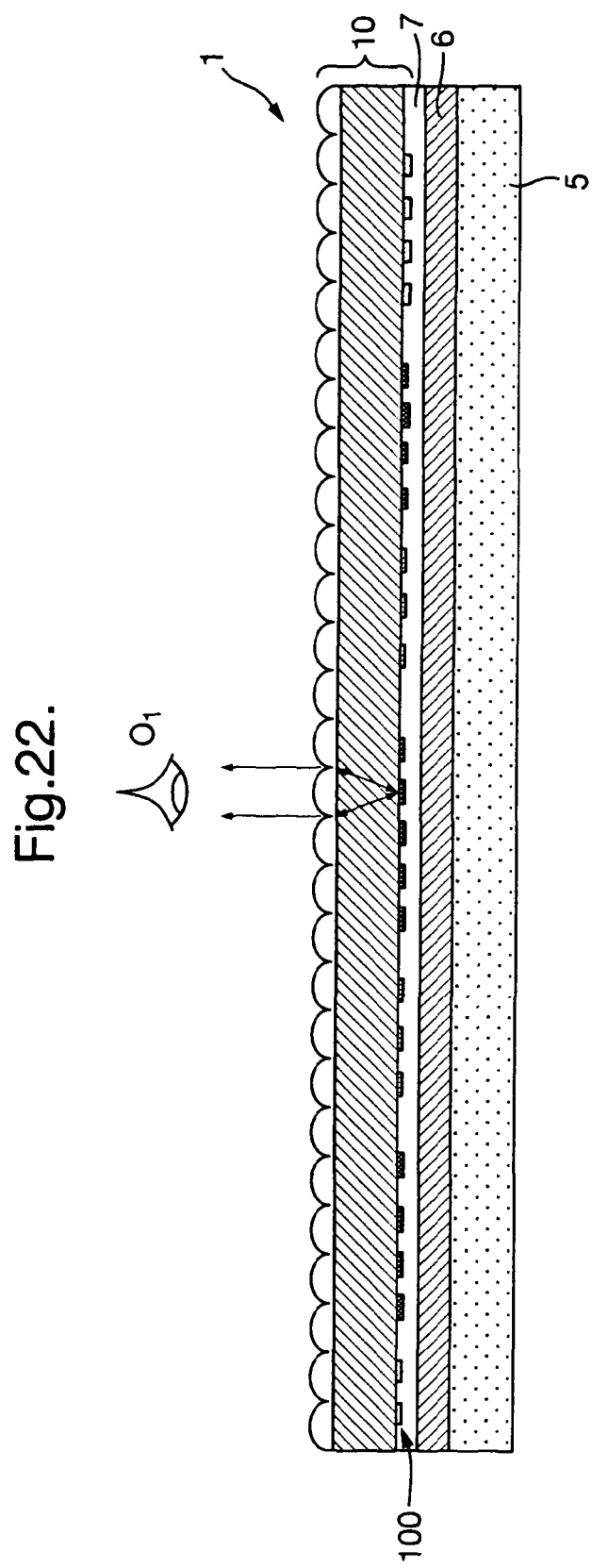
Figure 23:
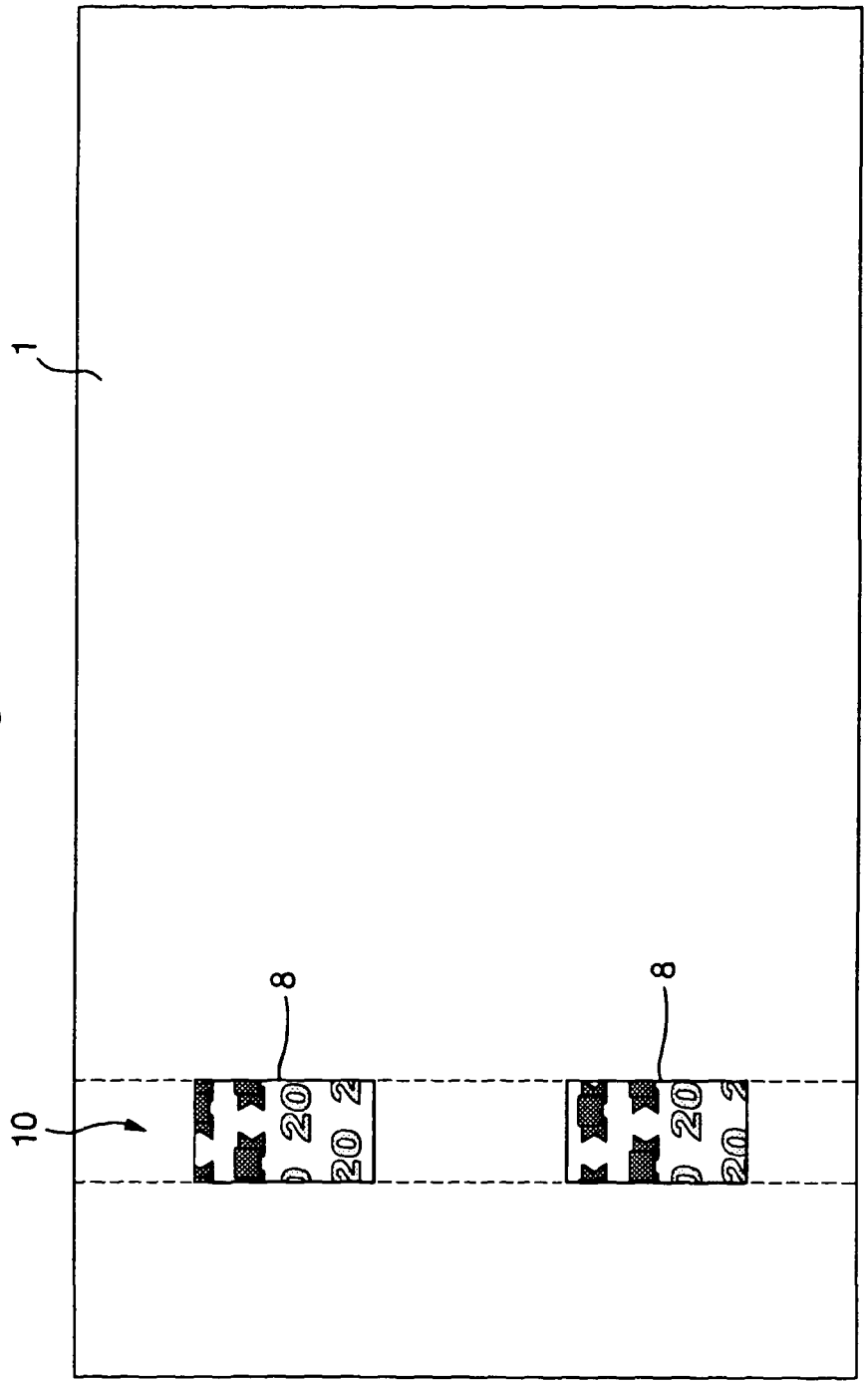
Figure 24:
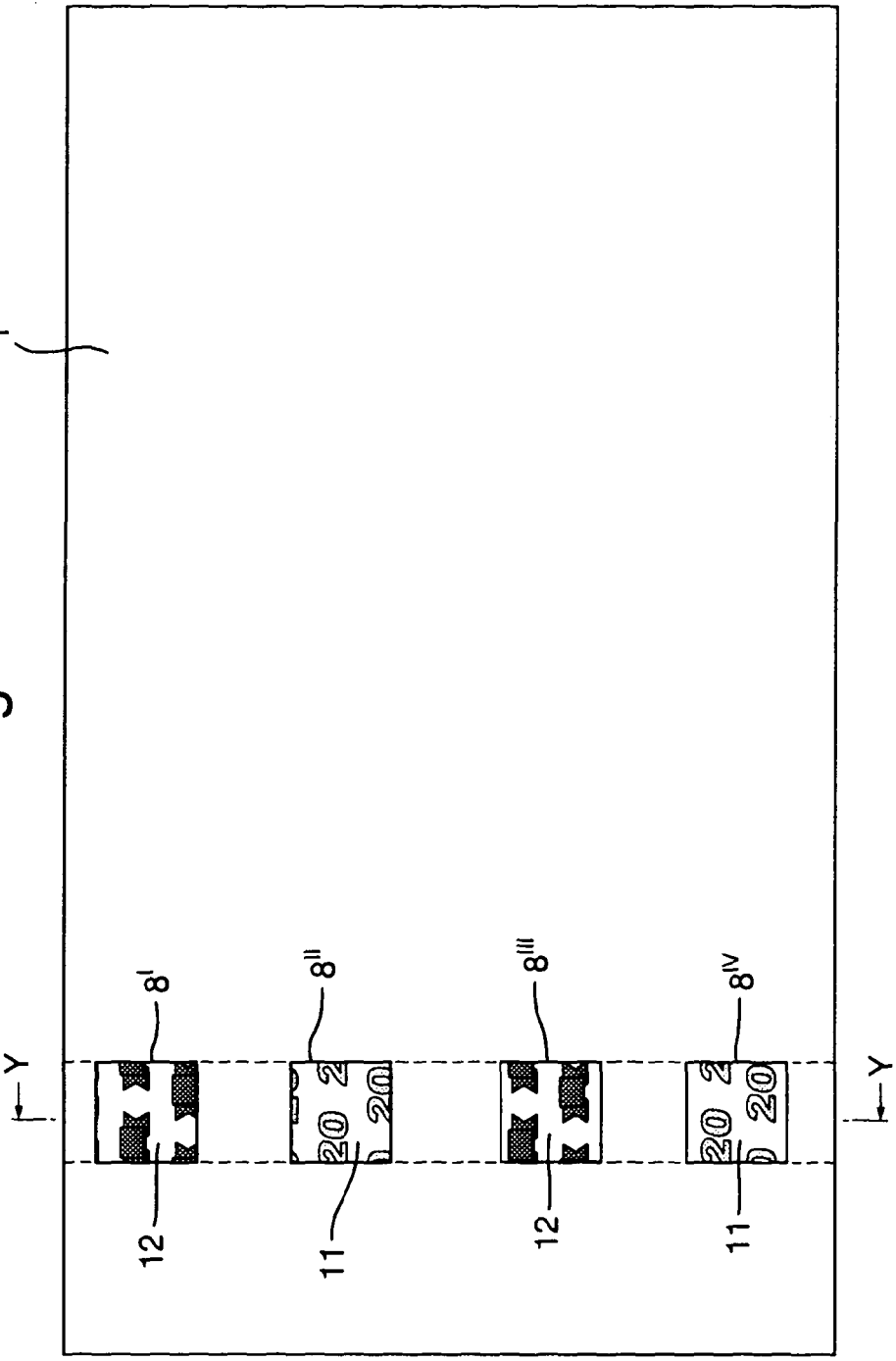
Figure 25:
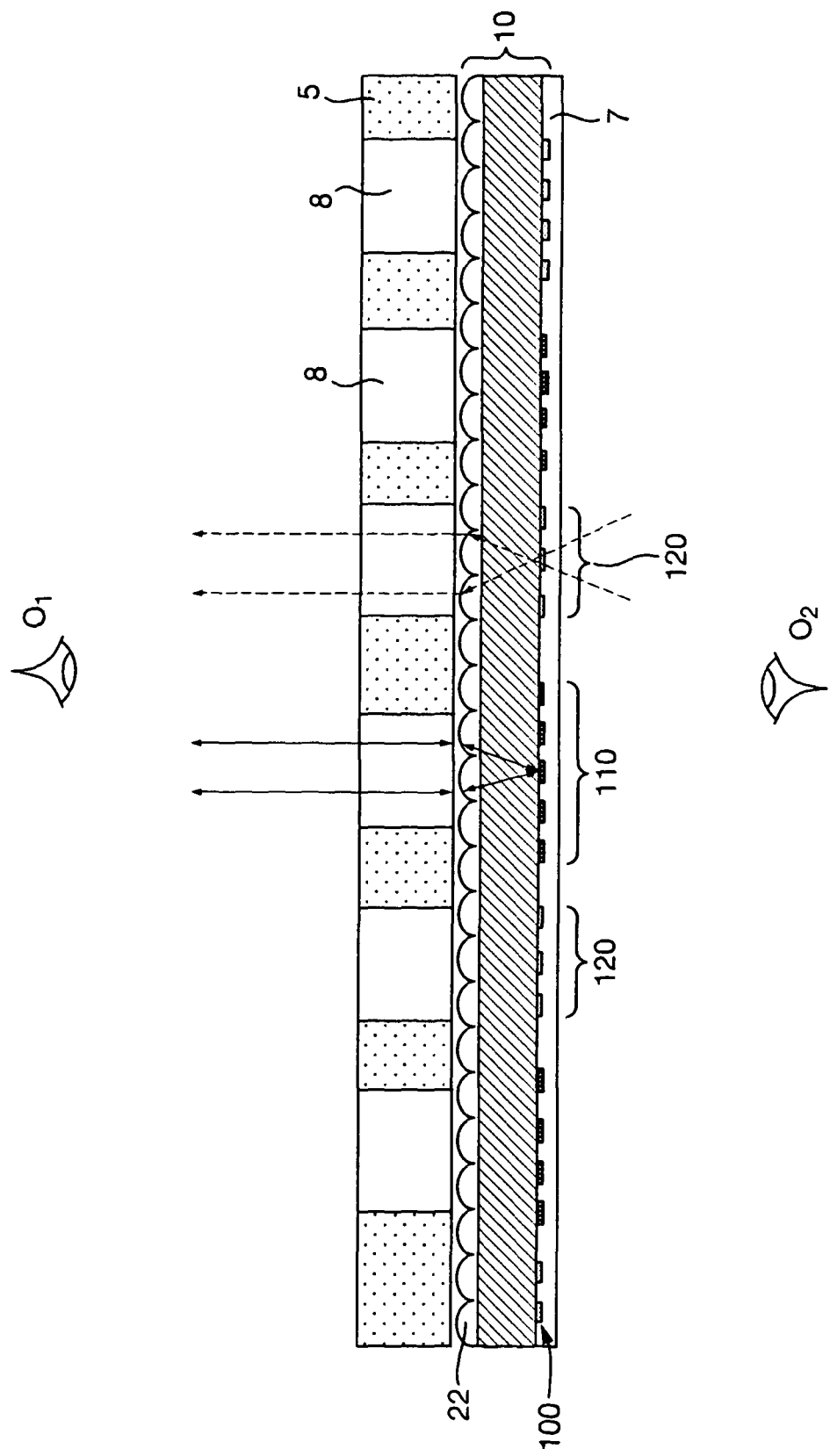
Figure 26:
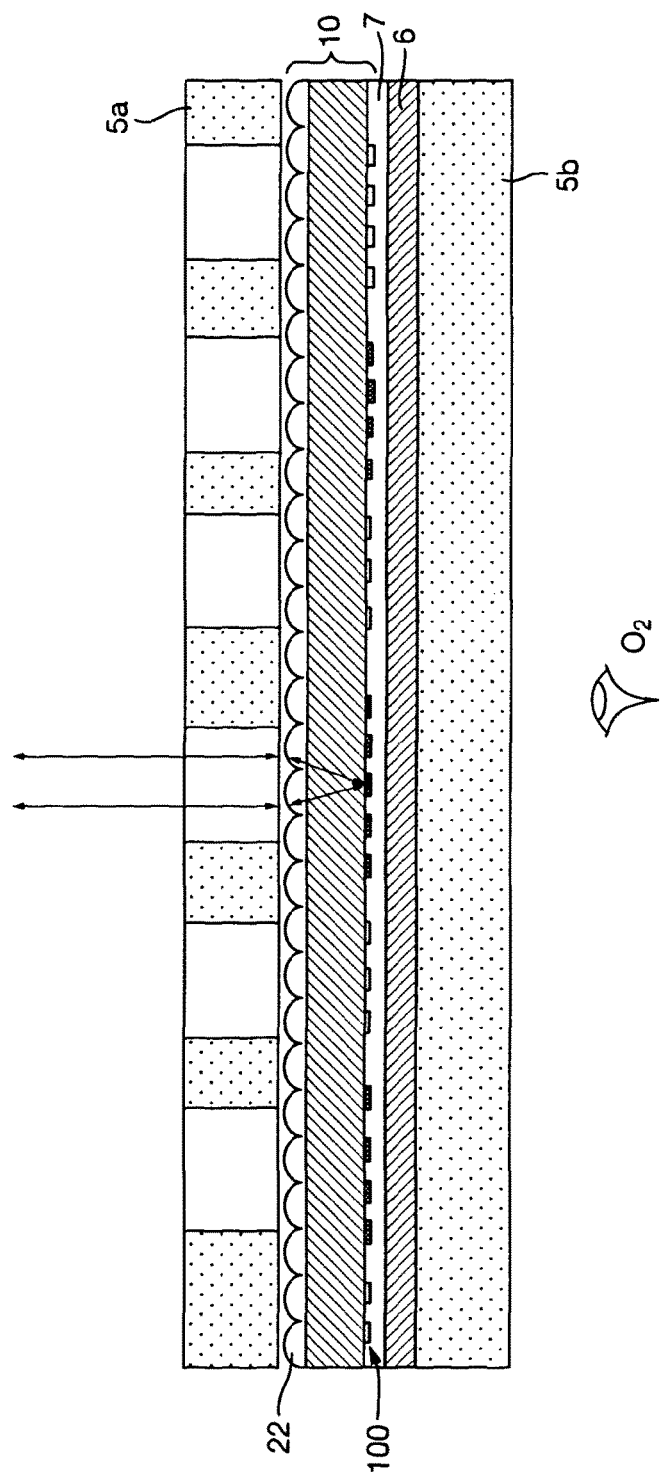
Figure 27:
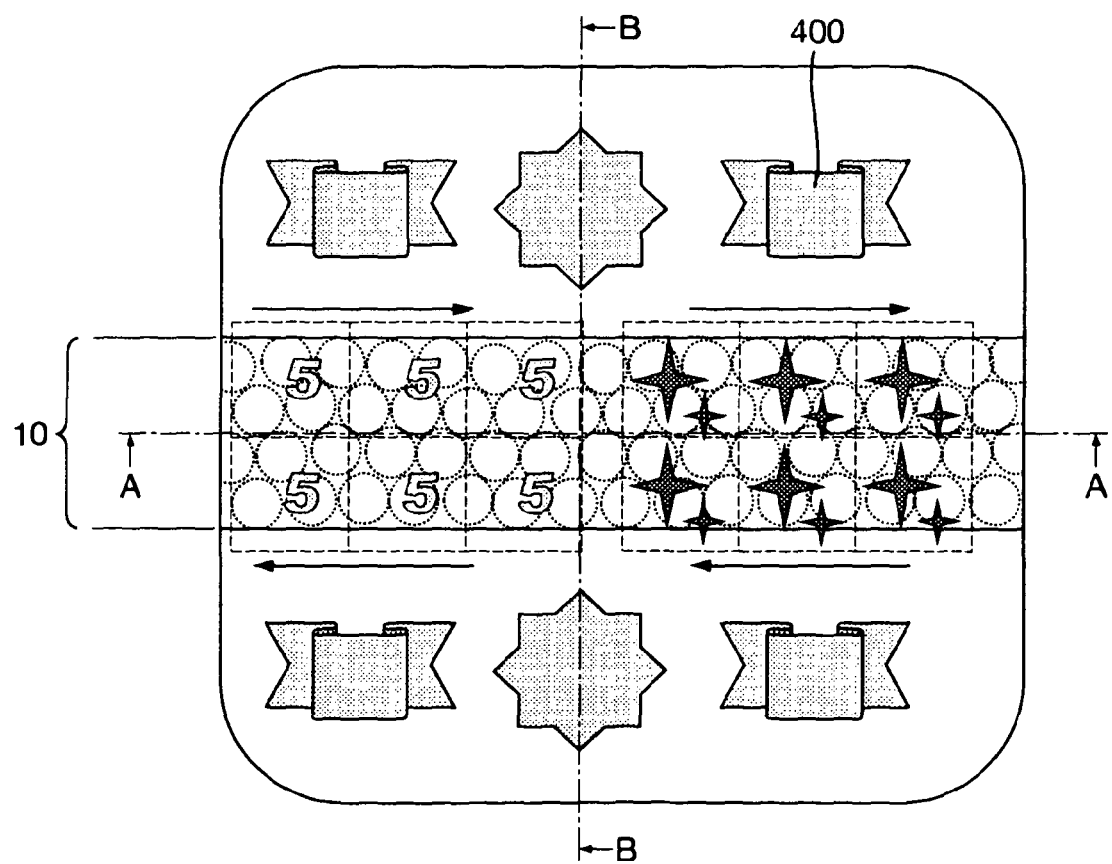
Figure 28:
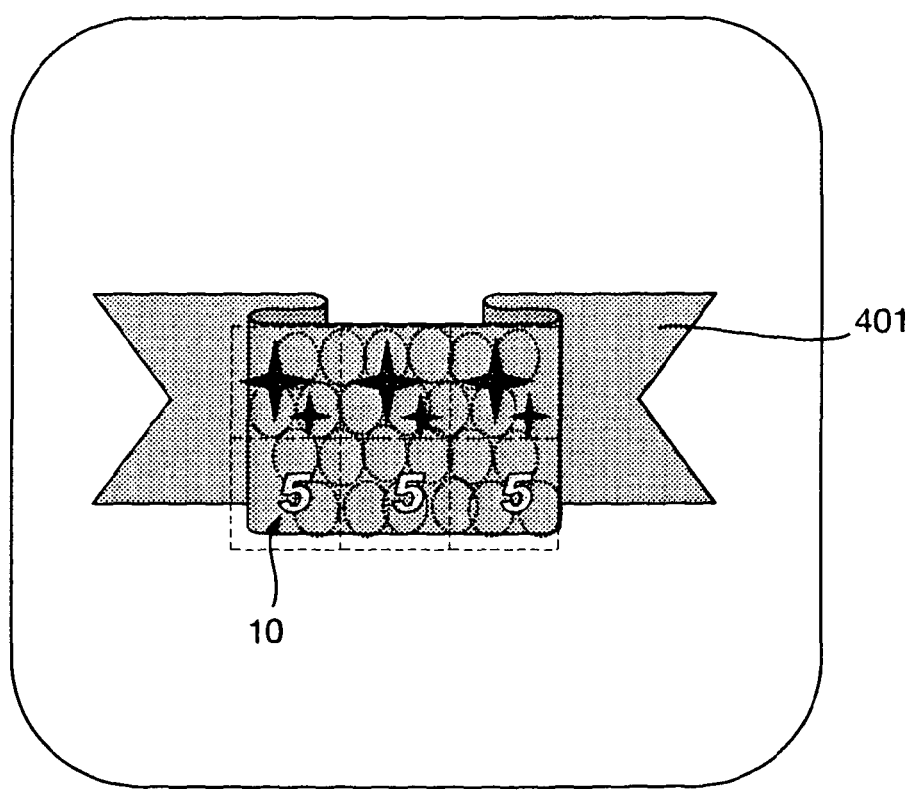
Figure 29:
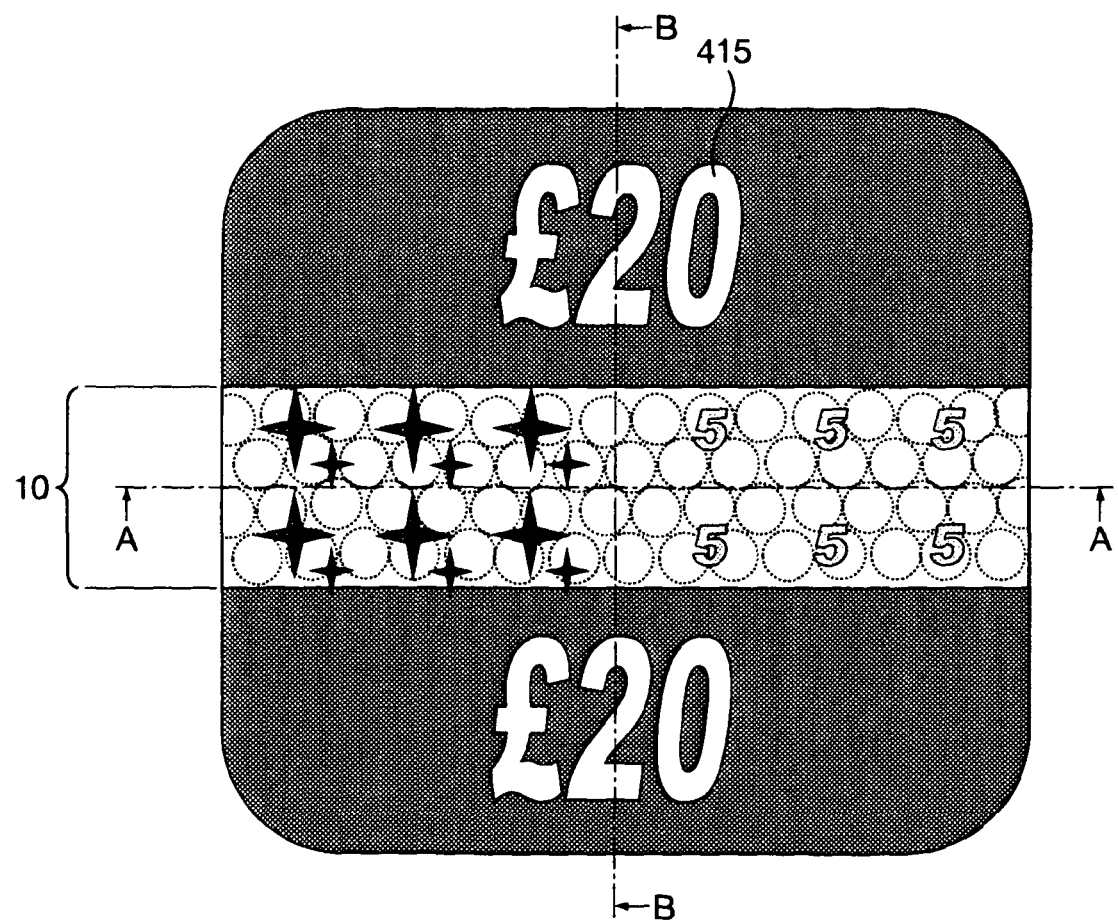

FIG. 4a schematically shows an example of out of register microimage arrays, FIGS. 4b and 4c depicting portions of its microimage arrays with exemplary magnified images overlaid;

FIG. 5a schematically shows a design template for the microimage arrays of a second embodiment of a device, FIG. 5b showing an enlarged detail of FIG. 5a;

FIG. 6a shows another enlarged portion of FIG. 5a, FIG. 6b showing the same portion formed out of register;

FIGS. 7a, b and c show microimage arrays in a third embodiment of a device having a first exemplary boundary zone width formed with different registration errors;

FIGS. 8a, b and c show microimage arrays in a fourth embodiment of a device having a second exemplary boundary zone width formed with different registration errors;

FIGS. 9a, b and c show microimage arrays in a fifth embodiment of a device having a third exemplary boundary zone width formed with different registration errors;

FIG. 10 is a schematic cross section of any the second to fifth embodiments of a device;

FIG. 11 shows microimage arrays in a sixth embodiment of a device, FIG. 11(i) showing an enlarged detail;

FIG. 12 shows microimage arrays in a seventh embodiment of a device;

FIG. 13 is a schematic cross section of the sixth or seventh embodiments;

FIG. 14 is a schematic cross section of an eighth embodiment of a device;

FIG. 15 is a schematic cross section of a ninth embodiment of a device;

FIG. 16 schematically illustrates microimage arrays in a tenth embodiment of a device;

FIGS. 17a and b show microimage arrays in eleventh and twelfth embodiments of a device, respectively;

FIG. 18 is a schematic cross section of a thirteenth embodiment of a device;

FIG. 19 schematically shows apparatus which may be used to form microimage arrays in any of the embodiments;

FIGS. 20A to J illustrate different types of relief microimages;

FIG. 21 shows an example of an article carrying a device according to any of the embodiments;

FIG. 22 is a schematic cross section along the line X-X of FIG. 21;

FIG. 23 shows another example of an article comprising a device according to any of the embodiments;

FIG. 24 shows a further example of an article comprising a device according to any of the embodiments;

FIG. 25 is a schematic cross section along the line Y-Y of FIG. 24;

FIG. 26 is an alternative schematic cross section along the line Y-Y of FIG. 24;

FIGS. 27 to 29 are views of other examples of moiré magnification security devices combined with holographic security devices;

FIGS. 30a and 30b are sections along lines A-A and B-B respectively in FIG. 29.

Figure 1:
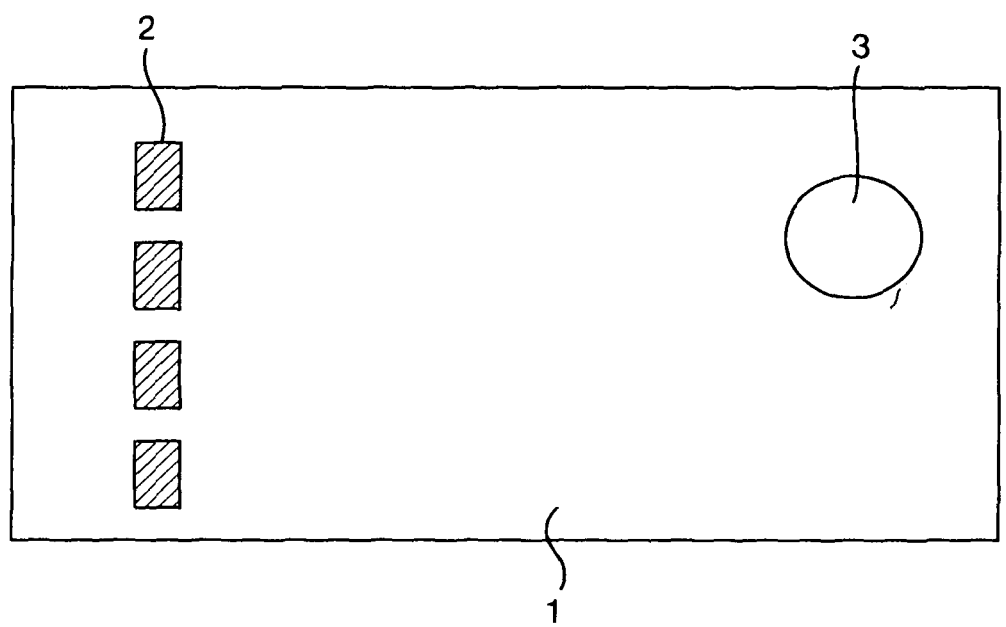
FIG. 1 is a schematic plan view of a banknote.

FIG. 1 illustrates schematically a banknote 1 having a security thread 2 and a transparent window 3. The banknote 1 may be made of paper or polymer (such as bi-axially oriented polypropylene) and one or both of the security thread 2 and window 3 incorporates a security device according to the invention.

FIG. 2a schematically illustrates the appearance of a first embodiment of a security device in plan view. As explained above, the appearance of a moiré magnification device depends on the nature of the microimage element array(s) included in the device, since the device presents a magnified version of the array(s). As such, the discussion below will frequently alternate between the appearance of the device itself, such as that shown in FIG. 2a, and the arrangement of the underlying microimage element array(s), of which an example is shown in FIG. 2b. For clarity, throughout the Figures except where otherwise specified, a device's appearance will be illustrated with a solid, bold outline and no background shading whereas illustrations of microimage arrays (and templates on which they are based) will be shown with a broken-line outline and light background shading.

It should also be noted that the Figures are not to scale: in practice, the individual microimage elements may be many orders of magnitude smaller than the magnified versions seen by a viewer. Further, the cross sections do not accurately represent the relative thicknesses of the various components.

In FIG. 2a, we show in plan view a first embodiment of a security device 10 (here, having a strip format) comprising two alternating sets 11, 12 of synthetically magnified images. In this example the selected images are icons, namely the numeral '20' in the first magnified image panel 11, and a 'crest' symbol in the second magnified image panel 12. This could represent for example the denominational value of an article to which the device will ultimately be applied and an appropriate regional icon pertaining to the security document. Of importance is that the icons are located in separate, non-overlapping zones 11, 12 and are provided in different and preferably contrasting colours, for example red and blue.

The microimage element arrays 100 from which the image panels 11, 12 are generated are shown in FIG. 2b. Pertaining to each respective image panel 11, 12 will be an array or lattice 110, 120 of microimage elements printed or otherwise formed in the respective colour and at its respective pitch. Each microimage array 110, 120 is formed in a separate working: thus, in one example, array 110 consisting of red "20" symbols is laid down before the blue "crest" symbols of array 120.

FIG. 2c shows an enlarged, exemplary portion of the device 10 and its underlying microimage arrays, using a magnification factor M of ~10. Of course, in practice, only the magnified images 11, 12 will be visible, and the microimage element arrays 110, 120 will not be seen. The dashed-line circles represent the array of microfocusing elements 22 (described in more detail below). The small "crests" and "20's" are the respective individual microimage elements and the larger "crest" and "20" the magnified images 11, 12. The location of the respective microimage elements relative to the lens array 22 determines the position of the respective magnified images. In this case, the positioning of the microfocusing elements 22 relative to the microimage elements is such that, above each array 110, 120, the full magnified version of the element symbol 11, 12 is visible; the magnified "20" numeral 11 of the first array 110 above a notional interface line dividing the two image panels, and the magnified "crest" symbol 12 below the line. There is no essentially no intentional spacing between the two microimage arrays 110, 120, In this embodiment, any visible interference between the image panels 11, 12 is avoided by forming the underlying microimage element arrays 110, 120 in accurate register with one another. That is, the maximum registration error between the arrays is less than or equal to 100 microns. Whilst this has proved difficult using conventional techniques, as described below with reference to FIG. 19, the present inventor has devised a method through which this is possible. Since the respective microimage arrays 110, 120 can be accurately placed relative to one another, overlapping of the resulting image panels 11, 12 is minimised and there is no visible interference or obscuration of one array by the other. In practice there may be a very small overlap between the two arrays but, as discussed above, this will not be resolvable to the human eye. This leads to the significant benefit that there is no need for complex design rules pertaining to each microimage element array and in fact both image arrays could in one case be comprised of the same symbol type differentiated only by colour.

In the present example, the pitch of both respective image arrays is the same such that the two synthetically magnified image panels 11, 12 will appear to be located on the same plane some distance behind or in front of the device. However, generally, it is preferable to have the two image panels 11, 12 located on different image planes and which is achieved through the use of different microimage element array pitches as will be discussed further below. In other examples, the synthetic image panel generated by any one of the respective micro element arrays could include areas appearing to lie in more than one plane using methods already known in the art (see for example EP-A-1695121)— for example alternate elements of the magnified '20's' image array may be provided on two separate image planes.

Thus, forming the two microimage arrays in accurate register ensures that, when the device is viewed, there is no visible interference (i.e. overlap) between the image panels. This results in a distinctive visual appearance and hence the device is effective for many applications. However, the device may yet suffer from other distracting effects when viewed at different angles or even along the normal if there is mis-register between the microimage arrays and the microfocusing element array.

As mentioned above, FIG. 2 relates to a discrete alternating colour array device in which the position of each microimage array relative to the focusing element array and/or the particular viewing direction ensures that the magnified image elements sit wholly within their respective microimage arrays. That is, the synthetically magnified versions of the "20" icons and "crest" symbols sat centrally within each image panel—in other words, there was no loss of design/image continuity across the panel boundaries.

However a more typical scenario is shown in FIG. 3, in which the same level of control is not achieved. FIGS. 3a and 3b show a section of the same device as that depicted in FIG. 2, but wherein a vertical displacement of the magnified image elements 11, 12 relative to their associated micro image array panels 110, 120 has occurred either due to a change in viewing angle, or due to a vertical shift in the registration of the micro focussing element array 22 relative to the two microimage arrays 110 and 120. In practice, such mis-register between the micro-focusing element (e.g. microlens) array and the microimage element arrays is prohibitively difficult to eliminate.

In terms of appearance, the effects of tilting the device and misregister between the microfocusing element array and microimage arrays are similar, causing lateral displacement of the magnified images. As a consequence of this vertical image displacement the two synthetic image panels 11, 12 typically do not remain in aesthetically preferred locations relative to the boundary zones.

Taking first the example of tilting the device, as the viewing direction is moved off normal then the synthetically magnified images exhibit parallax motion commensurate with their perceived depth or distance from the plane of the device. In particular even if the magnified images when viewed normally are as positioned as shown in FIG. 2a, then the parallax motion can cause those magnified image elements neighbouring the panel boundary to subsequently traverse it, wherein they will then be visualised as incomplete or fractioned as the relevant micro image pattern needed on the other side of the boundary is not there to support further visualisation of the magnified image. This is illustrated in FIG. 3, where FIG. 3a shows the scenario where a change in the viewing position causes the magnified images to move downwards to a degree where their motion is interrupted by the next panel and they become incomplete. The FIG. 3b shows the opposite scenario wherein the change in viewing direction causes the magnified images to move upwards.

Figure 2:
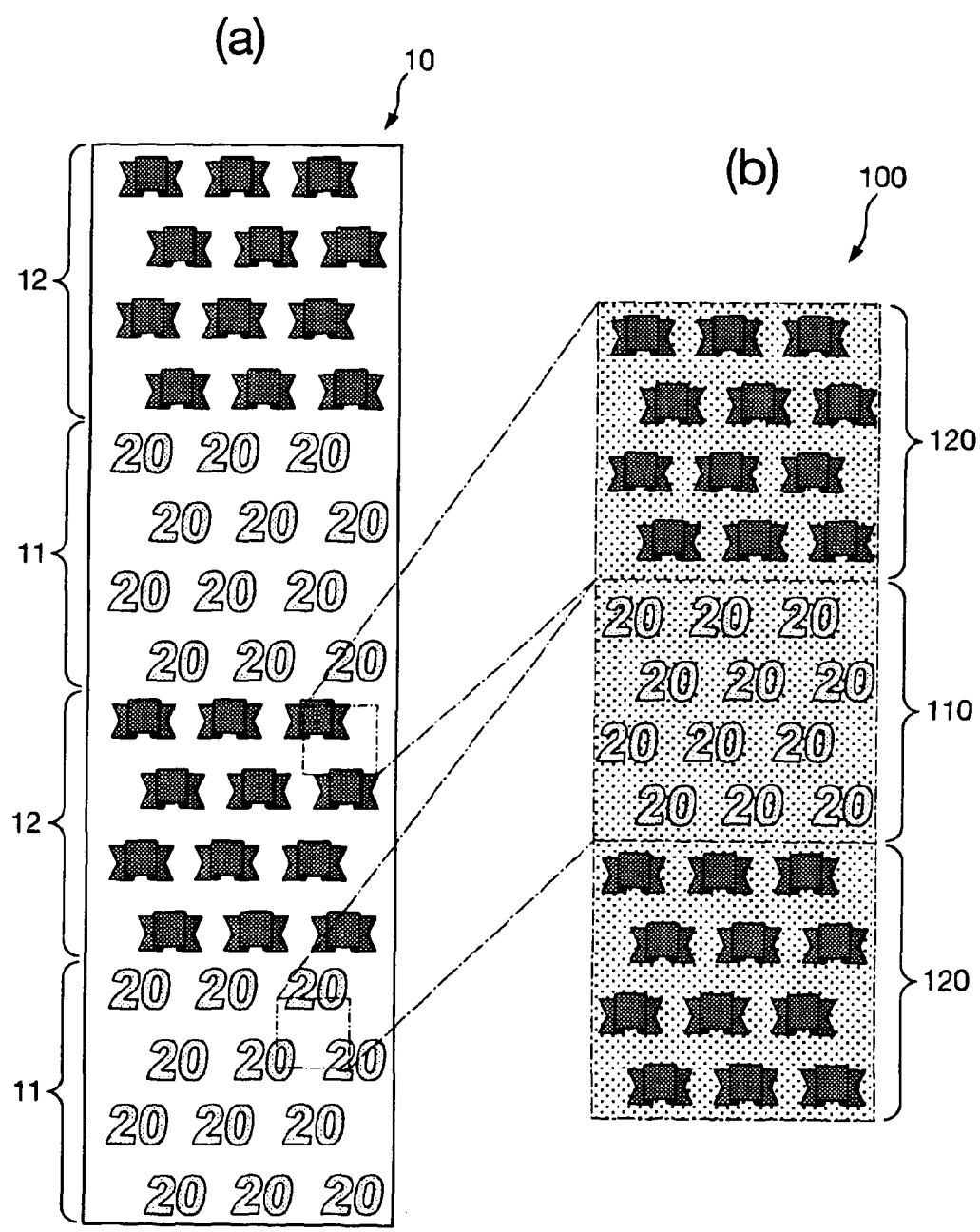
FIG. 2a illustrates the appearance of a first embodiment of a device, in plan view, FIG. 2b schematically illustrating portions of its microimage arrays and FIG. 2c depicting a further portion of its microimage arrays with exemplary magnified images overlaid.

The same effects illustrated in FIGS. 3a and 3b may instead be caused by shifts in the relative positions of the microfocusing array 22 and the microimage element arrays 110, 120. This is demonstrated in FIGS. 3(c)(i) and (ii), which show how the position of the magnified image tracks the register of the micro-image element arrays 110, 120 to the microfocusing element array 22 (note that for clarity only one array 120 is depicted but in practice the other array 110 will also be present as shown in FIG. 2(c)). FIG. 3(c)(i) shows with a cross the position (labelled 120*) where the microimage array 120 is in register with the focussing array 22, and here we see that the magnified image 12 is centered about that position—hence enabling the full magnified image 12 to be seen, which corresponds to the scenario in FIG. 2). FIG. 3(c)(ii) shows the scenario where the position or register of the microimage array 120 is moved up by a registration error δ, which here corresponds to half the height of one of the "crest" microimage elements. The new location 120* of mutual register between the microimage array and microfocusing array is again marked with a cross.

Thus the magnified image 12 has been caused to move up so that its artwork center is located over the new register location 120*. In this new location, the magnified image 12 is "fractioned" or terminated as it reaches the interface line because the microimage array abuts the boundary but doesn't cross it. Consequently, there are no "crest" microimage elements on the other side of the boundary to support its visualisation. This corresponds to the effect seen across the full device as shown in FIG. 3(b). Of course, if the register shift occurred in the opposite direction then a downward shift as shown in FIG. 3(a) would result.

Thus, it should be understood that displacement of the synthetic magnified images is driven not only by changes in viewing angle but also by changes in register between the micro-focusing element array and the respective microimage element arrays or indeed a combination of both. In practice a shift in register between the micro-focusing element array and the microimage element arrays equal to say half a micro image width will result in an equal relative displacement of the synthetically magnified image. Suppose by way of an example the designed level of moiré magnification is ×100, then an (unintentional) change in register between micro image array and microfocusing element array (in a direction orthogonal to the panel boundary line) of only 0.015 mm will generate a shift in the position of the synthetic image array of 1.5 mm. Thus any image whose edge or perimeter falls within 1.5 mm of the boundary will be caused to overlap and be fractioned by the boundary.

In practice what this means is that, in order to obtain the preferred placement of the synthetically magnified images within a viewing zone or indeed within a respective image panel, a mutual registration accuracy between the microimage element and microfocusing element arrays of less than half the repeat distance of the arrays (typically <20 microns) is needed, which is not currently achievable.

Thus, positioning of the synthetically magnified images in predetermined positions within their respective image panels with minimal image discontinuity either side of the boundary zone presents a significant manufacturing challenge (requiring registration at the few tens of micrometers or less). Nonetheless, through suitable image choice, array arrangement and spacing the deleterious effect of such boundary discontinuity can be reduced to a level which doesn't distract the viewer and indeed could be presented as a describable visible security effect, and as such devices such as that described with reference to FIGS. 2 and 3 remain useful.

However, it would be desirable to provide a device in which such "fractioning" at image panel boundaries is controlled, without having to achieve perfect registration between the micro-focussing element array and the microimage element arrays. Further, in practice it may not always be desirable or possible to minimise or eliminate registration error Σ between the two microimage element arrays. For instance, if the micro-image arrays are to be formed by printing using existing printing apparatus, that apparatus will determine the minimum registration that can be achieved. As such, the present invention also provides techniques whereby problems arising from unavoidable registration errors are eliminated—that is, eliminating visual effects which would otherwise be generated when the adjacent printed micro image panels do not maintain mutual register and thus do not accurately butt up to each other (as was shown in FIG. 2b), as well as alleviating those arising from mis-register between the micro-focussing elements and the microimage elements.

An example of microimage array mis-registration is shown in FIG. 4, wherein we see that the central microimage array 110 (corresponding to the image panel 11 with "20" icons) of the microimage element array 100 has shifted downwards relative to the two "crest" arrays 120' and 120"—causing a gap G to appear unintentionally between the arrays 110 and 120", and of more concern it causes an overlap OV of the two micro image arrays 110 and 120' in the lower image zone. This results in an uncontrolled overlap which is disturbing to the viewer and thus uncontrolled interference between the two synthetically magnified image panels 11, 12 leading to a loss or reduction in image integrity. To the observer the asymmetry in the appearance of the interfaces between the image panels and the loss of image quality/integrity will at best be discerned as a visually obtrusive manufacturing error and at worst will serve to confuse the observer as to what optical variable security effect they are meant to be observing.

FIG. 4(b) shows an enlarged portion of the FIG. 4 device in the region of the gap G between microimage arrays 110 and 120", where the position or0 register of the upper micro image array 120" is shifted upwards or away from the lower array 110 such that a gap or void is created in the transition zone between the two arrays. For such a void to be visually tolerated by the observer it is desirable that its width be appreciably less than the vertical dimensions of the magnified images 11, 12 and their associated inter image gap FIG. 4(b) shows a further enlarged portion of the FIG. 4 device in the region of the overlap OV between microimage arrays 110 and 120'. As in the case of FIGS. 2(c) and 3(c) this Figure illustrates both the magnified image elements 11, 12 and the microimage element arrays 110, 120 but in practice only the magnified images will be visible. Due to the lower microimage array 120' having been applied out of register with the upper array 110, the lower array shifts up to cross the notional interface and overlaps or collides with the upper micro image array. Since the overlap is between two uncorrelated image arrays, the effect of one array is to compete with and mask the other—i.e. the two arrays interfere in an uncooperative way producing a magnified image zone or band with uncontrolled image contributions from each array. To mitigate the deleterious effect of such an overlap the inventors propose the creation of an interruption zone between the magnified image panels 11, 12 in which no magnified version of either of the microimage arrays is generated. This eliminates any overlap of the magnified images and thus alleviates the above-noted problems. Note that this can be achieved either through modification of the microimage arrays or through modification of the microfocusing element array (both of which options will be detailed below), and in the latter case, there is no requirement to eliminating overlapping of the microimage element arrays themselves. An interruption zone is preferably provided along the device at each position where the image changes between one colour and the next: e.g. in the above described examples, an interruption zone would be provided at every interface between image panels 11 and image panels 12.

Each interruption zone can be generated either by incorporating a boundary region into the design of the microimage element array(s) 100 or by incorporating a "gap" in the micro-focussing element array, or both.

Thus, in a second embodiment of the invention, the device incorporates an interruption zone between adjacent image panels 11, 12 which is formed through the provision of a boundary region between the first and second microimage element arrays 110, 120 which is free from microimage elements associated with either adjacent array. FIG. 5a shows an example of a design template D which could be used to form the microimage element arrays on the device (e.g. by controlling a printing apparatus in accordance with the template) in the second embodiment. If the microimage element arrays can be formed on the device according to the template with zero registration error, the resulting microimage element arrays would be identical to the design template (however as already indicated and as will be demonstrated below this is typically not the case).

The design template D includes a boundary region 150 between "first" microimage element array 120' and "second" microimage element array 110, and another between "second" microimage element array 110 and "third" array 120". The width of this boundary region 150 in the design template (which is denoted 2Δ) preferably exceeds the relative register (i.e. the registration error, Σ) with which the microimage element arrays can be formed (e.g. printed) relative to one another, noting that the first and third arrays 120', 120" will be formed in one working whereas the second array 110 will be formed in another. Typically, the registration error Σ of the arrays relative to one another we expect using techniques known in the art will vary from as little as 25 microns to as much as 1000 microns or more.

Thus, depending on the manufacturing process, the design width 2Δ of the boundary region 150 may be between 25 and 3000 microns. Within that range, the design width is preferably at least 50 microns, more preferably 100 microns. However, to reduce the visual impact of the interruption zone, preferably the design width is no more than 1500 microns, more preferably no more than 1000 microns, still preferably no more than 300 microns, most preferably no more than 150 microns. In one example, the design width is between 100 and 200 microns. In another preferred example, the design width is between 0.05 mm and 0.25 mm. However, from a design perspective the width of the boundary region is desirably minimised to reduce its impact on the appearance of the device.

More generally, it is preferred that the design width of the boundary region 150 is greater than the size of an individual micro-image element of either array in the spacing direction between the arrays (here, the relevant dimension is the height, h, of the element as indicated in FIG. 5b but in other cases it could be the width, w, if the arrays are spaced along the y-axis rather than the x-axis). It is also preferable that the design width of the boundary region be greater than the pitch A of the microimage elements in the relevant direction (here, $A_y$). It will be noted that FIG. 5 is not to scale in this respect particularly.

If the registration error Σ is sufficiently large to be noticeable to the human eye (e.g. greater than about 100 to 150 microns), the design width of boundary region 150 may also be adjusted to take into account symmetry in the device. How much the width of the boundary region must exceed the inter array print registration error Σ to take device symmetry into account will now be considered with reference to FIG. 5. This is particularly of relevance when the device includes at least three microimage element arrays, with the middle array being formed in a different working from those on either side, such as is the case for arrays 110, 120' and 120".

As noted above, FIG. 5a shows the design template D which is identical to the microimage element arrays 100 if the arrays are laid down on the device in strict mutual register. The boundary regions 150 between the adjoining zones of alternating colour are each defined by a micro-image free zone of width 2Δ. For the purposes of this discussion, it is convenient to associate with either end of each array 110, 120', 120" a partial boundary region 150a, 150b of width Δ as is illustrated in the enlarged detail of FIG. 5b.

By making this association we see that for the scenario where the two colour arrays are in strict register, the partial boundary regions 150a, 150b butt up to each other.

We also note that the length of each array 110, 120', 120" is $P_i$—such that if $P_1$=length of array 110 ("20" icons) and $P_2$=length of each array 120', 120" ("crest" icons) then the following repeat length $R_p$ is conserved regardless of variance in inter panel register:

$$R_p = P_1 + P_2 + 2\Delta$$

This is illustrated with reference to FIG. 6, which shows the microimage element arrays formed on the device. In FIG. 6a, we the have scenario where the partial boundary regions associated with each printed panel butt up and thus the two colour panels are deemed to be in mutual register. As such the finished (e.g. printed) arrays appear identical to the design template of FIG. 5a.

Suppose we next add an error in the register of one printed colour array relative to the other of modulus value Σ, and the sense or direction of this register shift is as shown in FIG. 6b.

As a consequence, the actual boundary region 150' between the finished arrays 110 and 120" increases to (2Δ+Σ), whilst in the lower transition zone the width of boundary region 150" is reduced to (2Δ−Σ). Thus the arrays formed on the device are not identical to the design template D on which they are based (at least in terms of inter-array registration).

The perceived asymmetry between the upper and lower void zone is expressed by the ratio $\xi=(2\Delta-\Sigma)/(2\Delta+\Sigma)$.

When this ratio ξ equals unity, there is no perceived asymmetry between the upper and lower boundary regions associated with the inter array mis-register—boundary symmetry will be perceived by the viewer as part of the regular and repeating design characteristics of the design and in psycho-optical terms will be well tolerated. In other words, for the scenario where register variations are sufficiently large to be visualised (e.g. Σ>100 um) then it is preferable to ensure the boundary zone ratio approaches unity.

Now it is apparent that the ratio ξ will have a value which generally satisfies the condition $\xi \leq 1.0$.

Decreasing values of this ratio below unity indicate a decreasing symmetry between the two boundaries—for example when Σ>2Δ (i.e. when the arrays overlap across one interface) then the ratio becomes negative, this denotes a greater degree of asymmetry than when Σ=Δ (i.e. when the arrays butt up on the same said panel).

To approach a value of unity requires the design width of the boundary region to be substantially greater than the registration error (i.e. 2>>Σ), and thus in the ideal:

the registration variance Σ is made either vanishingly small by comparison with the void zone width 2Δ or the boundary region design width is made very considerably larger than the registration variation.

However in practice, the registration variance Σ has a minimum value set by engineering limits of the manufacturing system, and the boundary width has a maximum value set by the need for its size to harmonise with the synthetically magnified image array.

To give an example, a typical registration tolerance Σ between sequential print heads in a modern polymer web based print system is of order of ±0.15 mm.

If the presently disclosed device were to be used as a windowed thread feature, the dimensions of the thread window set a scale for the size of the magnified image elements and their repeat spacing. Let us assume the windows dimensions have a typical value 3-4 mm in width by 4-6 mm in height. Then the optical device designer will choose a magnified image size circa 2-3 m mm and with an image repeat less than 4 mm.

It then follows that the finished boundary region width should be preferably less than the dimension of the magnified image elements and their respective inter image gaps, such that the void zone appears to naturally fit with the remainder of the device imagery. The objective is to determine the minimum effective void zone width and more particularly the maximum tolerable value for the ratio $\xi=(2\Delta-\Sigma)/(2\Delta+\Sigma)$.

The inventors have found that acceptable visual symmetry is achieved for values of $\xi \geq 0.8$ (where the registration error is sufficiently large so as to be noticeable, e.g. $\Sigma \geq 150$ um).

Thus in the present example, taking $\Sigma=150$ um and choosing $\xi$ to have a value at the minimum value of 0.8—then we obtain from the expression for $\xi$ a minimum acceptable value for the boundary region design width of 1.35 mm. This value is appreciably less than the dimensions of the magnified image elements and it will also be less than the inter age spacing in the magnified panels.

Figure 7B:
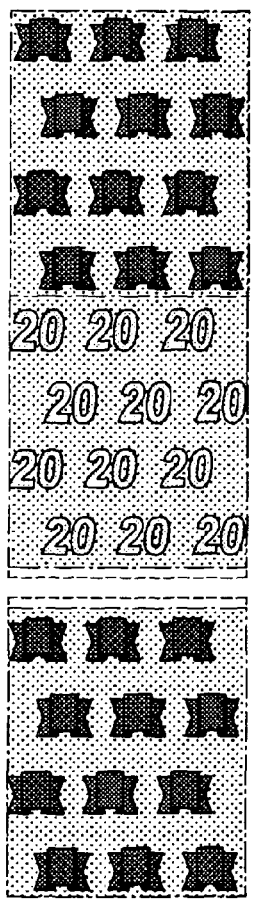
Figure 7C:
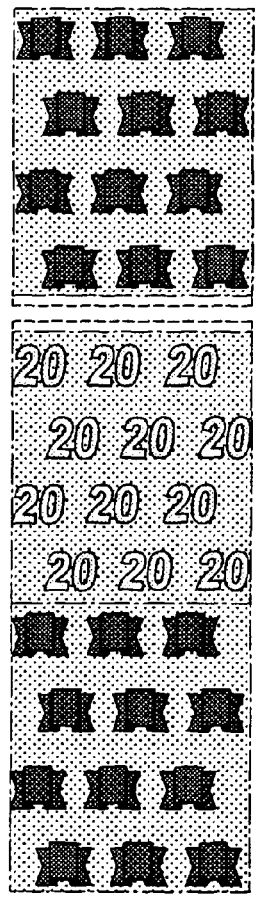
Figure 8B:
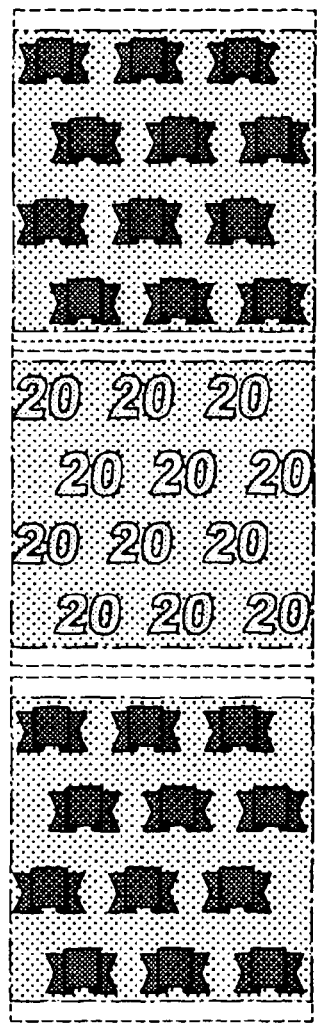
Figure 8C:
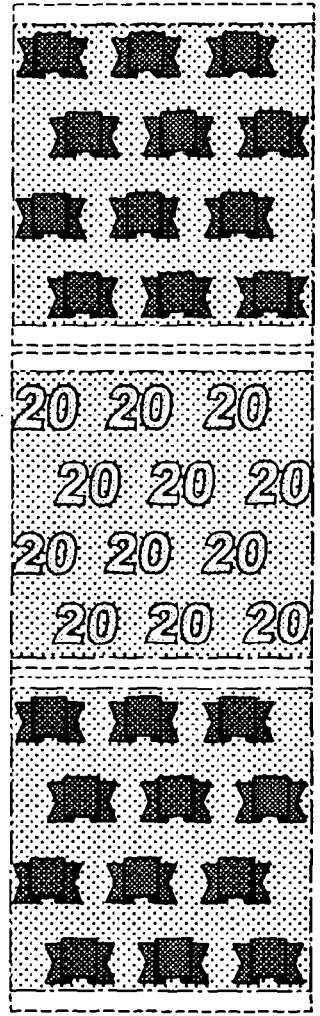

FIGS. 7 to 9 illustrate the validity of our symmetry criteria. FIGS. 7a, b and c show a conceptual example in which where the maximum inter array print registration error $\Sigma$ is equal to the design width of the boundary region, i.e. $\Sigma=2\Delta$. Therefore, $\xi=0$ and in this scenario the registration can cause the two micro image arrays to butt up at one boundary whilst at the other boundary they will be separated by an amount $4\Delta$ (as is the case in FIGS. 7b and 7c). As such, the two image array boundaries look highly asymmetric, distracting the viewer ("psycho-optically" disturbing).

FIGS. 8a, b and c show a conceptual example where the maximum inter array print registration error is about one quarter of the boundary region design width, i.e. $\Sigma=0.5\Delta$, and thus $\xi=0.6$. In this scenario, registration error causes the inter array gap to increase and decrease by 25% at both respective array boundaries. The asymmetry is less obvious than in previous example but is still readily discernable.

FIGS. 9a, b and c shows an embodiment where the maximum inter array print registration error is about one tenth of the boundary region design width, i.e. $\Sigma=0.2\Delta$ and thus $\xi=0.82$. In this scenario the registration error creates a level of boundary asymmetry which is barely discernable on initial inspection and therefore would not trouble or distract the viewer. This therefore represents a preferred embodiment.

Thus to manage the potentially deleterious asymmetrical effects of inter array register, the inventors have created a design rule which states that the boundary region design width $2\Delta$ must be as a minimum some 9 times that of the value of the register error. This applies when the registration variance $\Sigma$ is of a size that can be visualised by the naked eye—which is generally greater than 100 um or 150 um for a normally sighted person However, for registration errors of a scale which cannot be discerned by the naked eye (i.e. $\Sigma \leq 100$ um or $\leq 150$ um) then it is not necessary to address the potential asymmetry. In such circumstances it is preferable to use the boundary region to reduce only the contrast of the image panel overlap. In this case it is sufficient to make the boundary region design width ($2\Delta$) equal to or only slightly exceeding the registration variance $\Sigma$.

FIG. 10 illustrates in cross-section a general overall structure of any of the devices 10 referred to above in connection with FIGS. 2 to 9. As an example, the device is depicted as a two-colour moiré magnifier operating via transmissive lenses—these lenses maybe spherical (2D moire) or cylindrical (1D moire) as explained further below. Thus, the device 10 comprises a transparent substrate comprised typically of PET or Biaxial OPP, on the upper surface of which is formed a two-dimensional array of spherical microlenses 22. This array may comprise, for example, clear resin into which is formed the lens array by embossing (the resin in this case is required to have thermoplastic properties) or by the process of cast cure replication (the UV curing process may be free radical or cationic). The diameters of the microlenses 22 is typically in the range 1-100 microns, preferably 1-50 microns and even more preferably 10-30 microns, thus defining pitches in a similar range.

The focal length of the microlenses 22 (as measured from their planar back surface) is substantially equal to the thickness t of the optical spacer layer which in this example comprises the thickness of the substrate 20 plus the thickness of a print receptive layer 21 on the opposite surface of the substrate 20 to the microlens array 22 so as to define a focal plane 24 substantially co-incident with the surface of the print receptive layer. On the print receptive layer 21 is formed the microimage element arrays 100. For example, first the microimage array 110 of '20' icons may be printed as a first working in a red colour. Next, the microimage arrays 120', 120" are printed as a second working in a blue colour. It will be seen in FIG. 10 that the arrays are each printed on the print receptive layer 21 coincident with the focal plane 24.

It should be recognised that in principle the print receptive layer 21 is not essential however in practice its presence serves to accommodate for the fact that substrate materials such as PET and BOPP are typically provided in a number of standard thickness's or gauges, most typically 19 um and 23 um and thus the substrate thickness itself cannot be adjusted or tuned to ensure the print is coincident or coplanar with the focal plane of the lens array. Thus the thickness of the transparent print receptive layer is adjusted to ensure that the focal point of the lenses is coincident with the printed micro images subsequently applied to this coating.

Between each microimage element array and the next (i.e. between adjacent array pairs) is a boundary region 150 which is devoid of microimage elements. In the example shown in FIG. 10, there is no shift due to registration errors (i.e. $\Sigma=0$) and so the width of the boundary regions 150 is equal to the design width, $2\Delta$. However, more generally, the width of each boundary region will be ($2\Delta+/-\Sigma$), where $2\Delta$ is preferably greater than $\Sigma$ so that the formed boundary region has a non-zero width. In this example, each boundary region 150 is uniformly transparent, carrying no printing or other indicia, although as demonstrated below this need not be the case. As explained above, the boundary regions 150 will prevent interference between the magnified image panels 11, 12 corresponding to the microimage element arrays 110, 120 etc, each image panel being perceived wholly in isolation from the next.

In order to create the phenomena of moiré magnification and enable the generation of moving images, pitch mismatches are introduced between the microimage arrays 100 and the microlens array 22. As already mentioned, the mismatch can be the same for each of the arrays 110, 120 but in preferred examples it will be different. One method of providing a mismatch is to have a microlens and microimage array with substantially the same pitch where the pitch mismatch is achieved by introducing a small rotational misalignment between the microimage and microlens array.

The degree of rotational misalignment between the micro-image and microlens array is preferably in the range 15°-0.05°, which results in a magnification range of between ~4×-1000× for the microimage array. More preferably the rotational misalignment is in the range 2°-0.1°, which results in a magnification range of between ~25×-500× for the microimage array.

Alternatively the microimage array and microlens array are in substantially perfect rotational alignment but with a small pitch mismatch. A small pitch mismatch would equate to a percentage increase/decrease of the pitch of the microimage array relative to the microlens array in the range 25%-0.1%, which results in a magnification range of between ~4×-1000× for the microimage array. More preferably the percentage increase/decrease of the pitch of the microimage array relative to the microlens array is in the range 4%-0.2%, which results in a magnification range of between ~25×-500× for the microimage array.

It is also possible to use a combination of a small pitch mismatch and a small rotational misalignment to create the phenomena of moiré magnification and enable the generation of moving images.

The result of the pitch mismatch between the arrays 110, 120 and the spherical lens array 22 causes moiré magnification of the microimages at different depths (as seen in FIG. 2a).

The degree of magnification achieved is defined by the expressions derived in "The Moire magnifier", M. Nutley, R Hunt, R Stevens & P Savander, Pure Appl. Opt. 3 (1994) pp. 133-142.

To summarise the pertinent parts of this expression, suppose the micro image pitch=A and the micro lens pitch=B, then magnification M is given by:

$$M = A/SQRT[(B\cos(Theta)-A)^2 - (B\sin(Theta))^2]$$

where, Theta equals angle of rotation between the 2 arrays. For the case where A≠B and where Theta is very small such that cos(Theta)≈1 & sin(Theta)≈0:

$$M = A/(B-A) = S/(1-S)$$

Where S=B/A
However for large M>>10 then S must≈unity and thus $$M \approx 1/(1-S)$$

The depth of the synthetic image relative to the surface plane of the device derives from the familiar lens equation relating magnification of an image located a distance v from the plane of lens of focal length f, this being:

$$M = v/f - 1$$

Or, since typically v/f>>1

$$M \approx v/f$$

Thus the depth v of the synthetically magnified image=M*f.

As an example, suppose the structure of FIG. 10 was comprised of micro lenses 22 with a focal length f of 40 μm or 0.04 mm. Furthermore let us suppose both the micro lenses and the supporting substrate 20 were both comprised of materials with refractive index n of 1.5. Then it follows that the base diameter D of the lenses will constrained by the expression $$D \leq f*2(n-1)$$

and therefore D≤0.04*2(1.5-1), giving D≤0.04 mm.

We might then choose a value for D of 0.035 mm and a lens pitch B of 0.04 mm (along each axis), resulting in a lens array with a f/# number close to unity with reasonable close packing (inter lens gap 5 um).

In a first example suppose we required the first image panel 11 to appear to be located 2 mm behind the surface plane of the substrate and the second image panel 12 to be located 6 mm behind the surface plane (note images behind the surface plane are by definition "virtual" and a more detailed analysis shows them to be non-inverted relative to micro image object array). For further illustrative simplicity we assume that the pitch of each microimage array 110, 120 is equal in the x and y-axis directions (i.e. $A_{1y}=A_{1x}$ and $A_{2y}=A_{2x}$).

Given M=v/f, then it follows if f=0.04 mm and v=2 mm, then the magnification of the first array 110, $M_1$ is 2/0.04=50. Hence the first image panel 11 must display the microimage array 110, magnified 50 times.

Therefore since $M_1=A/(B-A)=50$, it follows that 50 $(B-A_1)=A_1$ giving $A_1=B$ (50/51). Substituting B=0.04 mm we obtain $A_1=0.0392$ mm, which is the required pitch between the microimage elements in the first array 110.

Similarly, the magnification of the second array $M_2=6/0.04=150$ and thus 150 $(B-A_2)=A_2$, giving $A_2=B$ (150/151) =0.0397 mm, which is the required pitch between the microimage elements in the second array 120.

In a second example suppose we require the first image panel 11 to be located 2 mm in front of the surface plane, whilst the second image panel 12 remains located 6 mm behind the surface plane.

In contrast to the previous example, here the first image array 11 will form a real inverted image and thus the sign of the magnification will be negative (which follows from assigning a negative value for the image distance v in the previous expression for magnification).

Hence $M_1=-2/0.04=-50$ and thus $-50(B-A_1)=A_1$, giving $A_1=50/49$ B=0.0408 mm.

Thus we see that for the first image panel 11 to be located in front of the surface plane (i.e. appearing to float) its micro image array 110 must have a pitch larger than the lens pitch. Conversely if the image pitch is less than the lens pitch then the image array will appear to be located below the surface plane.

The present invention is not limited to any specific type or geometry of microlens, the only requirement being that the microlens can be used to form an image. Microlenses suitable for the present invention include those that refract light at a suitably curved surface of a homogenous material such as plano-convex lenslets, double convex lenslets, and fresnel lenses. Preferably the present invention will comprise spherical microlenses but lenses of any symmetry including cylindrical lenses could be employed. Both spherical and aspherical surfaces are applicable to the present invention. It is not essential for the microlenses to have a curved surface. Gradient refractive index (GRIN) lenses image light by a gradual refraction throughout the bulk of the material as a result of small variations in refractive index. Microlenses, based on diffraction, such as Fresnel zone plates can also be used. GRIN lenses and amplitude or mask based fresnel zone plates enable the surface containing the microlens array to be planar and offers advantage in print receptivity and durability.

It is preferable to use a periodic array of lenses generated by a replication process. Master microlens arrays can be produced by number of techniques such as photothermal techniques, melt and reflow of photoresist and photoresist sculpture. Such techniques are known to those skilled in the art and are detailed in chapter 5 of "Micro-Optics: Elements, Systems, and Applications" edited by Hans Peter Herzig, published by Taylor and Francis, reprinted 1998. The master microlens structure can then be physically copied by commercially available replication techniques such as hot embossing, moulding or casting. Materials into which the microlens structures can be replicated include but are not limited to thermoplastic polymers such as polycarbonate and polymethylmethacrylate (PMMA) for the hot embossing and moulding processes and acrylated epoxy materials curable by heat or radiation for the casting process. In a preferred process the microlens array is replicated via casting into a UV curable coating applied to a carrier polymer film such as PET.

For simplicity all of the examples and embodiments herein, with the exception of that described with reference to FIG. 17b, will describe the use of spherical microlenses.

FIG. 11 depicts an example of a microimage element array sequence 100 used in a sixth embodiment of a device. As in the previous embodiments, first and second microimage element arrays 110, 120 are provided, each being in a different colour and laid down in a different working. Again, boundary regions 150 are incorporated between adjacent array pairs. However, rather than leave the boundary regions clear and transparent, in this example each boundary region 150 carries an interruption layer 155. The interruption layer 155 is, for example, a printed strip or image pattern formed across the boundary region—this strip being distinct from the adjoining arrays 110, 120 in that there is no micro image array and therefore no corresponding synthetic/moiré magnification. In the embodiment of FIG. 11, the interruption layer 155 is shown to have no artwork content. However as shown in FIG. 12 (the seventh embodiment), the interruption layer can contain design artwork or imagery which could be on a scale which needs a low power magnifier to reveal (e.g. a "teller assist" feature).

Since there is no synthetic magnification arising from the interruption layer, there is no parallax motion of any imagery or pattern elements within the strip—i.e. it provides a stationary datum which bounds the parallax motion of the magnified images. Thus when the magnified versions of the adjacent microimage arrays are interrupted or fractioned by the transition (described above with reference to FIG. 3), they appear to the observer to undergo a predetermined, i.e. design intended, eclipsing event. For example, in some cases the magnified images may appear to move under the stationary boundary region.

In the sixth and seventh embodiments the interruption layer 155 (or "transition band") is preferably applied (e.g. printed) to the structure in tandem with the first moiré (or integral) micro image array 110, i.e. in the same working. For instance the interruption layer and the first micro image element array 110 may be present on the same print roller and there is therefore no registration variance between the interruption layer 155 and the first microimage array 110—in effect the transition band 155 bounds or terminates the first array 110 at either end. However approach also means that the transition band at both ends necessarily has the same colour as the first micro image array 110, which may be undesirable. Hence the interruption layer could alternatively be applied in a separate working (and in a different colour). Preferably this would be applied before either of the microimage arrays 110, 120.

Following application of the first printed microimage array 110 and associated transition bands 155, we then apply the second printed micro image array 120. FIG. 13 shows the device in cross-section, from which it is apparent that the second micro image array 120 may be allowed to overlap or over print the adjacent transitional bands 155. Since the interruption layer is preferably substantially opaque, any overlapped elements are obscured from the observer.

The use of an interruption layer 155 in the boundary region provides a particularly versatile and practical way of managing the image discontinuity or interference which would otherwise occur across the inter panel boundary. In particular, since the transition band 155 hides the edges of the second print array 120 and thus prevents any visualisation of register error relative to the first print panel, the requirements on the width of the transition band can be relaxed. Hence in the present embodiments, the width of the transition band (which will be the same in the design template and on the finished product, since it is the result of a single working) only needs to exceed the inter panel print register variance, $\pm\Sigma$. Therefore, in FIG. 13, $2\Delta \geq 2\Sigma$. Thus if $\Sigma$ equals say 150 um, then the width of the transition band 155 needs to only exceed 300 um.

In all of the above examples, the interruption zone between the magnified image panels 11, 12 is formed by incorporating a boundary region free from microimage elements in between the microimage arrays. However, the interruption zone could instead (or additionally) be generated by modifying the micro-focusing (e.g. microlens) array instead.

FIGS. 14 and 15 show cross sections of devices according to eighth and ninth embodiments of the invention in which this is the case. In general, the appearance of the devices in plan view is similar to that of the device shown in FIG. 2a (save for the inclusion of "gaps" between the adjacent image panels 11, 12). Thus, a zone of transition is created in the micro lens array 22 rather than the microimage array 100. Effectively, the microlens array 22 comprises two (or more) arrays 22', 22'', 22''' etc, separated from each other by boundary regions 250. In these boundary regions 250, the microlenses 22 do not function. This can be achieved using two distinct ways:

- by using a polymeric resin 255 or lacquer to "index out" or over-coat the microlenses in the boundary region 250, as illustrated in FIG. 14; or
- by omitting the lenses 22 in the boundary region, as illustrated in FIG. 15.

In more detail, the operation of the lenses is dependent on a refractive index difference between the material of the lens and air. If air is replaced with a resin 255 which has substantially the same refractive index as the polymer material used for the lens 22, the light rays will not be significantly refracted at the resin/lens interface and the micro lenses will not function. Thus, in the eighth embodiment (FIG. 14), strips of resin are applied (e.g. printed) over those regions of the micro lens array which are located above the boundaries or transition zones T between the two coloured micro image arrays 110, 120. The application of the resin bands 255 to the lenses "switches off" the moiré magnification effect of the lens micro image array 22 in the zone located under the resin band. In short at each panel boundary we create a void in the magnified image pattern whose width is determined by the width of the resin band 255.

However the boundary edges of each respective micro image array 110, 120 will still be discernable if the resin 255 is transparent or highly translucent and, as the gap between arrays will alternately increase or decrease by an amount $\Sigma$ at each boundary due to inter panel print mis-register (as explained previously), this may not be desirable from the view point of public recognition. As such, in a variation of this embodiment uncoloured light scattering pigment (such as $TiO_2$) may be added to the resin 255 to make it substantially opaque thus preventing discernment of the underlying print without making the presence of the resin band readily visible to the observer. Alternatively, the resin band could be incorporated into the design of the feature in which case it may be formed with a (translucent or opaque) colour by incorporating suitable pigments or dyes. In another example, a different non-transparent coating such as ink could be used in place of resin, and if the level of opacity is sufficiently high, the requirement for the coating's refractive index to match that of the lens material can be relaxed or eliminated.

Since there is no active imaging in the boundary region 250 defined by the resin band 255, the width $\Delta r$ of this band 255 needs to only exceed the sum of the colour panel print register variation ($\pm\Sigma$) and the register variation between the printed resin and the underlying colour panel which we call $\delta$—i.e. $\Delta r \geq (2\Sigma + 2\delta)$.

In the ninth embodiment (FIG. 15), the boundary region 250 is formed over the inter array boundary T by omitting the micro lenses 22 in that region. In this way, a void zone devoid of micro lenses is created and, once again we have a void zone devoid of magnified images. As before no synthetic imaging will occur within each boundary region 250 and thus the deleterious visual effects associated with inter array register will be much less evident to the observer.

As in the eighth embodiment, the width of the void zone $\Delta r$ needs to just exceed the sum of the inter array register $\pm\Sigma$ and the variation in register or placement of the lens void zones with respect to the inter panel boundary location, $\pm\delta$ i.e. $\Delta r = 2(\Sigma + \delta)$.

In both embodiments, the repeat distance of the boundary region 250 will match that of the inter array repeat distance $R_p/2$ ($=P+\Delta$).

As noted above, the boundary region 250 in the lens array 22 may be used to generate the interruption zone alone or in combination with a boundary region 150 between the microimage element arrays 110, 120. In either case, however, it is preferable that the microimage array 110, 120 underlying each part 22', 22", 22''' of the microlens array extends laterally beyond the respective part of the microlens array. For example, in FIGS. 14 and 15 it can be seen that the microimage array 110 extends laterally to the left and right further than the part 22" of microlens array 22 directly above it. The same is true for both arrays 120 and their respective lens arrays 22' and 22'''. This arrangement ensures that the full extent of the microimage array can be viewed when the device is tilted, thereby preventing the magnified images appearing to be "cut off" by the boundary region 250.

In the embodiments so far, the boundary regions 150 and 250 are depicted as extending in a straight (rectilinear) line across the width of the device. However, this need not be the case. For example, the boundary region could be curved or zig-zagged. What is important is that a boundary region exists between the adjacent arrays at least along one axis, which will usually be that axis parallel to the direction in which the substrate travels through the manufacturing process. This is because it is along this direction that registration between two sequential workings cannot be guaranteed: typically, registration in the orthogonal direction will be much more accurate. However, in other examples the boundary region may extend along both axis so that any misregistration along the orthogonal axis is also dealt with.

FIG. 16 shows an example of a device having an interruption zone 350 between two image panels 310, 320 (the full set of magnified images is not shown). The interruption zone 350 is formed of four areas in staggered positions, resulting in an interlocking pattern. This could be formed by providing corresponding boundary zones between the microimage element arrays and/or in the micro-focusing element array using the principles of any of the above embodiments. Here, the boundary regions only separate one panel from the next along the y-axis direction: the panels abut one another in the x-axis direction at the three circled positions. As indicated above, this is commonly not problematic if the device is formed on a web moving in the y direction only.

Thus the inter panel interruption zone need not be limited to a straight line or rectangular zone but can also be a more complex inter locking pattern. The interlocking pattern can again be comprised of linear sections but it also feasible that it may be of curvilinear form—for example an interlocking sinusoid boundary.

One benefit of such interlocking boundaries is that they make the interruption zone less spatially defined and abrupt, and thereby less readily identified or detected by the observer.

The devices described so far all employ a two-dimensional (2D) moiré magnification effect. However, as already mentioned, one-dimensional (1D) magnification could be employed instead. FIGS. 17a and 17b show examples of microimage arrays suitable for use in (a) a 2D device, and (b) a 1D device. In both cases, "empty" boundary regions 150 are incorporated in between the arrays as described with respect to FIG. 5 above. However, any of the different boundary regions described in the preceding embodiments could be used instead, whether formed between the microimage arrays or in the microlens array.

Thus, FIG. 17a shows a schematic picture of the respective micro image arrays pertaining to a 2D moiré magnifier device. For a 2D moiré device the imaging lenses (or mirrors, see below) are generally spherical or aspherical in nature with a circular base profile (the profile of the lens or mirror in plan view) and are arranged in a regular two dimensional grid or matrix in the x-y plane as is well known in the art. Generally the micro image array is arranged in a grid format which matches that of the lens array. Due to the nature of the lenses, the magnitude of moiré magnification is similar in both the x and y axis and as a consequence the microimage elements are a uniformly scaled down version of their magnified counterparts.

FIG. 17b shows a schematic picture of the respective micro image arrays pertaining to a 1D moiré magnifier device. For a 1D moiré device, the imaging lenses (or mirrors) are cylindrical in nature and consequently moiré magnification occurs only along one axis (the axis of curvature of the lenses), in this case chosen to be the east-west direction. Consequently the microimage elements achieve a high level of magnification along the axis of lens curvature (typically ×50 to ×200) whilst along the transverse axis they experience a magnification close to unity. Thus in order for the magnified images to look undistorted the corresponding micro images need to highly distorted. Specifically in this example the micro images have the same height as the same height as the magnified images viewed by the observer, whilst in the transverse east-west direction they are 1/M times the size of the magnified viewed images (M being the degree of moiré magnification along that axis).

In the above examples, the microfocusing elements have taken the form of microlenses. However, in all cases the security device could alternatively be fabricated as a mirror-based moiré device, of which an example is shown in FIG. 18. In this case, the spherical microlens array 22 is replaced by a spherical or aspheric concave mirror array 40 formed on one surface of the transparent polymer substrate 20. The other surface is provided with printed microimage arrays 110, 120 as before. In the FIG. 18 example, boundary regions 150 are incorporated between each adjacent pair of microimage arrays. However, the interruption zone could instead be generated by disabling a region of the mirror array 40 (e.g. by demetalising or coating). Further, where a boundary region is incorporated between the microimage element arrays it could include an interruption layer 155 as described with reference to FIGS. 11 to 13.

It should be noted that the focal length of a concave mirror is equal to half its radius of curvature R and therefore can have a limiting minimum value approaching one quarter of the mirror base diameter. In simple terms, for a given base diameter the focal length and F number of a mirror can be one quarter of the value of equivalent lens (assuming typical refractive index of 1.5). However as reducing F number equates to reducing depth of focus, then in practice it will often be desirable to have a mirror base diameter much less than 2R.

For example considering the preferred device thicknesses cited earlier we may require the mirror focal length to be 40 um—then this requires the mirror radius R to have a value 80 um and thus a maximum theoretical base diameter approaching 160 um and thus an F number f/#=0.25 mm. However we may choose to limit the base diameter to 80 um This structure is intended for viewing only in reflection mode and thus is most relevant for application onto opaque substrates (strip & patch) or partially embedding into opaque substrates (windowed thread). As per the lens system the printed micro images must be coincident with the focal plane of the mirrors to a precision determined by the depth of focus or field of the mirror system.

If an interruption layer is to be incorporated, this should preferably be applied to the print receptive layer 23 or substrate 20 first or concurrently with the first microimage array 110, then followed by the application of the second micro image array 120. This ensures that the reflected image pertaining to the interruption layer is visualised as being in front of any elements forming part of the second microimage array which may be applied over the interruption layer doe to mis-registration.

Also since the incident light has to pass through or be transmitted by the printed micro image arrays 110, 120 (i.e. spatially modulated) before being reflected back as collimated light by the mirror array, then it follows that if the print micro images are substantially opaque the synthetically magnified images will take on a blackish colour or hue against the metallic hue provided by the mirror background. For the synthetically magnified images to appear with the colour of their corresponding micro image array then it is necessary that the micro images are at least partially translucent. The more translucent the micro images the brighter the colour of the synthetic images—however at a cost of reduced image contrast relative to the background. If a interruption layer is included, however, this is preferably substantially opaque to avoid overlying microimage elements being revealed.

If the metal coating on the mirrors is 'white' reflector such as Aluminium then the background hue or colour surrounding the synthetic images will be silver—white or achromat in appearance. However it should be recognised that other affordable coloured metals such as Copper or it alloys maybe be used. Other metals such as Silver, Gold, Platinum, Chrome, Nickel, Nickel-Chrome, Palladium, Tin etc may be used where there.

In all of the embodiments, the microlens array 22 or concave mirror array 40 can be integrally moulded into the polymer substrate 20 or could be formed on the surface of the substrate 20, for example by cast-curing or the like.

In each of the above embodiments, a single micro-image array 110, 120 is used to form each magnified image panel, with the two or more arrays being laterally spaced from one another. However, it should be recognised that in any of the embodiments, it also possible to have a third microimage array provided "behind" either or both of the first and second arrays. That is, a third (and possibly fourth, etc) microimage array may be formed which at least partially overlaps with either or both of the arrays 110, 120. Preferably the third microimage array is provided in a colour different from that of the array(s) it overlaps, and is formed in a separate working. So as not to interfere with the magnified versions of the first and second arrays, the third array is preferably formed at a pitch different from that of the array(s) it overlaps. As discussed previously, the "depth" of the magnified image perceived by the viewer will depend on the pitch mismatch between the microimage array and the microfocusing element array and as such the magnified version of the third array will appear to lie in a different plane from that of the first and/or second array, thereby avoiding confusion. For example the design might comprise alternating panels of blue "20" symbols (first array 110) and red "crest" symbols (second array 120), with a third common layer of 'stars' or other icons, or a line pattern located behind the first two image arrays. In other examples, the third array could be arranged at a pitch such that its magnified version appears in front of the first and/or second arrays.

The third array could be printed in an ink that is invisible under normal lighting conditions but visible under UV illumination, in this case the magnified "background" will only be observed under UV illumination. Alternatively either one or both of the first and second arrays 110, 120 could be printed in an ink that changes colour on exposure to UV radiation such that a change in colour of the magnified image is observed under UV radiation.

FIG. 19 illustrates part of an apparatus for printing the microimage element arrays on the substrate. As mentioned above, the disclosed apparatus greatly reduces the degree of mis-registration between the different microimage element arrays and is therefore particularly suited to producing devices of the type described with respect to FIGS. 2 and 3. However, it is also suitable for use in forming devices which include interruption zones as described with reference to any of FIGS. 5 to 18 above. It will be appreciated that such devices could alternatively be produced using conventional printing apparatus (e.g. in two print runs, or using a second, offline, printing station), since the width of the interruption zone can be designed to account for the registration error using the principles already discussed. Nonetheless, as already indicated it is preferred that the width of the interruption zone be kept as small as possible so as to reduce its impact on the appearance of the device and so a manufacturing process with very low registration error, such as that now described, is still preferred.

The apparatus shown in FIG. 19 comprises two printing stations 90 and 92 for laying down a first working and a second working, respectively, on substrate 20. The substrate is conveyed through the apparatus on a series of tensioning rollers TR1 . . . TR4 and travels in the direction indicated by arrow MD (parallel to the y-axis of the substrate). Between the two printing stations 90, 91 is a path length adjustment section 91 which can be used to change the length of the substrate transport path between the two printing stations.

The first printing station 90 comprises an inking roll 70 coupled via a roll chain 72 to an ink reservoir 74. Ink is transferred by the roll 70 onto a print roll 76 carrying recessed printing elements 78 corresponding to the microimage elements of the array concerned. A doctoring blade 84 contacts and removes ink or colorant off the non-recessed areas of the print roller 82. The substrate 20 is fed between the print roll 76 and an impression roller 80 and the image elements of the first array 110 are printed onto the substrate 20.

The second printing station 91, provided downstream of the first, comprises identical components: inking roll 71, roll chain 73, reservoir 75, print roll 77 with recessed elements 79, doctoring blade 85 and impression roller 81, and is used to print the second array 120 of image elements.

Alternatively, the print stations 90, 92 could include print rolls 76, 77 carrying proud printing elements corresponding to the microimage elements of the array concerned, in which case no doctoring blade 84 is required.

To enable the two arrays 110, 120 to be printed adjacent one another, only a portion (preferably no more than half) of each respective print roller 76, 78 is provided with printing elements such that only a portion of the roller's circumference imparts micro image print onto the substrate web 20. As such, at the output of the first print station 90, the web carries the first microimage element arrays 110, spaced by empty regions of the web. On arrival at the second print station 92, the second microimage element arrays are printed onto the spaces between the first microimage element arrays. Thus, each print cylinder 76, 77 alternately prints micro image panels of length P onto the web.

If a boundary region 150 is to be provided between the arrays, the repeat distance between printed panels of a particular colour, Rp, is 2(P+Δ) where 2Δ is the design width of the boundary region 150. If no boundary region is required (e.g. for producing the devices of FIG. 2*a*, 14 or 15) then Δ=0.

To control the relative register between the two print heads 90, 92, a path length adjusting unit 91 is provided. This comprises a number of web transfer rollers TR1 to TR4 whose action is to adjust the tension of the web in the machine direction MD. Specifically, roller TR3 can move up or down (i.e. out of the plane of the web, in the z-axis), thereby increasing or reducing the path length between the two print stations 90, 92. A detector such as camera 95 may be provided downstream of the second print station 92 to detect the size of the inter-array gap (the boundary region) achieved, and supply an error signal corresponding to the magnitude of the detected gap. The path length adjusting unit is controlled by a controller (not shown) in response to the error signal provided by the camera system so as to minimise the variation in that gap (i.e. feedback control).

It is also envisaged that one or both of the print cylinders 76, 77 could have their position moved transverse to the web direction (i.e. in the x-axis direction) by the action of a transducer provided on the shaft of either roller so that the printed panels have transverse alignment. As discussed above with respect to FIG. 16 this assists in the formation of interdigitated interruption zones.

Following application of the two printed panels the web is inverted or flipped over and the micro lens or micro mirror array applied to the reverse side. For example, microlenses or concave micromirrors can be provided on the opposite surface of the substrate 20 by cast-curing, moulding or the like.

In the examples described above, the microimage elements have been provided by printing onto the substrate. It would also be possible to provide some or all of the image elements as relief structures and examples of some of these are shown in FIGS. 13A-13J. In these Figures, 'IM' indicates the parts of the relief generating an image while 'NI' indicates those parts which do not generate an image.

FIG. 13A illustrates embossed or recessed image elements. FIG. 13B illustrates debossed image elements. FIG. 13C illustrates image elements in the form of grating structures while FIG. 13D illustrates moth-eye or other fine pitch grating structures.

These structures can be combined. For example, FIG. 13E illustrates image elements formed by gratings in recesses areas while FIG. 13F illustrates gratings on debossed areas.

FIG. 13G illustrates the use of a rough embossing.

FIG. 13H illustrates the provision of print on an embossed area while FIG. 13I illustrates "Aztec" shaped structures.

FIG. 13J illustrates ink filled recesses.

The various embodiments of the device construction described above can be slit or cut into patches, foils, stripes, strips or threads for incorporation into plastic or paper substrates in accordance with known methods. FIGS. 21 and 22 show an example in which a device 10 made in accordance with any of the preceding embodiments, is applied to an article 1, such as a security document (e.g. a banknote, tax stamp, passport stamp, financial card etc.), as an uninterrupted strip or stripe extending from one edge of the article to the other. The device 10 may be applied to the document by the application of heat and/or pressure and as such a suitable form of adhesive may be applied to that side of the device which is to be secured to the document substrate. Alternatively, a cold adhesive or another transfer method (e.g. hot stamping) could be employed, for example. The device may be 'rolled' onto the substrate by allowing the device and document to come into contact just prior to passing through a rotary nip wherein the device adhesive may be activated by heat and pressure.

FIG. 22 shows a cross section along line X-X of FIG. 21, illustrating a lens-based embodiment operating in reflection-only mode. The device 10 is affixed to the substantially opaque paper or polymer based substrate 5 of article 1 by an adhesive layer 6. In this case the synthetically magnified image viewed by the observer $O_1$ is ultimately derived from light that has been back scattered or reflected from the micro image arrays 100 and the medium that acts as a background to the micro image arrays. The greater the reflective contrast between the micro image arrays and the surrounding background medium, the greater the visual contrast of the synthetically magnified images. Now it may be that the colour or reflective properties of the substrate 5 are non optimal—for example the substrate may be of low reflectivity or a similar colour to one of the micro image arrays. To address this we show in FIG. 22 the addition of an optional mask coat layer 7 located between the micro print interface and the adhesive layer 6 bonding the device to the substrate 5. The mask layer 7 will typically contain a reflective opacifying pigment such as, but not limited to, titanium dioxide particles in a resin binder. The colour of this layer could be simply white or a colorant could be added to ensure that this mask layer or background reflecting layer exhibits a desired hue which contrasts with one or both micro image arrays.

In a further example the mask coat and one of the micro image arrays have overtly the same color, however one or other entity has been provided with a metameric property. Examples of metameric inks are provided in GB1407065. Consequently under normal viewing the relevant micro image array is only weakly discerned (if at all) against the background colour of the opaque mask—however when viewed under a metameric filter said micro image array or more pertinently its synthetically magnified image becomes strongly evident. Alternatively the mask coat may be provided with a fluorescent additive such that when viewed under a fluorescent light the mask coat provides a fluorescent background against which the absorbing micro image arrays form black synthetically magnified images.

The mask coat may also function as a durability enhancing layer.

Referring again to FIG. 2 the first microimage array 110 could be printed in a first metameric ink and the second array 120 of stars in a second metameric ink where the metameric properties of the inks are such that they appear to be of an identical colour when viewed in daylight, but when viewed in filtered light, the two inks will appear to have different reflective colours.

In another embodiment a device according to any of the embodiments could be incorporated into a security document as a windowed thread. Examples of such a configuration are shown in FIGS. 23, 24 and 25. In FIG. 23, again a device according to any of the embodiments is provided in or on a security document or other article such a banknote, tax stamp, certificate of authenticity or passport page. Windows 8 reveal certain portions of the device 10. In this example, the device design is not registered to the "north south" (i.e. top and bottom, as shown in the Figure) locations of the substrate windows 9 during the paper or substrate integration process and, as a consequence the manufacturer cannot assure that a particular image panel 11, 12 will wholly and exclusively appear within in a particular window 8. However, the likelihood of ensuring a single panel is present in each window increases when the length of each respective colour panel 11, 12 significantly exceeds the length of the thread window 8 whilst at the same time remaining less than the window repeat distance.

FIG. 24 shows another embodiment wherein the device design or more particularly its vertical colour alternation is registered to the windowed zones 8 in the substrate 1. This embodiment is strongly preferred as the presence of a single colour panel 11, 12 in each window provides an unambiguous and easily described security feature which will be quickly appreciated by the viewer. For example, the uppermost window 8' reveals only image panel 12, whereas the adjacent window 8" reveals only image panel 11. The transition zones where the two image panels meet are located in the non windowed (e.g. fully embedded) portion of the document and are thus hidden from visualisation by the viewer. As such, whether or not the two microimage arrays 110, 120 are accurately registered to one another or whether or not the device includes an interruption zone between image panels 11, 12, is not critical since the affected region will be concealed. Therefore, in this embodiment the device need not be made in accordance with any of the preceding embodiments but could simply comprise at least two laterally spaced microimage element arrays formed in different workings and different colours, without any particular registration requirements or boundary regions etc (for example, the arrays could partially overlap one another, whether intentionally or not). However devices according to any of the above embodiments could of course be selected for the purpose.

FIGS. 25 and 26 show two alternative cross sections along the line Y-Y in FIG. 24 (note a different number of windows 8 is depicted but the principles are the same). In the embodiment of FIG. 25, the device 10 is affixed to a surface of the substrate 5 in alignment with windows 8 which pass through the full document thickness. The windows 8 may be apertures or could be transparent regions (e.g. polymer) of the substrate 5. The windows 8 could formed prior to application of the device 10, or after (e.g. by abrasion). The device 10 is affixed to the substrate using any of the techniques previously mentioned with regard to FIGS. 21 and 22, and typically an adhesive layer is provided between the microlens array 22 and the substrate. Care must be taken not to unintentionally "index match" the lens, rendering them non-functional as discussed above. As such if the refractive index of the adhesive is similar to that of the lenses, a coating with a different refractive index may be included between the lenses and the adhesive. A mask layer 7 may be provided as before or may be omitted.

As explained above, the device 10 is registered to the substrate 5 using techniques available in the art such that each of the interfaces between adjacent microimage arrays is concealed by the substrate 5 between windows 8. Each window 8 is aligned with either the first array 110 or the second array 120.

In this arrangement, the device could operate in both reflection and transmission modes, since the device 10 is applied at least partially over a transparent aperture 8 within the substrate 5. In this case the synthetically magnified image may be viewed in reflection and/or transmission through the viewing aperture 8 in the substrate 5. The observer will only see magnified image when located in position $O_1$. If the opaque mask coat 7 is omitted, the same observer can observe the moiré magnification system in transmission. It is also a requirement that the adhesive layer have good optical clarity (i.e. low scatter, low absorption)

It should be noted that if the printed micro-images 110, 120 are formed from an ink or colorant that is substantially opaque, then the synthetically magnified image will be coloured when viewed in reflection, but will form a high contrast essentially black image when viewed in transmission.

A requirement for a coloured image to be viewed in transmission is that the micro images must have some degree of translucency. Light must be able to pass through the printed images and the desired colour transmitted. It should be recognised that in regions were the two arrays 110, 120 and therefore magnified images overlap we will have additive colour mixing. For example if the two array colours are red and blue then in areas of overlap the image will be magenta.

Note also that if the observer views the device from location $O_2$, then no synthetically/moiré magnified image is observed, but instead an unmodified or direct image of the micro image patterns (or simply the mask coat 7, if present).

In the alternative of FIG. 26, the device 10 is partially embedded within the document. This could be achieved by incorporating the device during papermaking, or laminating it between layers making up the document for example. The substrate 5 is now shown in two portions 5a and 5b, one above and one below the device 10. Typically, both sides of the device 10 will now be provided with an adhesive (only layer 6 is shown, and the same considerations mentioned above regarding index matching of the lenses must be taken into account). Again, the windows 8 may be apertures through the first portion of the substrate 5a, formed before or after assembly of the document with the device (e.g. by punching or abrasion), or could be transparent portions of a polymer layer. In this case, if the substrate layer 5b is opaque, the device 10 will only be viewable in reflection mode from position $O_1$.

In further examples, the security device also includes one or more other optical security features. An example of this is shown in FIG. 27. In this example, a moiré magnifier device 10 is formed as described with reference to any of the above embodiments. The security device also includes a number of holographic image generating structures 400. The holographic image structures 400 can be cast or embossed into the same resin as the microlenses but equally two different resins, one suitable for casting the microlenses and one suitable for embossing a holographic structure could be applied in register. Alternatively the holographic structures could be embossed into a polymeric lacquer positioned on the opposite side of the polymeric layer to the microlenses.

The holographic generating structures 400 can be in the form of holograms or DOVID image elements. In the label construction shown in FIG. 14, the microlenses and the visualisation of the two magnified image arrays is located in a central horizontal band or region of the label whilst the holographic generating structures 400 are located on either side. However, it should be understood that this example is purely illustrative and for example the holographic generating structures 400 could be located in a central band or strip with the moiré magnifier 10 being provided in one or more regions on either side. Alternatively moiré magnified images and the image provided by the holographic generating structures could be integrated into a single image by each providing components of a single image. FIG. 28 illustrates an example of such an integrated design where the holographic generating structures 401 form a scroll and in the middle of the scroll the holographic structures are replaced with a moiré magnifier 10 to create a moiré magnified image in this case of moving "5"'s and stars.

In the case of the holographic structures 400, 401 these can have any conventional form and can be fully or partially metallised. Alternatively the reflection enhancing metallised layer can be replaced with a substantially transparent inorganic high refractive index layer, such as ZnS.

Whatever arrangement is defined, it is advantageous if the individual regions allocated to the two different optical effects in FIGS. 27 and 28 are sufficiently large to facilitate clear visualisation of the effects.

The security devices shown in the previous Figures are suitable to be applied as labels to secure documents which will typically require the application of a heat or pressure sensitive adhesive to the outer surface of the device which will contact the secure document. In addition an optional protective coating/varnish could be applied to the exposed outer surface of the device. The function of the protective coating/varnish is to increase the durability of the device during transfer onto the security substrate and in circulation.

In the case of a transfer element rather than a label the security device is preferably prefabricated on a carrier substrate and transferred to the substrate in a subsequent working step. The security device can be applied to the document using an adhesive layer. The adhesive layer is applied either to the security device or the surface of the secure document to which the device is to be applied. After transfer the carrier strip can be removed leaving the security device as the exposed layer or alternatively the carrier layer can remain as part of the structure acting as an outer protective layer. A suitable method for transferring security devices based on cast cure devices comprising micro-optical structures is described in EP1897700, The security device of the current invention can also be incorporated as a security strip or thread. Security threads are now present in many of the world's currencies as well as vouchers, passports, travellers' cheques and other documents. In many cases the thread is provided in a partially embedded or windowed fashion where the thread appears to weave in and out of the paper. One method for producing paper with so-called windowed threads can be found in EP0059056. EP0860298 and WO03095188 describe different approaches for the embedding of wider partially exposed threads into a paper substrate. Wide threads, typically with a width of 2-6 mm, are particularly useful as the additional exposed area allows for better use of optically variable devices such as the current invention. The device structures shown in any of FIGS. 2 to 18 could be used as a thread by the application of a layer of transparent colourless adhesive to one or both of the outer surfaces of the device. Careful selection of the optical properties of the adhesive in contact with the microlenses is important. The adhesive must have a lower refractive index than the microlens material and the greater the difference in the refractive index between the microlenses and the adhesive the shorter the back focal length of the lenses and therefore the thinner the final security device.

The security device of the current invention can be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

Additional optically variable materials can be included in the security device such as thin film interference elements, liquid crystal material and photonic crystal materials. Such materials may be in the form of filmic layers or as pigmented materials suitable for application by printing.

The security device of the current invention may comprise an opaque layer.

FIGS. 29 and 30 show a further security feature in the form of a demetallised image incorporated within a security device of the current invention. The magnified image arrays of the device 10 are observed In the central band of the device. This provides a primary security effect due to the strong lenticular type animation. As can be seen in FIG. 30, the structure of the feature shown in FIG. 29 along section A-A is as shown in FIG. 10. In the regions outside of the central band exhibiting moiré magnification (as seen along section B-B: note no microimage array elements are visible since line B-B intersections boundary region 150) the print receptive layer 23 has been metallised 410. Parts 415 of the metal layer are demetallised to define the demetallised images thus enabling the creation of demetallised indicia which can be viewed in reflective but more preferably transmitted light.

In a further example and in reference to the mirror-based moiré example shown in FIG. 18 the metallised layer forming the micromirrors may be extended beyond the micromirrors and then parts of this layer can be demetallised to define demetallised images.

One way to produce partially metallised/demetallised films in which no metal is present in controlled and clearly defined areas, is to selectively demetallise regions using a resist and etch technique such as is described in US-B-4652015. Other techniques for achieving similar effects are for example aluminium can be vacuum deposited through a mask, or aluminium can be selectively removed from a composite strip of a plastic carrier and aluminium using an excimer laser. The metallic regions may be alternatively provided by printing a metal effect ink having a metallic appearance such as Metalstar® inks sold by Eckart.

The presence of a metallic layer can be used to conceal the presence of a machine readable dark magnetic layer. When a magnetic material is incorporated into the device the magnetic material can be applied in any design but common examples include the use of magnetic tramlines or the use of magnetic blocks to form a coded structure. Suitable magnetic materials include iron oxide pigments ($Fe_2O_3$ or Fe$_3$O$_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used; in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

In an alternative machine-readable embodiment a transparent magnetic layer can be incorporated at any position within the device structure. Suitable transparent magnetic layers containing a distribution of particles of a magnetic material of a size and distributed in a concentration at which the magnetic layer remains transparent are described in WO03091953 and WO03091952.

In a further example the security device of the current invention may be incorporated in a security document such that the device is incorporated in a transparent region of the document. The security document may have a substrate formed from any conventional material including paper and polymer. Techniques are known in the art for forming transparent regions in each of these types of substrate. For example, WO8300659 describes a polymer banknote formed from a transparent substrate comprising an opacifying coating on both sides of the substrate. The opacifying coating is omitted in localised regions on both sides of the substrate to form a transparent region.

EP1141480 describes a method of making a transparent region in a paper substrate. Other methods for forming transparent regions in paper substrates are described in EP0723501, EP0724519, EP1398174 and WO03054297.

One or more of the microimage arrays of the present invention may be printed with inks comprising materials that respond visibly to invisible radiation. Luminescent materials are known to those skilled in the art to include materials having fluorescent or phosphorescent properties. It is also well known to use other materials that respond visibly to invisible radiation such as photochromic materials and thermochromic materials. For example only one of the magnified arrays might be visible in normal daylight conditions with the second magnified image becoming visible only under UV illumination. Alternatively the two magnified arrays could appear the same colour in normal daylight conditions and different colours when viewed using a filter or when viewed under UV illumination.

The invention claimed is:

1. A moiré magnification device comprising a transparent substrate carrying:
   i) a periodic array of micro-focusing elements on a first surface, the micro-focusing elements defining a focal plane;
   ii) a first array of microimages in an ink of a first color and located in a plane coincident with the focal plane of the micro-focusing elements; and
   iii) a second array of microimages, in an ink of a second color different from the first color, and located in a plane coincident with the focal plane of the micro-focusing elements, the second array of microimages being laterally offset from the first,
   wherein pitches of the micro-focusing elements and first and second arrays of microimages and their relative locations are such that the array of micro-focusing elements cooperates with each of the first and second arrays of microimages to generate respective magnified versions of the microimages of each array due to a moiré effect,
   and such that when viewing the arrays of microimages simultaneously, an interruption zone of non-zero width is perceived between the magnified version of the first microimage array and the magnified version of the second microimage array, the interruption zone exhibiting no magnified version of either microimage array,
   wherein the first array of microimages is laterally spaced from the second array of microimages by a boundary region of non-zero width which is free of microimages, thereby giving rise to the perceived interruption zone, and
   wherein the width of the microimage element-free boundary region is greater than a maximum pitch of either of the microimage element arrays.

2. The device according to claim 1, wherein the microimage-free boundary region carries an interruption layer, the interruption layer taking a form of a uniform or patterned printing or coating.

3. The device according to claim 2, wherein, in the microimage-free boundary region, the interruption layer is disposed between the substrate and at least one of the first and second arrays of microimages.

4. The device according to claim 1, wherein the periodic array of micro-focusing elements comprises first and second periodic arrays of micro-focusing elements laterally spaced from one another by a boundary region of non-zero width which is free of functioning micro-focusing elements, the boundary region being aligned with a transition between the first array of microimages and the second, thereby giving rise to the interruption zone perceived.

5. The device according to claim 4, wherein the width of the boundary region is greater than a largest dimension of individual micro-focusing elements.

6. The device according to claim 5, wherein the width of the boundary region is greater than a maximum pitch of either of the micro-focusing element arrays.

7. The device according to claim 4, wherein the boundary region comprises a layer of material formed on micro-focusing elements in that region, the material being of a same refractive index as that of the micro-focusing elements, such that the micro-focusing elements in the boundary region are non-functional.

8. The device according to claim 4, wherein the boundary region comprises a region devoid of micro-focusing elements.

9. The device according to claim 1, wherein the micro-focusing elements comprise microlenses.

10. The device according to claim 1, wherein the microimages are printed on the substrate or are formed as grating structures, recesses or other relief patterns on the substrate.

11. A security device according to claim 1.

12. The security device according to claim 11, formed as a security thread, label or patch.

13. The security device according to claim 11, the security device being provided in a transparent window of a security document.

14. An article provided with an optical device according to claim 1, wherein the article comprises one of a banknote, a check, a passport, identity card, certificate of authenticity, fiscal stamp and other document of security value or personal identity.

15. A security document comprising a document substrate having at least two transparent or translucent windows spaced apart from one another, and a device comprising a transparent substrate carrying:

i) a periodic array of micro-focusing elements on a first surface, the micro-focusing elements defining a focal plane;
ii) a first array of microimages in an ink of a first color and located in a plane coincident with the focal plane of the micro-focusing elements; and
iii) a second array of microimages, in an ink of a second color different from the first color, and located in a plane coincident with the focal plane of the micro-focusing elements,
wherein the first array of microimagesn is laterally spaced from the second array of microimages by a microimage element-free boundary region of non-zero width which is free of microimages,
wherein the width of the microimage element-free boundary region is greater than a maximum pitch of either of the microimage element arrays,
and wherein pitches of the micro-focusing elements and first and second arrays of microimages and their relative locations are such that the array of micro-focusing elements cooperates with each of the first and second arrays of microimages to generate respective magnified versions of the microimages of each array due to a moiré effect,
the device being incorporated into or applied on to the document substrate in alignment with the at least two windows, the device being registered to the document substrate such that, simultaneously, the magnified version of the first microimage array is visible through a first window of the two windows and the magnified version of the second microimage array is visible through a second window of the two windows, and such that the microimage element-free boundary region between the two microimage arrays is concealed by the document substrate between the two windows.

16. A moiré magnification device comprising a transparent substrate carrying:
   i) a periodic array of micro-focusing elements on a first surface, the micro-focusing elements defining a focal plane;
   ii) a first array of microimages in an ink of a first color and located in a plane coincident with the focal plane of the micro-focusing elements; and
   iii) a second array of microimages, in an ink of a second color different from the first color, and located in a plane coincident with the focal plane of the micro-focusing elements, the second array of microimages being laterally offset from the first,
      wherein pitches of the micro-focusing elements and first and second arrays of microimages and their relative locations are such that the array of micro-focusing elements cooperates with each of the first and second arrays of microimages to generate respective magnified versions of the microimages of each array due to a moiré effect,
   and such that when viewing the arrays of microimages simultaneously, an interruption zone of non-zero width is perceived between the magnified version of the first microimage array and the magnified version of the second microimage array, the interruption zone exhibiting no magnified version of either microimage array,
      wherein the periodic array of micro-focusing elements comprises first and second periodic arrays of micro-focusing elements laterally spaced from one another by a boundary region of non-zero width which is free of functioning micro-focusing elements, the boundary region being aligned with the transition between the first array of microimage elements and the second, thereby giving rise to the perceived interruption zone, and
      wherein the width of the micro-focusing element-free boundary region is greater than a maximum pitch of either of the micro-focusing element arrays.

17. The device according to claim 16, wherein the boundary region comprises a layer of material formed on micro-focusing elements in that region, the material being of a same refractive index as that of the micro-focusing elements, such that the micro-focusing elements in the boundary region are non-functional.

18. The device according to claim 16, wherein the boundary region comprises a region devoid of micro-focusing elements.

19. The device according to claim 16, wherein the micro-focusing elements comprise microlenses.

20. The device according to claim 16, wherein the microimages are printed on the substrate or are formed as grating structures, recesses or other relief patterns on the substrate.

21. A security device according to claim 16.

22. The security device according to claim 21, formed as a security thread, label or patch.

23. The security device according to claim 21, the security device being provided in a transparent window of a security document.

24. An article provided with an optical device according to claim 16, wherein the article comprises one of a banknote, a check, a passport, identity card, certificate of authenticity, fiscal stamp and other document of security value or personal identity.

25. A security document comprising a document substrate having at least two transparent or translucent windows spaced apart from one another, and a device comprising a transparent substrate carrying:
   i) a periodic array of micro-focusing elements on a first surface, the micro-focusing elements defining a focal plane;
   ii) a first array of microimages in an ink of a first color and located in a plane substantially coincident with the focal plane of the micro-focusing elements; and
   iii) a second array of microimages, in an ink of a second color different from the first color, and located in a plane coincident with the focal plane of the micro-focusing elements,
      wherein at least a portion of the first array of microimages is not overlapped by the second, and at least a portion of the second array of microimages is not overlapped by the first;
      and wherein pitches of the micro-focusing elements and first and second arrays of microimages and their relative locations are such that the array of micro-focusing elements cooperates with each of the first and second arrays of microimages to generate respective magnified versions of the microimages of each array due to a moiré effect,
   the device being incorporated into or applied on to the document substrate in alignment with the at least two windows, the device being registered to the document substrate such that, simultaneously, the magnified version of the first microimage array is visible through a first window of the two windows and the magnified version of the second microimage array is visible through a second window of the two windows, and such that a part of the first microimage array and a part of the second microimage array is concealed by the document substrate between the two windows thereby providing that a transition between the two microimage arrays is concealed by the document substrate between the two windows.

* * * * *